US006314562B1

(12) United States Patent
Biggerstaff

(10) Patent No.: US 6,314,562 B1
(45) Date of Patent: Nov. 6, 2001

(54) METHOD AND SYSTEM FOR ANTICIPATORY OPTIMIZATION OF COMPUTER PROGRAMS

(75) Inventor: Ted J. Biggerstaff, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/928,391

(22) Filed: Sep. 12, 1997

(51) Int. Cl.⁷ ........................................................ G06F 9/45
(52) U.S. Cl. ...................................... 717/9; 717/8; 717/10
(58) Field of Search ................................. 399/701, 705, 399/709; 717/9, 8, 10; 709/100

(56) References Cited

U.S. PATENT DOCUMENTS

| | | | |
|---|---|---|---|
| 4,782,444 | 11/1988 | Munshi et al. ........................ | 395/709 |
| 4,827,404 | 5/1989 | Barstow et al. ...................... | 395/500 |
| 4,866,665 * | 9/1989 | Haswell Smith ...................... | 714/35 |
| 5,148,513 | 9/1992 | Koza et al. .............................. | 706/13 |
| 5,161,216 | 11/1992 | Reps et al. ............................. | 395/704 |
| 5,175,843 | 12/1992 | Casavant et al. ..................... | 395/500 |
| 5,191,646 | 3/1993 | Naito et al. ............................ | 345/349 |
| 5,265,254 * | 11/1993 | Blasciak et al. ...................... | 395/704 |
| 5,327,561 | 7/1994 | Choi et al. .............................. | 395/709 |
| 5,343,554 | 8/1994 | Koza et al. .............................. | 706/13 |
| 5,396,627 * | 3/1995 | Iitsuka .................................... | 395/709 |
| 5,408,603 | 4/1995 | Van de Lavoir et al. ........... | 345/349 |
| 5,450,575 * | 9/1995 | Sites ......................................... | 717/7 |
| 5,659,753 * | 8/1997 | Murphy et al. .......................... | 717/5 |
| 5,790,863 * | 8/1998 | Simonyi ................................. | 395/707 |
| 5,892,907 * | 4/1999 | Harper et al. ......................... | 709/200 |
| 5,896,537 * | 4/1999 | Landi et al. ........................... | 395/704 |
| 5,911,072 * | 6/1999 | Simonyi ................................. | 395/701 |
| 5,978,588 * | 11/1999 | Wallace ................................... | 717/9 |
| 6,012,152 * | 1/2000 | Douik et al. ............................ | 714/26 |
| 6,078,746 * | 9/2000 | Simonyi .................................. | 717/7 |
| 6,117,185 * | 9/2000 | Schmidt .................................. | 717/9 |
| 6,131,189 * | 10/2000 | Chow et al. ............................ | 717/9 |
| 6,186,677 * | 2/2001 | Angel et al. ............................. | 717/4 |

FOREIGN PATENT DOCUMENTS 0 546 794    6/1993   (EP) .

OTHER PUBLICATIONS

Tolmach, "Tag free garbage collection using explict type parameters", ACM LISP pp 1–11, Mar. 1994.*

(List continued on next page.)

*Primary Examiner*—Mark Powell
*Assistant Examiner*—Anil Khatri
(74) *Attorney, Agent, or Firm*—Lee & Hayes, PLLC

(57) ABSTRACT

A method and system for anticipatory optimization of computer programs. The system generates code for a program that is specified using programming-language-defined computational constructs and user-defined, domain-specific computational constructs. The system generates an abstract syntax tree (AST) representation of the program. The AST has nodes representing the computational constructs of the program. For each user-defined, domain-specific computational construct, the system determines whether a user-defined, domain-specific transform has been defined for the computational construct. The transform transforms a portion of the AST relating to the user-defined, domain-specific computational construct into one or more programming-language-defined computational constructs. When a domain-specific transform has been defined for the computational construct, the system transforms the AST in accordance with the domain-specific transform. The transformed AST is in a form that reflects an optimization of the programming-language-defined computational constructs based on the user-defined, domain-specific computational construct.

53 Claims, 49 Drawing Sheets

OTHER PUBLICATIONS

Ashley, "A practical and flexible flow analysis for higher order languages", ACM POPL pp 184–194, Mar. 1995.*

Polychronopoulos, "The hierarchical task graph and its use in auto scheduling", ACM pp 252–263, Mar. 1994.*

Robert Morgan, "Building an optimizing compiler", Butterworth Heinemann Pub, pp 152–163, 1998.*

Bacon, David, F. et al., "Compiler Transformations for High–Performance Computing," *ACM Computer Surveys*, 26(4), Dec., 1994.

Biggerstaff, Ted, J., "Directions in Software Development and Maintenance," Keynote Address, Conference on Software Maintenance, Montreal, Quebec, Canada, Oct. 1993.

Biggerstaff, Ted, J., "The Library Scaling Problem and the Limits of Concrete Component Reuse," International Conference on Software Reuse, Nov., 1994.

Guibas, L.J. and D.K. Wyatt, "Compilation and Delayed Evaluation in APL," Fifth Annual ACM Symposium Principles of Programming Languages, pp. 1–8, 1978.

Hwang, Gwan–Hwan et al., "An Array Operation Synthesis Scheme to Optimize Fortran 90 Programs," Conference Title: Fifth ACM SIGPLAN Symposium on Principles and Practice of Parallel Programming (PPoPP), Jul. 1995; Published in *SIGPLAN Notices*, 30(8):112–22, Aug. 1995.

Ju, Dz–Ching et al., "The Synthesis of Array Functions and Its Use in Parallel Computation," Proc. 1992 Int'l. Conference on Parallel Processing, pp. II293–II296, 1992.

Kczales, Gregor et al., "Aspect Oriented Programming," Tech. Report SPL97–08 P9710042, Xerox, PARC, 1997.

Neighbors, James, M., "Software Construction Using Components," Ph.D. Dissertation, University of California at Irvine, 1980.

Neighbors, James, M., "The Draco Approach to Constructing Software from Reusable Components," Workshop on Reusability in Programming, Newport, Rhode Island, 1983.

Neighbors, James, M., A Method for Engineering Reusabel Software Systems. In Ted J. Biggerstaff and Alan Perlis (Eds.), *Software Reusability*, Addison–Wesley/ACM Press, 1989.

Ritter, G.X. et al., "Image Algebra: An Overview," *Computer Vision, Graphics, and Image Processing*, 49, 297–331, 1990.

Ritter, G.X., "Image Algebra," University of Florida, 1993.

Ritter, G.X. and Wilson, J.N., Handbook of Computer Vision Algorithms in Image Algebra, CRC Press, 1996.

Bahlke, R. and Snelting, G., "The PSG System: From Formal Language Definitions to Interactive Programming Environments," *ACM Transactions on Programming Languages and Systems*, 8(4):547–76, Oct., 1986.

Ballance, R. et al., "The Pan Language–Based Editing System for Integrated Development Environments," *Sigsoft*, pp. 77–93, Irvine, California, 1990.

Donzeau–Gouge, V. et al., "Programming Environments Based on Structured Editors: The MENTOR Experience," Institute National de Recherche en Informatique et Automatique Rocquencourt, pp. 128–40, France.

Schneiderman, B. et al., Display Strategies for Program Browsing: Concepts and Experiment, *IEEE Software*, pp. 7–15, May, 1986.

Dykes, L. and Cameron, R., "Towards High–Level Editing in Syntax–Based Editors," *Software Engineering Journal*, pp. 237–44, Jul., 1990.

Garlan, D. and Miller, R., "GENOME: An Introductory Programming Environment Based on a Family of Structure Editors," Proceedings of the ACM SIGSOFT/SIGPLAN Software Engineering Symposium on Practical Software Development Environments, Pittsburgh, Pennsylvania, Apr. 23–25, 1984.

Hood, R., "Efficient Abstractions for the Implementation of Structured Editors," ACM, pp. 171–78, Feb., 1985.

Kaiser, G. et al., "A Retrospective on DOSE: An Interpretive Approach to Structure Editor Generation," *Software—Practice and Experience*, 18(8):733–48, Aug., 1988.

Merks, E. et al., "Language Design for Program Manipulation," *IEEE Transactions on Software Engineering*, 18(1):19–32, Jan., 1992.

Minor, S., "Interacting with Structure–Oriented Editors," *Int. J. Man–Machine Studies*, 37:399–418, 1992.

Ohsawa, Yutaka and Sakauchi, Masao, "A New Tree Type Data Structure with Homogeneous Nodes Suitable for a Very Large Spacial Database," $6^{th}$ International Conference, Data Engineering, 1990.

Shasha, Dennis et al., "Pattern, Matching in Unordered Trees," Tools With Artificial Intelligence, Int'l. Conference, *IEEE*, 1992.

Feather, Martin S., "A Survey and Classification of Some Program Transformation Approaches and Techniques," Elsevier Science Publishers B.V. (North Holland), pp. 165–195, 1987.

Kotik, Gordon, B. and Markosian, Lawrence, Z., "Automating Software Analysis and Testing Using a Program Transformation System," Proc. $14^{th}$ Int'l. Comp. Software and Applications Conference, pp. 1–10, 1990.

Bassett, Paul, G., "Frame–Based Software Engineering," *IEEE Software*, pp. 9–16, Jul., 1987.

Neighbors, James M., "The Evolution from Software Components to Domain Analysis," *International Journal of Software Engineering and Knowledge Engineering*, 2(3):325–354, 1992.

"Guidelines for Software Refinery Language Models," Reasoning Systems, Palo Alto, California, 29 pages, May 2, 1991.

Garlan, David et al., "A Transformational Approach to Generating Application–Specific Environments," ACM, pp. 68–77, Dec., 1992.

Snelting, G., "Experiences with the PSG—Programming System Generator," Institut fur Systemarchitektur, Technische Hochschule Darmstadt, pp. 148–162, 1985.

Teitelbaum, Tim and Reps, Thomas, "The Cornell Program Synthesizer: A Syntax–Directed Programming Environment," *Communications of the ACM*, 24(9):563–573, Sep., 1981.

Reps, Thomas and Teitelbaum, Tim, "The Synthesizer Generator," *SIGPLAN Notices*, 19(5):42–48, 198

Habermann, A. Nico and Notkin, David., "Gandalf: Software Development Environments," *IEEE Transactions on Software Engineering*, SE–12(12):1117–1127, 1986.

Reps, Thomas W. and Teitelbaum, Tim, "The Synthesizer Generator Reference Manual," 3d ed., Springer–Verlag, N.Y., pp. 1–10, 54–85, and 90–111, 1985.

Simonyi, Charles, "Intentional Programming—Innovation in the Legacy Ages," Presented at IFIP WG 2.1, Jun. 4, 1996, pp. 1–2, http://at–internet/research/ip/ifipwg.htm. [Accessed Feb. 19, 1997].

* cited by examiner

METHOD AND SYSTEM FOR ANTICIPATORY OPTIMIZATION OF COMPUTER PROGRAMS

TECHNICAL FIELD

The present invention relates generally to a computer method and system for generating a computer program and, more specifically, to a computer method and system for optimizing a computer program.

BACKGROUND OF THE INVENTION

Computer programs are generally written in a high-level programming language (e.g., Pascal and C). A compiler is then used to translate the instructions of the high-level programming language into machine instructions, which can be executed by a computer. The use of high-level programming languages results in dramatically increased program development productivity as compared to programming in either an assembly language or machine language. The increase in program development productivity results from allowing a programmer to use high-level computational constructs rather than low-level computational constructs. Since certain high-level computational constructs (e.g., Fast Fourier Transform) may translate into hundreds of low-level computational constructs, some of the increase in productivity arises directly from the ratio of high-level to low-level computational constructs. A programmer can more quickly specify one high-level computational construct rather than hundreds of low-level computational constructs. Also, a programmer can typically debug a computer program expressed with high-level computational constructs more quickly than the equivalent computer program expressed with low-level computational constructs. The productivity also increases because the intent of the programmer is generally more readily apparent when the computer program is expressed with high-level computational constructs. The identification of the programmer's intent is especially useful to another programmer who later modifies the computer program.

Unfortunately, the code compiled from a computer program developed in a high-level programming language can be much less efficient than the code generated from an equivalent computer program expressed in a low-level programming language. The efficiency of code manually written with low-level computational constructs may result, for example, because some or many of the low-level operations compiled from different high-level operations may be shared so that the compiled low-level operations can be rewoven into different sequences of low-level operations to implement the different high-level operations. Such code reweaving and sharing is, however, very difficult to automate once the high-level operations are compiled into segments of low-level operations. Some of the analyses required to accomplish such reweaving can require deep inferences about the low-level operations that for large segments of compiled code in the context of large programs could take years to complete using an automated reasoning system. On the other hand, a human programmer, given enough time, can always develop code using low-level computational constructs to be as efficient as code compiled from a computer program developed in a high-level programming language. Moreover, the programmer may be able to optimize a computer program developed using low-level computational constructs in ways that are not currently available to a compiler or a post-compilation optimizer. For example, current compilation techniques often generate highly inefficient code to access high-level composite data structures, such as a matrix. Operations on a matrix typically require iterative code (i.e., looping code) that selects and processes each one of the elements of the matrix in each step of the iteration. If several high-level operations on a matrix are combined into single statement and each operation requires selecting and processing each element, the compiled code is likely to include multiple "for" loops that each include a nested "for" loops. For example, to double the value of each element of a matrix and then add the resulting values to the values of the elements of another matrix, the programmer may specify the following statement using high-level computational constructs:

$$A=B+(2*C)$$

where A, B, and C are matrices. When a compiler generates code for this high-level statement, the compiler may generate nested "for" loops to select the element at each row and each column of the C matrix, to multiply the value of the selected element by 2, and to store the doubled values in a temporary matrix. The compiler also generates nested "for" loops to select the element at each row and column of the temporary matrix, to add that value to the value of the corresponding element of the B matrix and to store the sum in another temporary matrix. The compiler generates a third set of nested "for" loops to select the element at each row and column of the temporary matrix and to store the value of that element into the A matrix. The resulting code may be:

```
for i=1,m
  for j=1,n
    temp[i,j]=2*C[i,j]
for i=1,m
  for j=1,n
    temp[i,j]=B[i,j]+temp[i,j]
for i=1,m
  for j=1,n
    A[i,j]=temp[i,j]
```

A programmer, however, using a low-level language would combine these three sets of nested "for" loops into a single set of nested "for" loops. The resulting programmer optimized code would be:

```
for i=1,m
  for j=1,n
    A[i,j]=B[i,j]+(2*C[i,j])
```

Although program optimizers have been developed that attempt to coalesce loops, the optimization techniques generally do a poor job in identifying those portions of the compiled code that lend themselves to coalescing.

If a programming language has high-level computational constructs built into the language, then various optimization techniques can be also built in. For example, since the computational construct "matrix," which is a composite of low-level computational constructs such as integers and integer operations, is built directly into the programming language APL, the loop optimizations described above are easily accomplished by APL. APL compilers can and do use the built-in knowledge of the semantics of matrices and their operations to anticipate the looping inefficiencies and compile directly to the optimized code for known patterns and combinations of high-level operators and high-level composite operands. If, however, such high-level computational constructs are not built into an existing programming language, then they need to be added as extensions to the existing programming language or defined by the programmer. In both cases, the extensions and their optimizations cannot be added to the existing language framework by simply defining the new constructs and their optimizations in terms of existing constructs. These extensions and their optimizations cannot be added primarily because conventional programming languages provide no constructs for expressing how to reweave definitions of high-level operators and data structures for optimizable combinations of those operators and data structures. Of course, the programmer can define to the compiler high-level composite data structures like images, for example, in terms of matrix-like data structures composed with other data structures (e.g., C like structs) that are native to the target compiler (e.g., C). Further, the programmer can define how each individual composite data structure and their operators are to be compiled individually (e.g., the "*" operator used in the context of "(constant * matrix)" type expression should compile into two nested loops over the matrix). However, the programmer has no way to tell the compiler how to reweave the code of several such individual definitions composed together in an expression in order to share the low-level operations for the particular composition.

It would be desirable to have a general method for a programmer to define such optimization rules for reweaving the definitions of high-level (i.e., composite) data structures and their operators when the multiple high-level operators and their high-level data structures are used together in optimizable patterns or combinations. It would further be desirable that the optimization method behave like a compiler definition generated on-demand for some specific combination of operators and operands that directly compiles the rewoven, optimized low-level code without ever producing the separate segments of uncombined low-level code for each definition of the individual high-level operators and operands.

SUMMARY OF THE INVENTION

The present invention provides an Anticipatory Optimization method and system for programmer-defined optimization rules that can be applied when generating a low-level implementation of computer program from a high-level implementation of a computer program. The system provides a mechanism for user-defined transforms for annotating the high-level implementation of the computer program with optimization tags; for redefining those high-level operators, operands, and tags; and for combining those high-level operators, operands, and tags such that the individual low-level operations eventually compiled for each of the high-level operators and operands are shared so as to improve performance. The optimization tags indicate optimizations that may be applicable when generating the low-level implementation of the computer program. For each high-level computational construct of the high-level implementation of the computer program, the system applies those transforms that are applicable to the high-level computational construct so that annotations indicating various optimizations can be added to the high-level computation construct. The system then generates the low-level implementation in accordance with the indicated optimizations.

In one embodiment, the high-level computational constructs are user-defined, domain-specific computational constructs and the low-level computational constructs are programming-language-defined computational constructs. The system generates an abstract syntax tree (AST) representation of the program. The AST has nodes representing the computational constructs of the program. For each AST pattern of user-defined, domain-specific computational constructs, the system determines whether a user-defined, domain-specific transform has been defined for the pattern. A transform transforms a portion of the AST relating to the pattern of user-defined, domain-specific computational constructs into one or more programming-language-defined computational constructs. When a domain-specific transform has been defined for the pattern of computational constructs, the system transforms the AST in accordance with the domain-specific transform. The transformed AST is in a form that reflects an optimization of the programming-language-defined computational constructs based on the domain-specific computational constructs.

DETAILED DESCRIPTION OF THE INVENTION

Figure 1A:
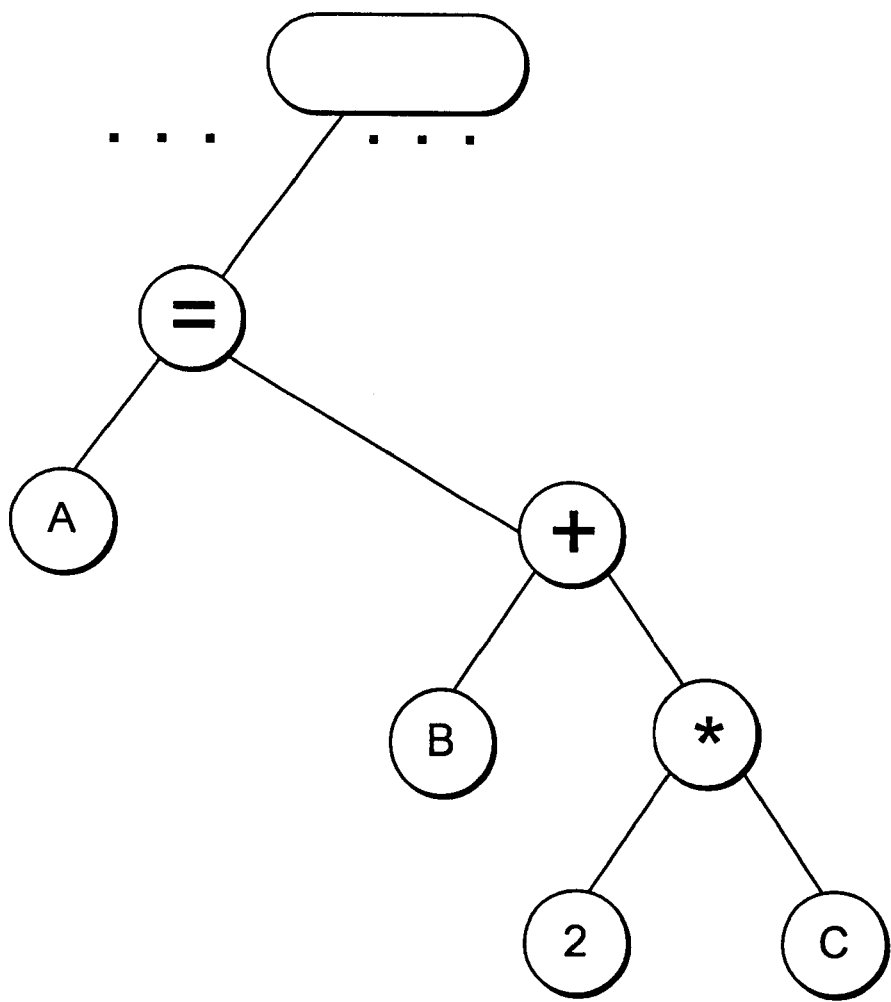
FIGS. 1A–1D illustrate the application of transforms to the portion of the AST representing the sample statement.

The present invention provides a method and system for anticipatory optimization of computer programs. In a preferred embodiment, the anticipatory optimization ("AO") system performs a multi-phase processing of an abstract syntax tree ("AST") representation of a computer program that is expressed using high-level computational constructs. In one phase, the AO system identifies portions of the AST whose corresponding low-level computational constructs (e.g., machine instructions) may potentially be optimized. The AO system "anticipates" the optimizations by storing indications of various optimizations that are potentially applicable to portions of the AST. The AO system is developed with knowledge of the meaning of the high-level computational constructs and identifies the optimizations that are potentially applicable when translating to low-level computational constructs. In a subsequent phase, the AO system translates the high-level computational constructs into low-level computational constructs that are optimized in accordance with the anticipated optimizations.

The AO system is extensible in the sense that when new high-level computational constructs are defined, new optimizations can also be defined that apply to the newly defined high-level computational constructs without modifying the AO system. New high-level computational constructs are preferably defined using the Intentional Programming ("IP") system described in U.S. patent application Ser. No. 08/431,049, entitled "Method and System for Generating a Computer Program," which is hereby incorporated by reference. According to the IP system, new high-level computational constructs can be defined by a programmer without modification to the IP system. For example, a new operator to multiply two matrices can be defined and used in programs without modification to the IP system. The IP system stores a computer program as a tree of operators and operands (i.e., an IP tree). The AO system allows a programmer to define various transforms for transforming an IP tree, and more generally an AST, into a tree that facilitates the implementation of various optimizations. A transform is a program module that inputs a portion of an AST, determines whether it should be applied to the portion, and, if so, effects its application. Once a tree representation of the program expressed using high-level computational constructs is generated, the AO system attempts to apply transforms to various portions of the tree. The transforms may modify portions of the tree or may add optimization tags to the tree to identify potential optimizations. The optimization tags are annotations that provide information derived from knowledge of the semantics and syntax of high-level computational constructs that may be useful when translating into low-level computational constructs. The optimization tags generally provide information that would be difficult for a post-compilation optimizer to derive.

The processing of a sample statement expressed using high-level computational constructs will help illustrate the functionality of the AO system. The sample statement expressed using high-level computational constructs is:

$A=B+(2*C)$

FIGS. 1A–1D illustrate the application of transforms to the portion of the AST representing the sample statement. FIG. 1A illustrates the portion before application of any transforms. The operands A, B, and C are matrices that are high-level computational constructs in the sense that there is no low-level computational construct corresponding to a matrix. Rather, a matrix is conceptually a composition of low-level computational constructs, such as integers. Similarly, the operators "=," "+," and "*" are matrix operators that are high-level computational constructs with no corresponding low-level computational construct. Rather, the behaviors of the matrix operators are implemented using low-level computational constructs such as integer addition. Transforms have been defined that when applied to a tree representation will add optimization tags that identify matrix operators and matrix operands. These optimization tags allow further transforms to be applied to further identify optimizations. The goal of these transforms is to identify iterations that are needed to access the elements of a matrix and to identify when these iterations can be coalesced into a single iteration control statement. When the code for the same statement is generated, the optimization tags will indicate that a single iteration control statement can be used for this sample statement. If anticipatory optimization was not used, then as described in the background three separate sets of nested "for" loops may be used to implement this sample statement. Further, if anticipatory optimization is not used, loop coalescing via conventional optimization technology is possible but requires two extra steps. The first step generates the three separate loops, and the second step involving a complex analysis of the three loops to determine data flow, data dependencies, and aliasing information (i.e., different names and expressions that reference the same data). Only then can the coalesced loop be generated and only if the analysis was successful (which it may not have been). In contrast, the AO system produces one coalesced loop directly without actually having to generate the three loops in the first place and therefore, without the difficult intervening analysis step. It performs this direct generation of the coalesced loop based only on knowledge of the high-level operators and the optimization tags that incorporate the "implied" data flow and data dependency information. There is no aliasing information because the method inherently prevents aliasing from occurring. Creation of the tags makes the flow and dependency information implied by the high-level operators and operands explicit. The optimization tags are directly, incrementally, and simply built up by separate transformations that record, migrate, and merge the implied data flow and data dependency information as a part of the information useful to the anticipatory optimization process.

The AO system processes an AST by visiting the nodes in a depth-first, left-to-right traversal. In the general case, there may be multiple passes over the AST transforming high-level, domain operators and operands into successively lower-level operators and operands and eventually into programming-language operators and operands. For example, database operators and operands might be transformed into relational algebra operators and operands, which are then transformed into abstract data type operators and operands before finally being transformed into C code. If a given pass over a subtree of the AST produces operators and operands that need further transformation, the subtree will be flagged as incompletely transformed, which will cause it to be scheduled for further transformation. In the following, to keep the examples simple, operators, operands, and transformations are used that can complete their translation work in one pass of the AST.

Figure 1B:
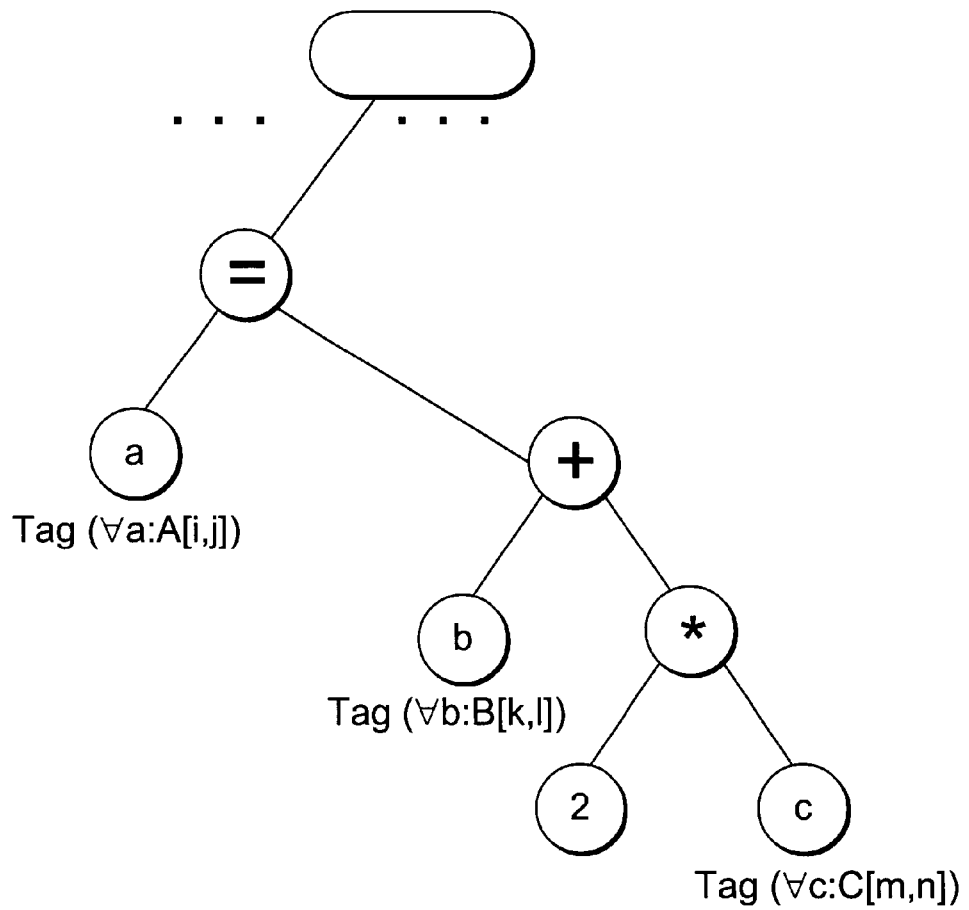
Figure 1C:
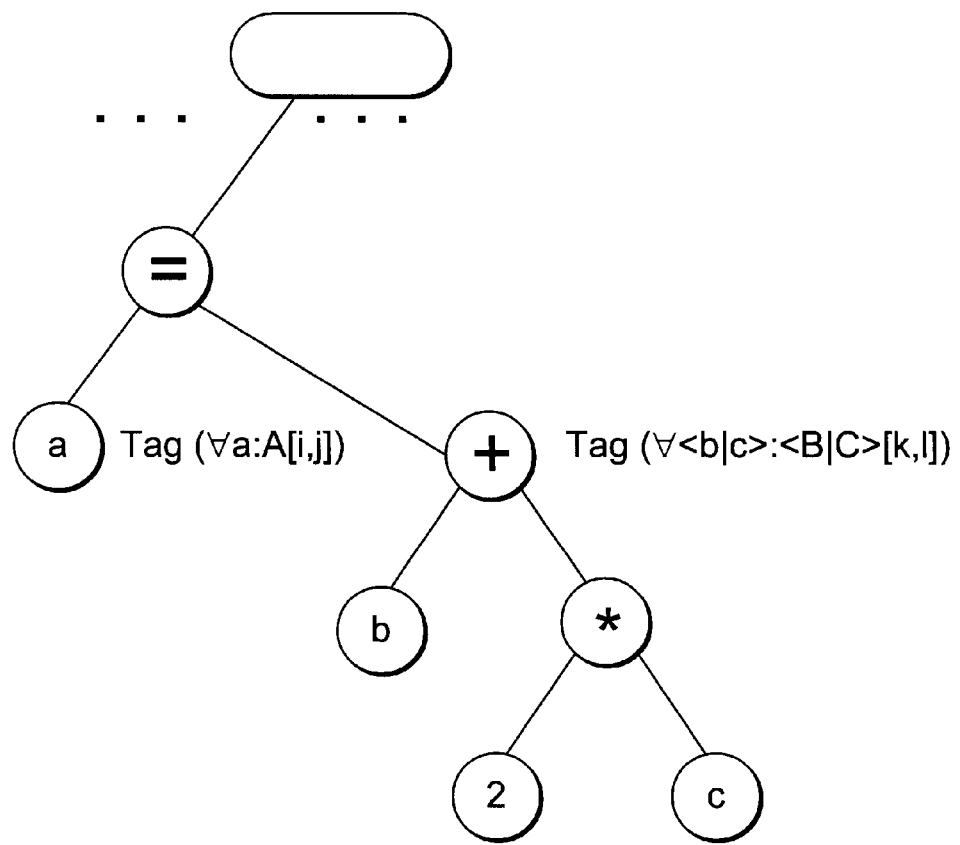
Figure 1D:
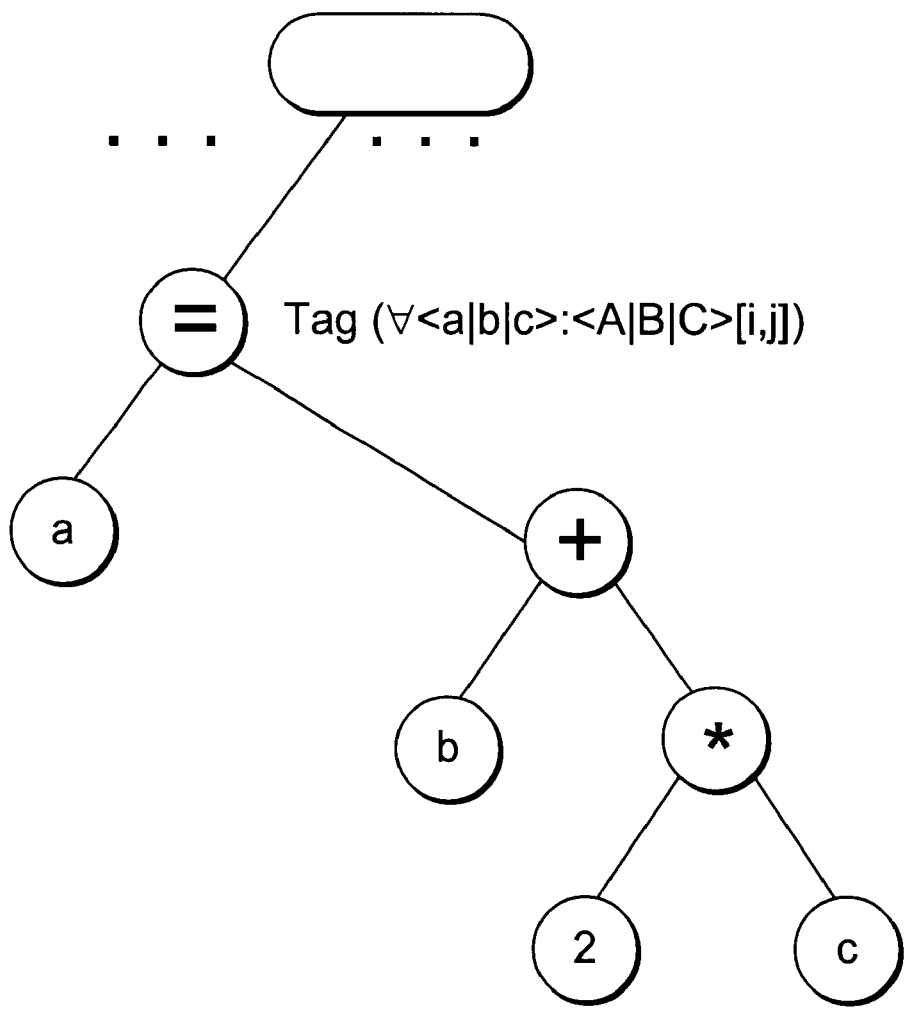

Using such a traversal technique, the AO system first visits the node for operand A. Since operand A is a high-level computational construct that is a matrix, a transform applies that replaces the node and adds an optimization tag to the replaced node. The replaced node contains a reference to an operand of iteration with a system-generated name. For each step of the iteration, the operand of iteration takes on the value of each element of the matrix. The operand of iteration thus has the same type as the elements of the matrix. The optimization tag maps the operand of iteration to the operand A and indicates that two nested "for" loops with separate index variables need to be used to access the elements of the matrix at each step. The AO system then visits nodes for operands B, 2, and C. The same transform is applied to the nodes for operands B and C, since both operands represent matrix data structures. Thus, similar replacement nodes and optimization tags are applied to the nodes for operands B and C. FIG. 1B illustrates the replaced nodes with their tags. The operands of iteration are shown in lower case letters. The tag "∀a:A[i,j]" indicates that the operand a of iteration represents access to the elements of matrix A and that nested "for" loops (i.e., ∀) using index variables i and j are used to access each element of matrix A. After visiting the node for operand C, the AO system visits the node for operator "*." The AO system applies a transform that recognizes the tag on the node for operand c, the operator "*," and the constant operand value. The transform moves the optimization tag from node for operand c to the node for operator "*," since the expression "2*C" needs to be within the nested iterations. The transform to move the optimization tag was developed in anticipation that the iteration to access the elements of a matrix could be coalesced with another iteration at a higher point in the tree. After visiting the node for operator "*," the AO system visits node for operator "+." The AO system applies a transform that recognizes the operator "+" and the two operand odes with tags relating to "for" loops to access matrices. The transform removes both tags and adds a coalesced tag to the node for operator "+." The coalesced tag is "∀<b|c>:<B|C>[k, 1]." The "<b|c>" field and the "<B|C>" field indicate that b is the operand of iteration for matrix B and c is the operand of iteration for matrix C. Since the same index variables can be used to access both matrix B and C, the transform selects the index variables k and l to index both matrices. FIG. 1C illustrates the coalescing and migrating of the optimization tag to the node for operator "+." The AO system then visits the node for operator "=." The AO system applies a transform that recognizes the optimization tags of the nodes for operand a and operator "+" can be coalesced to indicate a single iteration with the same indexes. Thus, an optimization tag is placed on the node for operator "=." FIG. 1D illustrates the migration of the optimization tag to node for operator "=." The optimization tag on the node for operator "=" indicates that the iteration for each of the matrices of the statement can be controlled at the statement level by a single iteration control statement. Each of the elements of matrices can be accessed using the index variables i and j. When the AO system generates the low-level implementation (e.g., generates machine instructions) of this statement using another transform, the AO system recognizes the optimization tag and generates an implementation of the iteration at the statement level with the proper indexing for the variables A, B, and C.

Figure 2:
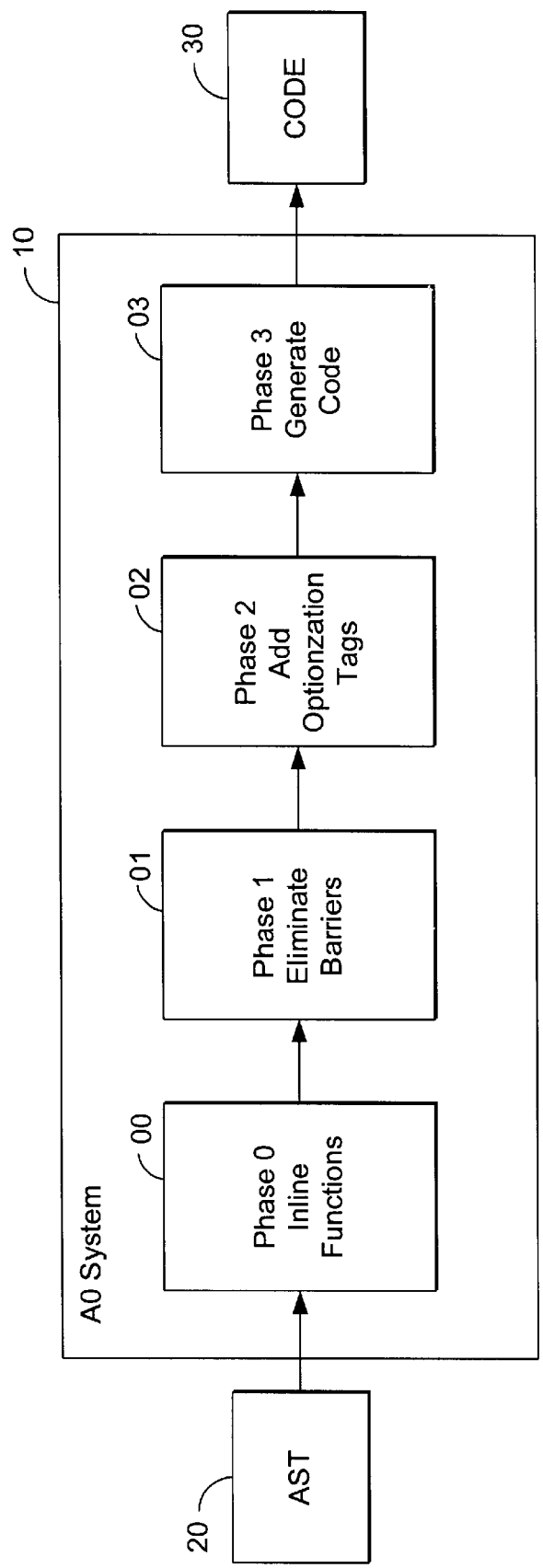
FIG. 2 is a block diagram illustrating the components of the AO system.

FIG. 2 is a block diagram illustrating the components of the AO system. The four components of the AO system 210 are the Inline Functions component 200, the Eliminate Barriers component 201, the Add Optimization Tags component 202, and the Generate Code component 203. The AO system inputs an AST 220 and outputs generated code 230. The components execute on a computer system with a central processing unit and memory. The components are preferably loaded from a computer-readable medium (e.g., CD-ROM) into memory. Each of the components correspond to phases 0–3 of the AO system. The InLine Function component corresponds to phase 0 and determines whether any portion of the AST invokes a function that may result in greater optimization if that function was expressed inline rather than invoked. For example, if a function were defined that multiplied each element of a matrix by 2, then it could be invoked to replace the expression "2*C" in the sample statement. However, when optimizing, the iteration within the function could not easily be combined with an iteration outside the function. The Inline function component identifies such functions that can be advantageously placed inline and places them inline. The Eliminate Barriers component corresponds to phase 1 and determines whether any portion of the AST could be restructured to improve the chance of optimizing. For example, consider the graphics imaging domain in which images are represented by matrix-like data structures containing one record per pixel in the image. For simplicity but without loss of generality, this example is restricted to gray scale images in which the pixel records are simple integers ranging from zero (white) to some upper limit (black), with all intervening integers representing varying shades of gray. The images can be operated on by a backward convolution operator (i.e., "⊕") which generates an output image by arithmetic summations of a pixel's neighborhood in an input image to compute the corresponding pixel in the output image. More specifically, a particular example convolution operation on an image matrix might generate an output image matrix in which each element of the output image matrix is set to a weighted average of the eight neighboring elements (or fewer neighboring elements in the case of border elements) of the corresponding pixel in the input image. Thus, to generate the value of an element of the output image matrix, the values of the corresponding pixel in the input image matrix and all of its neighboring elements need to be known. However, if the input image matrix is expressed as the sum of two image matrices to which a convolution operator (i.e., "⊕") is then applied in a single statement (e.g., C=(A+B)⊕T), then an iteration to access image matrices A and B cannot be combined, or at least not in a straightforward manner, with the iteration to access image matrix C. The matrix T is a template which provides the weight to be assigned to the neighboring elements when calculating the average. For simplicity it can be assumed to be a 3×3 matrix with each weight equal to 1. In this example, the Eliminate Barriers component would move the expression "A+B" outside of the statement, use a temporary image matrix variable to hold the result of the expression, and substitute the temporary image matrix variable into the statement. The Add Optimization Tags component corresponds to phase 2 and adds optimizing tags, replaces operands as appropriate, and coalesces and migrates the optimization tags. The Code Generation component corresponds to phase 3 and generates the code for the AST based on the optimization tags.

The transforms can be identified with a specific problem domain and phase. When a new high-level computational construct is defined, it is applicable to a specific problem domain. For example, the transforms described above that add, coalesce, and migrate optimization tags relating to iterations are applicable to the domain of image matrix operations. The definitions of the domain-specific data structures and their operators are defined in a type hierarchy that may be supplied by and/or extended by the user. These definitions drive the transformation-based compilation of the target program that is written in terms of those domain-specific data structures and operators. The type hierarchy is an AST containing one node for each type or operator with associated values (i.e., subtrees) that define those domain-specific types and operators. Each node that defines some operator or operand is marked with a specific domain marker or if not so marked, will inherit the domain marker of one of its ancestor node. The domain marker will restrict the transformations that can apply to instances of it occurring in the user's target program. Additionally, the definition of the types and operators may contain AST patterns that help to disambiguate overloaded operators. For example, the "=" operator in the statement "A=B+(2*C)" might be an integer assignment operator, a floating point assignment operator, or a matrix assignment operator. However, the pattern associated with the matrix assignment operator eliminates all other assignment operators because of the types of its operands (i.e., the types of A and the expression (B+(2*C)) are both "matrix"). Hence, only transformations that apply to the matrix assignment operator will apply in this case. If the types of the arguments were instead "image matrix," then any transformations on the "=" operator associated with the image domain would apply first and failing that, transformations on the = operator associated with the more general matrix domain would apply. Thus, transformations are inherited, starting with the more specific domains and failing there, then moving to the more general domains.

Figure 3:
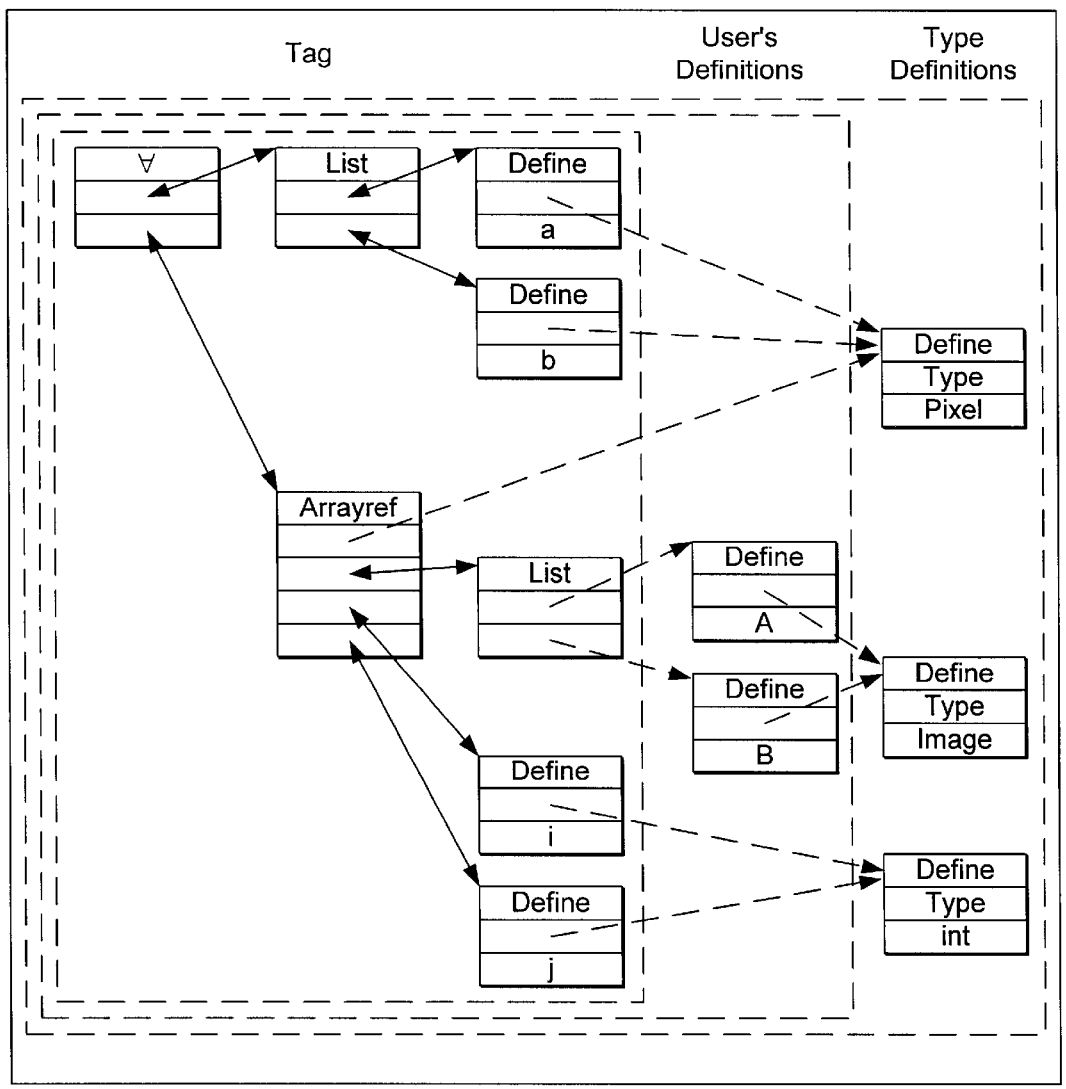
FIG. 3 represents a sample data structure representing an optimization tag.

The syntax and semantics of the optimization tags can be defined by the developer of the transforms that process the optimization tags and can be tailored to their specific domain. The tags can be represented as an expression (e.g., "∀a:A[i,j]") that may need to be parsed or as a data structure in which parsing is not needed. FIG. 3 represents a sample data structure representing an optimization tag. By using complex data structures, the transforms can avoid parsing that may be necessary to interpret an optimization tag. The organization and adding of tag is preferably consistent with the data structures used by the IP system. In the following, optimization tags relating to high-level computational constructs in the domain of image processing are described. An image is represented by a matrix in which each element is an integer that represents a pixel. An integer value represents the gray-scale intensity of the pixel. The high-level computational construct of type image and pixel are defined.

A quantifier tag is used to add information relating to various type of iterations (e.g., "for" loop and "repeat/until" loop). A quantifier tag has the following form:

_Q(expression)

where expression is a description of an iteration and the operands for the iteration. The expression for a "forall" loop has the following form:

∀p:(prototype:type)

where the symbol ∀ indicates that the iteration is a "forall" loop, where the symbol p identifies the abstract operand of iteration, where the prototype indicates the implementation relationship between the abstract operand p of iteration and the anticipated implementation form of the container (e.g., of the image) from which each value of p (i.e., the abstract operand of iteration) is chosen, and where the type indicates the type (e.g., pixel) of the abstract operand of iteration. The prototype identifies the container implementation and the anticipated index implementation variables for accessing the container. For example, the prototype may have the form:

A [i:int,j:int]

where symbol A identifies the implementation form of the image (ie., a matrix), where symbols i and j identify the index implementation variables, and the symbol int identifies that the type of the index implementation variables is integer.

The following quantifier tag indicates a "forall" loop to access all pixels a of matrix A using index variables i and j:

_Q(∀a:(A [i:int,j:int]:pixel))

The operands of iteration and the containers in a quantifier tag may be represented as tuples shown as:

<a|b> or <A|B>

Such tuples indicate that in the generated code for operands of iteration a and b can be accessed by a single iteration. For example, in the following quantifier tag, operands of iteration a and b specify iterating over pixels in the images A and B, respectively, within the iteration whose index variables are i and j.

_Q(∀<a|b>:(<A|B>[i:int, j:int]:pixel))

This quantifier tag is generated by coalescing the quantifier tags

_Q(∀a:(A[i:int,j:int]:pixel))

_Q(∀b:(B[k:int,l:int]:pixel))

in a statement that may be "A=2*B." The code generated based on this quantifier tag is for $i=1,m$ for $j=1,n$ $A[i,j]=2*B[i,j]$ User-defined modifiers can be added to a quantifier tag or to individual elements within a quantifier tag. These modifiers act as hints when generating code to produce variations or optimizations in the final code that may have been recognized by previously applied transforms in the course of their application. For example, if an operator (e.g., convolution) is embedded within an expression that is tagged such that one or more iterations will eventually be generated and wrapped around the expression, then the embedded operator will often generate expressions that are known (by the transform processing the embedded operator) to be promotable outside of an iteration. The transform can designate the promotable statement or statements in a modifier that extends the quantifier tag that defines the iteration. This would extend the quantifier tag to have a form such as:

_Q(∀<a|b>:(<A|B>[i:int,j:int]:pixel),_PromoteAboveLoop(j,ConstantExpressionOf(i)))

which would cause a transform applied in the code generation phase to invoke a transform named "_PromoteAboveLoop" to effect the promotion after the inner "for" loop is generated of any expression that involves only constants and the variable i. This transform creates a temporary variable, say im1; generates a statement that assigns the constant expression involving i to im1; and promotes (i.e., places) that statement outside and just preceding the loop whose iteration index is j. All instances of that exact constant expression of i used within the loop whose iteration variable is j are replaced by the newly-created temporary variable im1. For example, the neighborhood in and around pixel A[i,j] contains three pixels each of the forms A[i−1,__], A[i,__], and A[i+1, ] which after the promotion will have the respective forms A[im1,__], A[i,__], and A[ip1, __], where im1 and ip1 are the two temporary variables created by the transform __PromoteAboveLoop. This eliminates two computations for each of the expressions (i−1) and (i+1). The modifier mechanism defers, until code generation time, any commitment to the exact name and form of the temporary implementation variables (e.g., im1 and jm1) and to the details and exact location of the promoted statements. By this mechanism, the complexity of the transforms that do the main anticipatory optimization (i.e., the Add Optimization Tags component 202) is significantly simplified. The transforms do not have to contend with detailed implementation variations that are irrelevant to their main function. In the example, the transform promotes the statement "im1=i−1" above the iteration for index variable j.

Modifiers may also be used to broaden the applicability of the transformation rules. For example, the matrices used as operands of an operator in an expression may not be the same size or shape, in which case, the operators by implication may apply to only parts of the matrices. In such a case, the code generator generates "if-then-else" statements that provide the case logic for operating on the various sections of the matrices. Modifiers provide a technique for keeping track of the conditions within that case logic and for defining the various ranges for the overlapping and non-overlapping portions of the operands. Of course, the exact information needed in these modifiers is determined by the semantics of the high-level data structures and operators. An example of such a modifier is:

__Case(=(a,0) when (<(jmax(range(k)))))

In other words, some element a, which might eventually be represented in low-level code as A[i,j], has a value of zero whenever its index j is greater than the maximum of the range of some related index k. There may be other case modifiers for values of j that do not meet this condition which define the behavior for those areas of the matrices. If not, the default behavior is defined by the expression of the high-level operators. In short, the exact way in which special case logic arises is dependent on the semantics of the high-level data structures and operators and is defined by a set of transforms that express that logic. The AO system does not, however, inherently restrict such semantic variations.

Modifiers may also be used to associate anticipated optimizations with specific, user-defined optimization events. These are called Event-Driven Modifiers. Event-Driven Modifiers have the form __On(EVENTNAME, MODIFIEREXPRESSION)

These are like interrupts in the AO transformation domain. Whenever the named optimization event occurs, the transformation MODIFIEREXPRESSION is triggered. For example, if the Event-Driven Modifier __On(SubstitutionOfMe,__Fold0)

is attached to a zero data value, then the transformation __Fold0 would be invoked any time some transformation substituted that specific tagged zero for some other construct within an expression. Suppose that tagged 0 was substituted for "x" in the expression (a+x)

producing the expression (a+0__On(SubstitutionOfMe,__Fold0)).

Upon completion of the substitution operation, __Fold0 will be triggered and apply one of its many built-in transforms. In this case, it will apply the transform ($X+0)→$X (i.e., anything plus zero may be represented as anything) which will result in the expression being simplified to just a.

This allows the transformation programmer to embed anticipated optimizations in code fragments that may be stored in a reusable component library. Event-Driven Modifiers eliminate the open-ended searches that would be required using conventional optimization techniques for such jobs as (but not limited to) promoting a conditional expression outside of a loop once the conditional expression generation step is completed, merging "if-then-else" statements that share common conditional expressions once all possible such if-then-else statements have been generated, unwrapping or peeling loops once code generation has created all loops of a particular kind, and so forth. Event-Driven Modifiers associate a specific AO transformation with a specific event time for its execution and with a specific piece of target code upon which it is to focus its operation. By contrast, conventional optimization strategies would produce such associations through an open-ended search over a large space of possible transforms, over a large set of possible invocation times, and over the whole of the target program at each point in its evolution. In other words, the search space of conventional optimization strategies is large leading to large and often infeasible amounts of search time.

The transformation writer can create an unlimited variety of events such as WrapUp, EndOfWrapUp, AfterUnWrap, etc. If several Event-Driven Modifiers are triggered by the same event such as WrapUp and they need to be executed in a particular order, the events may have arguments with numbers that indicate the order of modifier transformation invocation. An example of such event specifications would be WrapUp(1), WrapUp(2), WrapUp(3), and so forth.

Figure 4A:
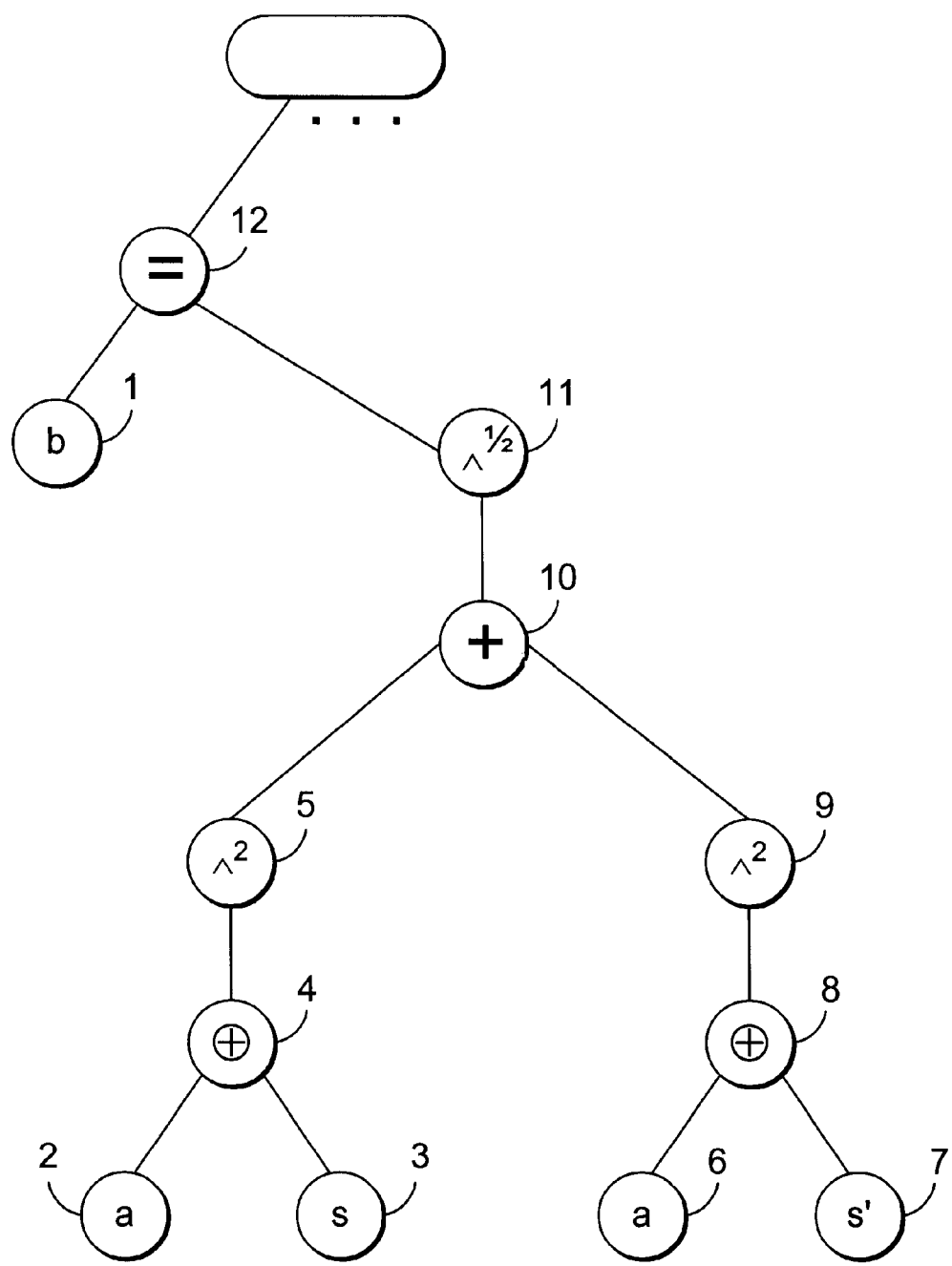
FIGS. 4A–4I illustrate a detailed example of anticipatory optimization for the domain of image processing.

FIGS. 4A–4I illustrate a detailed example of anticipatory optimization for the domain of image processing. FIG. 4A illustrates a portion of the AST corresponding to the following high-level statement.

$$b = [(a \oplus s)^2 + (a \oplus s')^2]^{1/2}$$

The variable a represents an image and is of type image; the variable s represents template matrix, which in this example is a 3×3 matrix; and the variable b is an image into which the result is stored. The operator "$\oplus$" is the backward convolution operator that applies a template to each pixel within the image. The operator "+" is the image addition operator that indicates to add corresponding elements of an image. The operators "$2$" and "$1/2$" take each pixel of the image to the specified power. The convolution operator indicates that each pixel in the resulting image is a sum of the neighborhood of pixels around the corresponding pixel in the input image times the weights in the 3×3 convolution matrix. This neighborhood is defined by that 3×3 convolution matrix, and the 3×3 convolution matrix is defined by the right hand operand of the $\oplus$ operator (e.g., the templates s or s'). Sample values for the template matrix s and s' are $$s = \begin{bmatrix} -1 & \emptyset & 1 \\ -2 & \diamond & 2 \\ -1 & \emptyset & 1 \end{bmatrix}$$

and $$s' = \begin{bmatrix} -1 & -2 & -1 \\ \emptyset & \diamond & \emptyset \\ 1 & 2 & 1 \end{bmatrix}$$

These template matrices perform a Sobel edge detection operation in an image, which produces an image with edge segments emphasized and areas of constant texture removed. The constants are weights to be multiplied with the pixels to which they correspond for each specific placement of the diamond on a pixel in an image A. For each such positioning of the diamond (i.e., "566") on a pixel in A, the semantics of the convolution operator (i.e., "$\oplus$") define the formula for computing the pixel corresponding to the diamond pixel in the resulting image. Since the diamond elements of the template matrices show no numerical value in them, the image pixels corresponding to them do not contribute to the convolution computation for each positioning. Similarly, the null symbols (i.e., "$\emptyset$") indicate that the pixels that correspond to these elements on each positioning of the template also do not participate in the convolution computation.

Figure 4B:
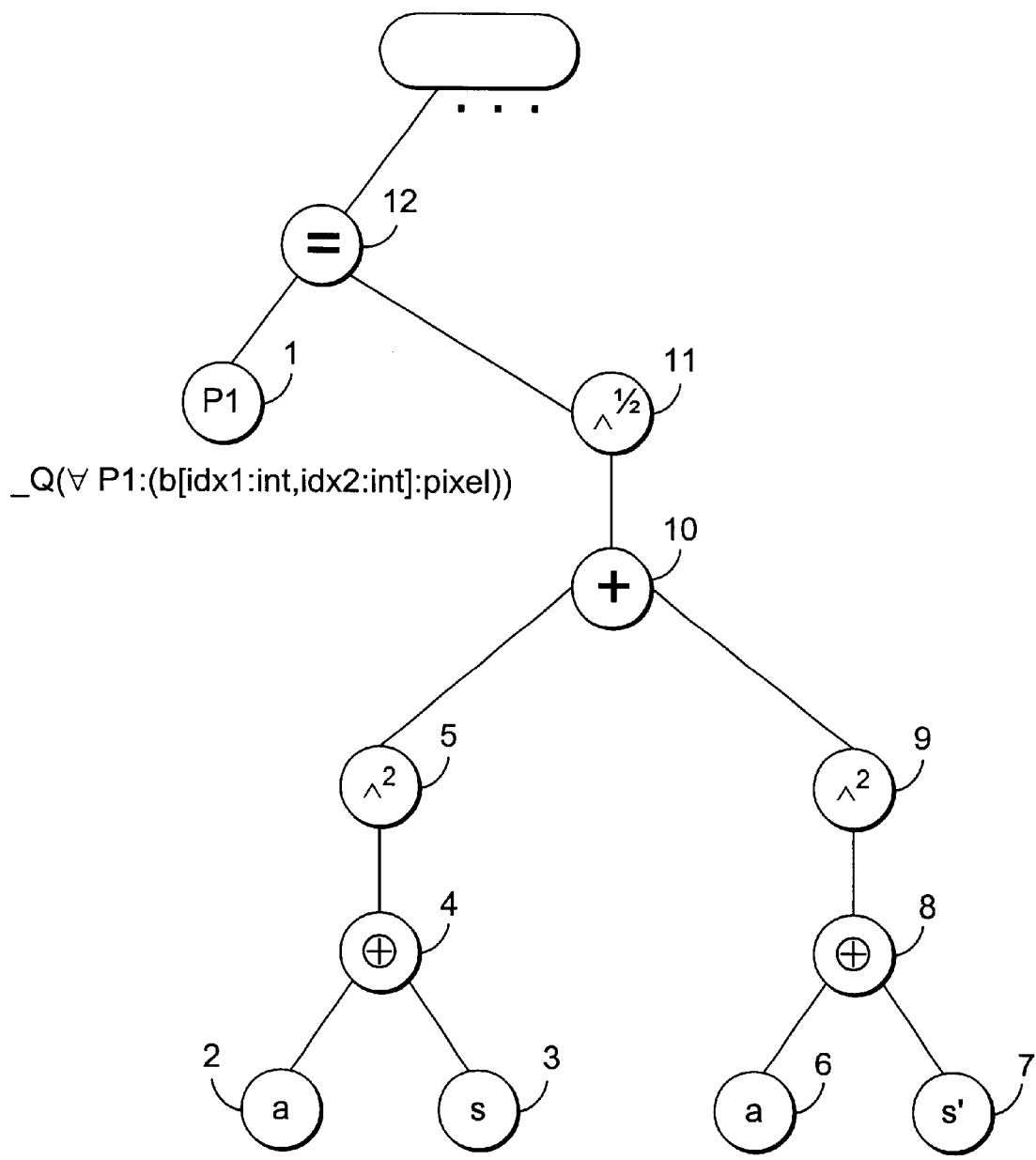

As described above, the AO system processes the nodes of the AST in a depth-first, left-to-right manner. As each node is processed, the AO system attempts to apply the transforms. The first node processed is leaf node 401. FIG. 4B illustrates the AST after the AO system has processed leaf node 401. Since the type of variable b is image, the transform replaces node 401 with a node that contains a reference to an AO system generated iteration operand p1 and adds the quantifier tag:

_Q($\forall$p1 :(b[idx1:int, idx2:int]:pixel))

Figure 4C:
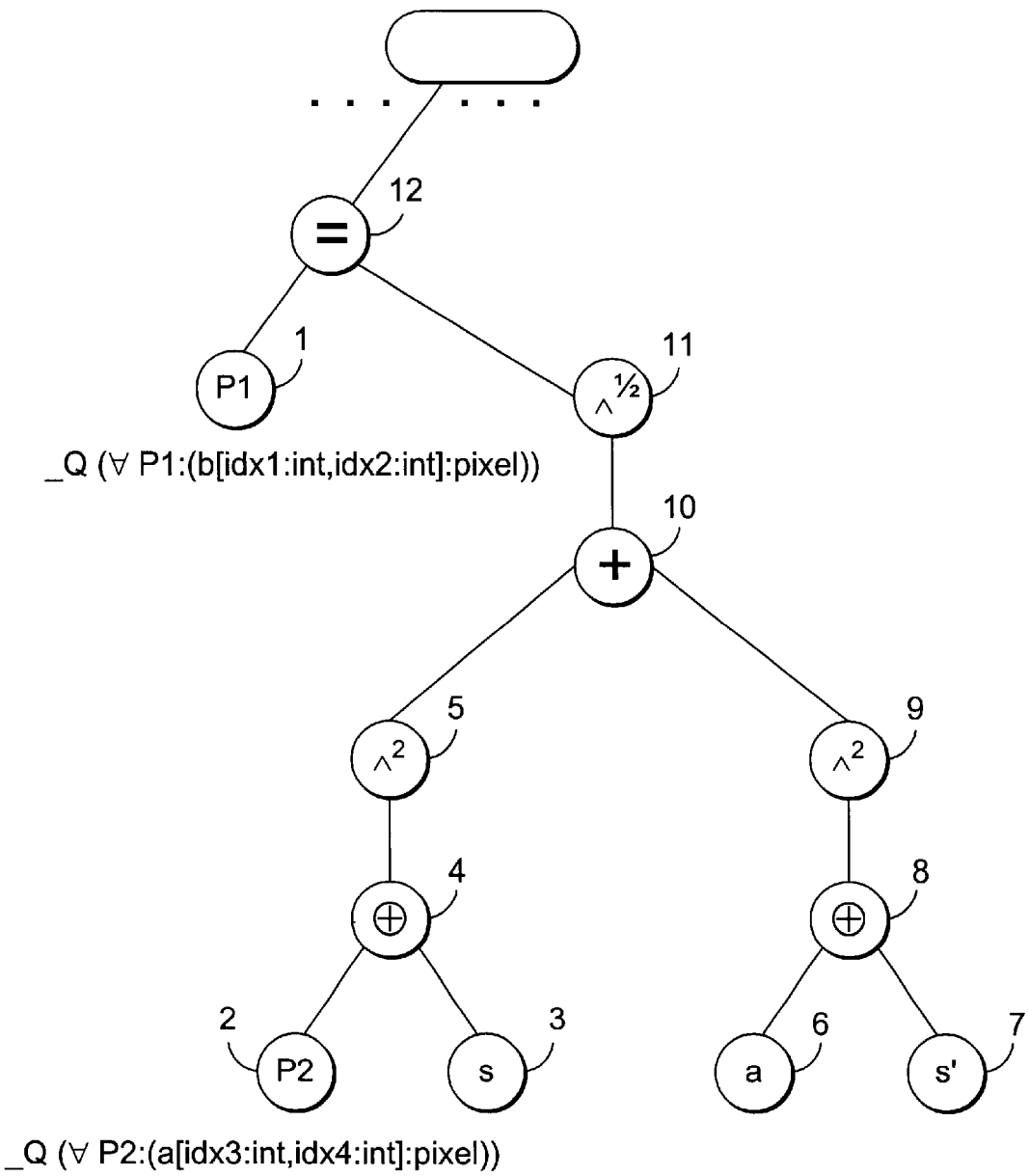

This quantifier tag indicates that iteration operand p1 is a pixel type that should be replaced at code generation time with a reference to image b indexed by variables idx1 and idx2. The next node processed is node 402. FIG. 4C illustrates the AST after the AO system has processed leaf node 402. Since the type of variable a is image, the transform replaces node 402 with a node that contains a reference to an AO system generated iteration operand p2 and adds the quantifier tag:

_Q($\forall$p2:(a[idx3:int,idx4:int]:pixel)

Figure 4D:
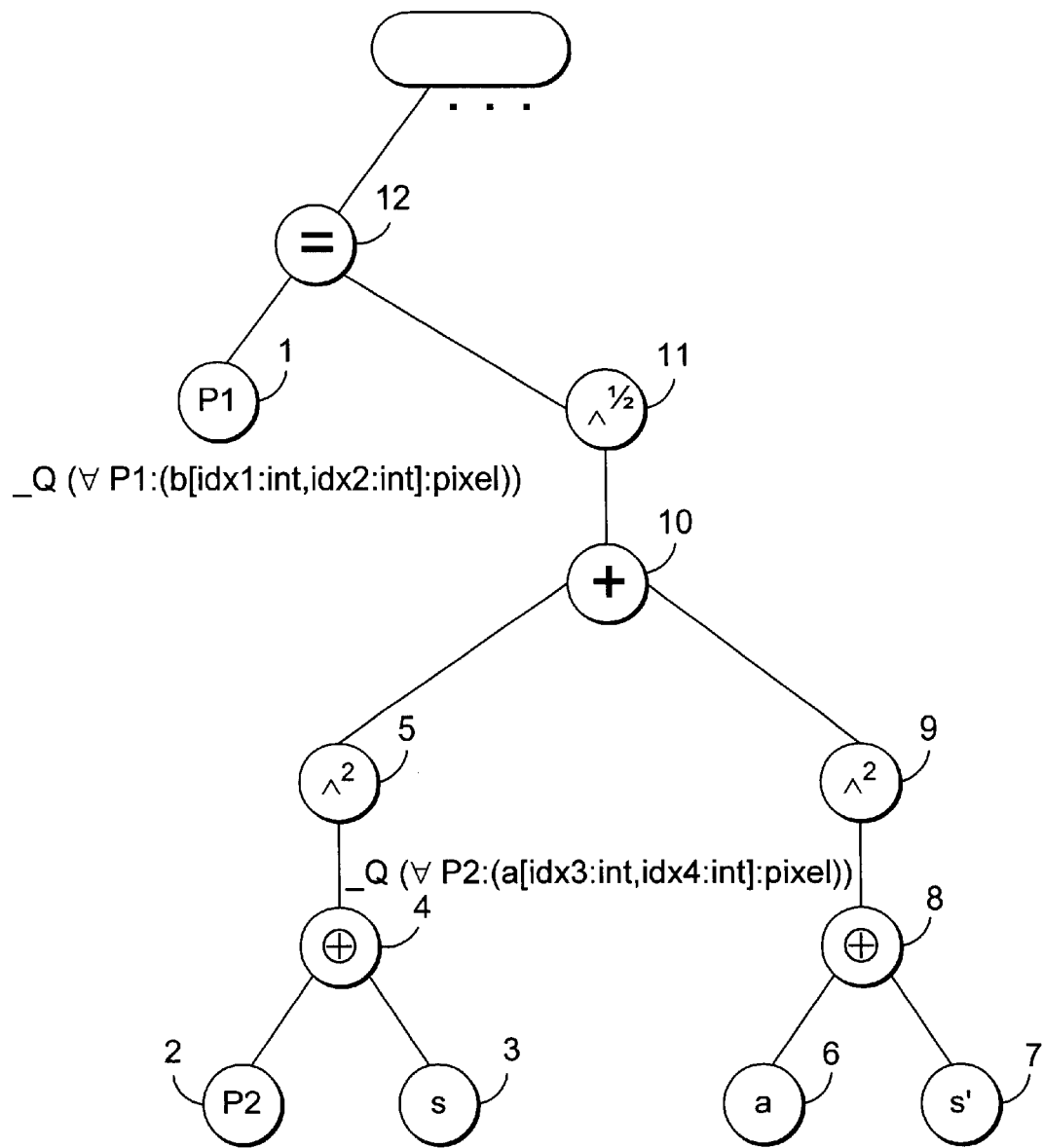
Figure 4E:
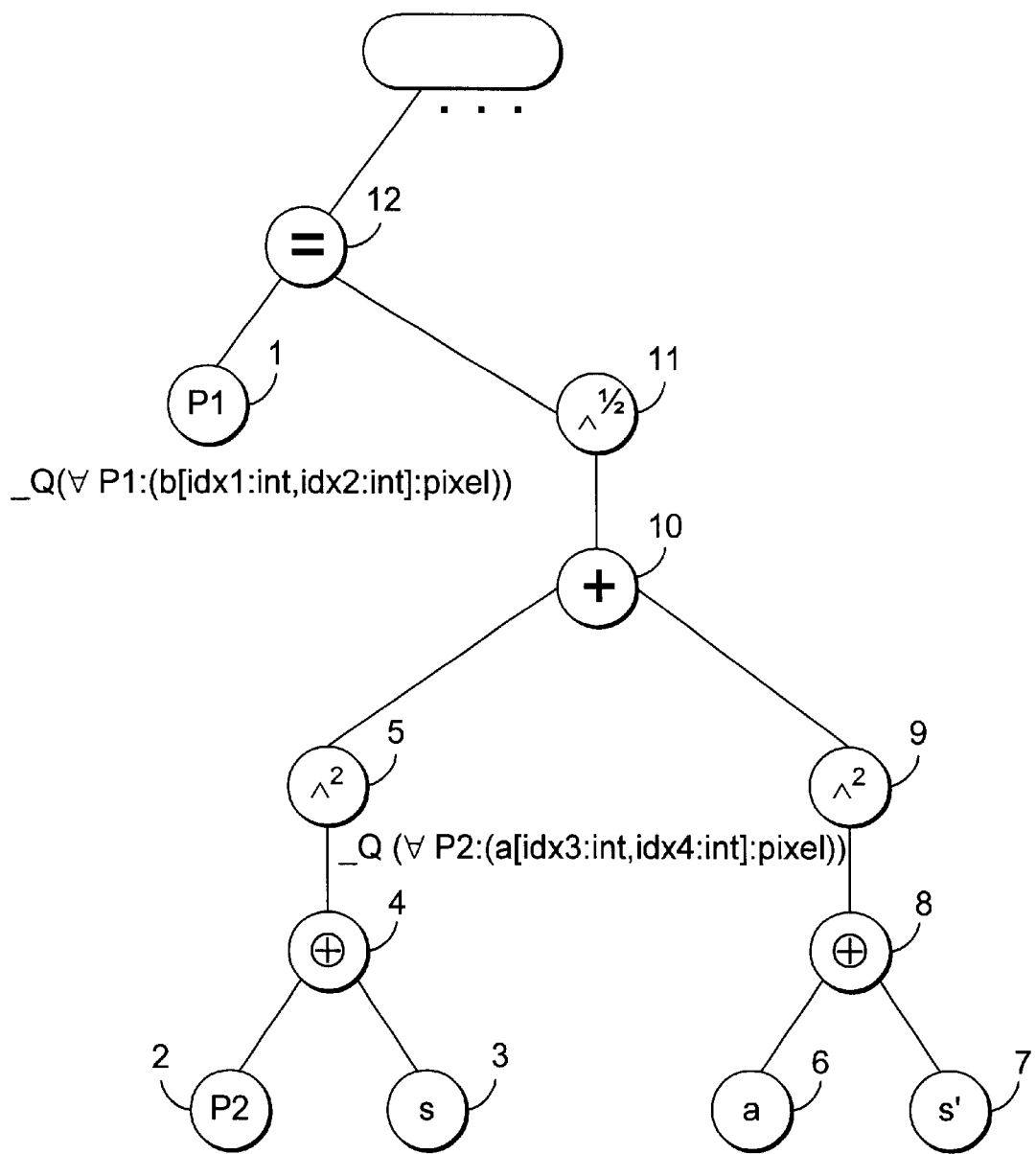
Figure 4F:
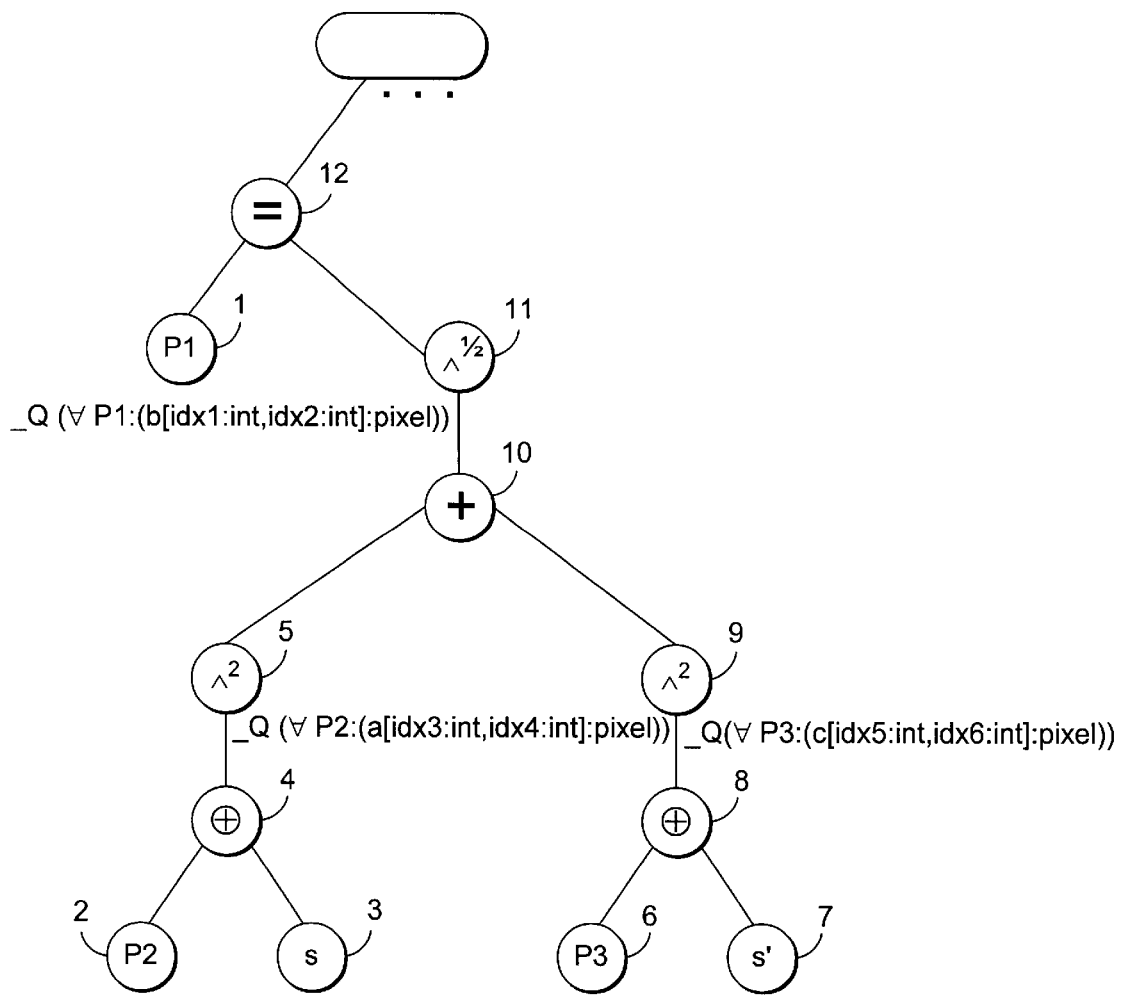
Figure 4G:
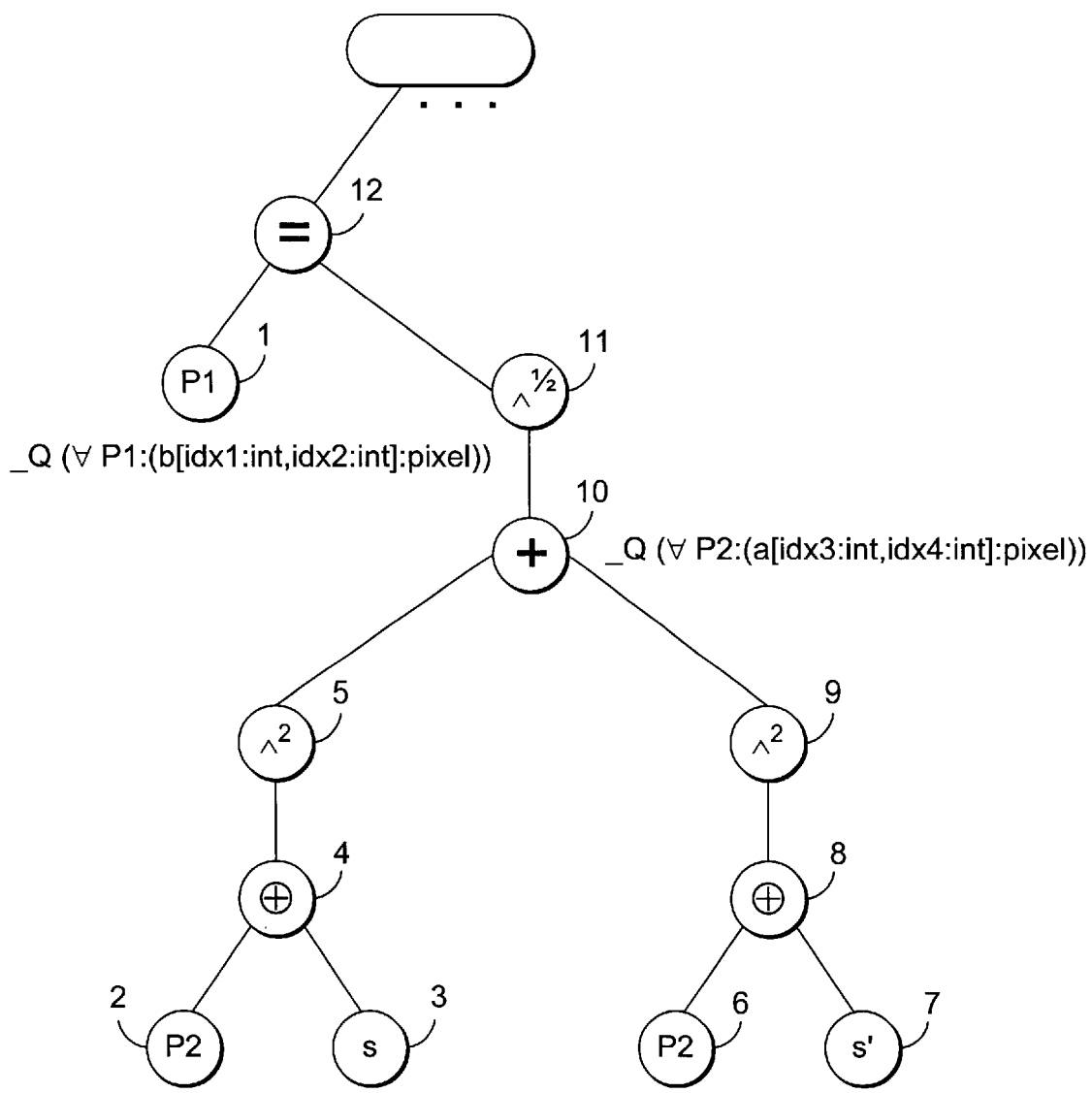

This tag indicates that the iteration operand p2 is a pixel type that should be replaced at code generation time with a reference to the image a indexed by variables idx3 and idx4. The system then processes node 403, but no transforms are applicable. The AO system then processes node 404. The AO system processes node 404 by applying a transform that recognizes that the quantifier tag on node 402 can be migrated to node 404. FIG. 4D illustrates the AST after the AO system has processed node 404. The AO system processes node 405 by applying a transform that recognizes that the quantifier tag on node 404 can be migrated to node 405. FIG. 4E illustrates the AST after the AO system has processed node 405. The AO system then processes nodes 406–409 in a manner similar to the processing of nodes 402–405. FIG. 4F illustrates the AST after the AO system has processed node 409. Node 406 has been replaced by a node that contains a reference to the iteration operand p3. A quantifier tag was added to node 406, but eventually migrated to node 409. The AO system then processes node 410 by applying a transform that recognizes that nodes 405 and node 409 have a "forall" loop quantifier tag that indicates an iteration over each of the elements of image a. The transform coalesces and migrates the quantifier tags of nodes 405 and 409 to node 410. FIG. 4G illustrates the AST after the AO system has processed node 410. The transform recognizes that the iteration operands p2 and p3 were over the same image a. Therefore, a single iteration operand and a single pair of index variables can be used in the iteration. Thus, the AO system coalesces the quantifier tags into:

_Q($\forall$p2:(a[idx3:int,idx4:int]:pixel))

Figure 4H:
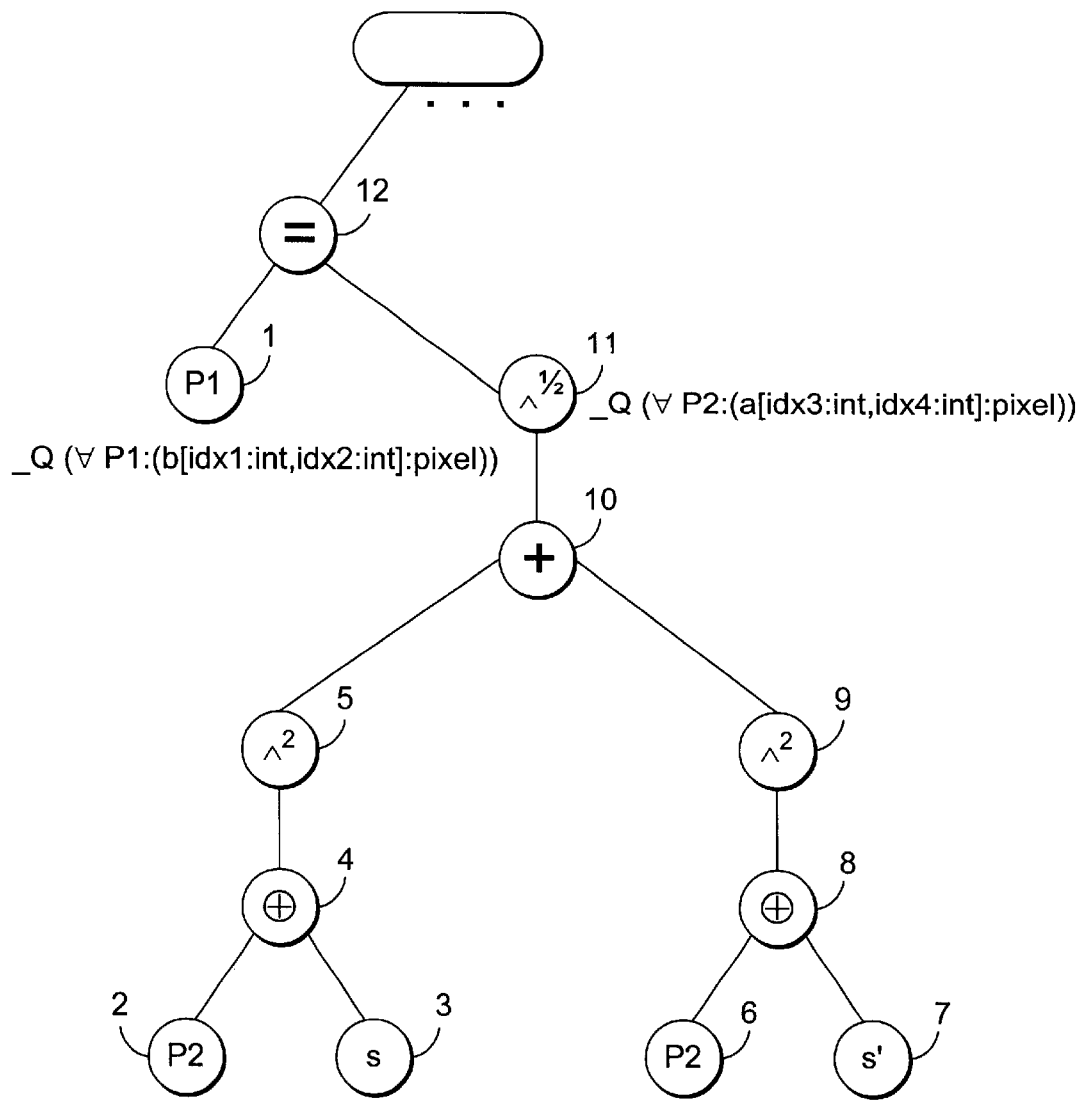
Figure 4I:
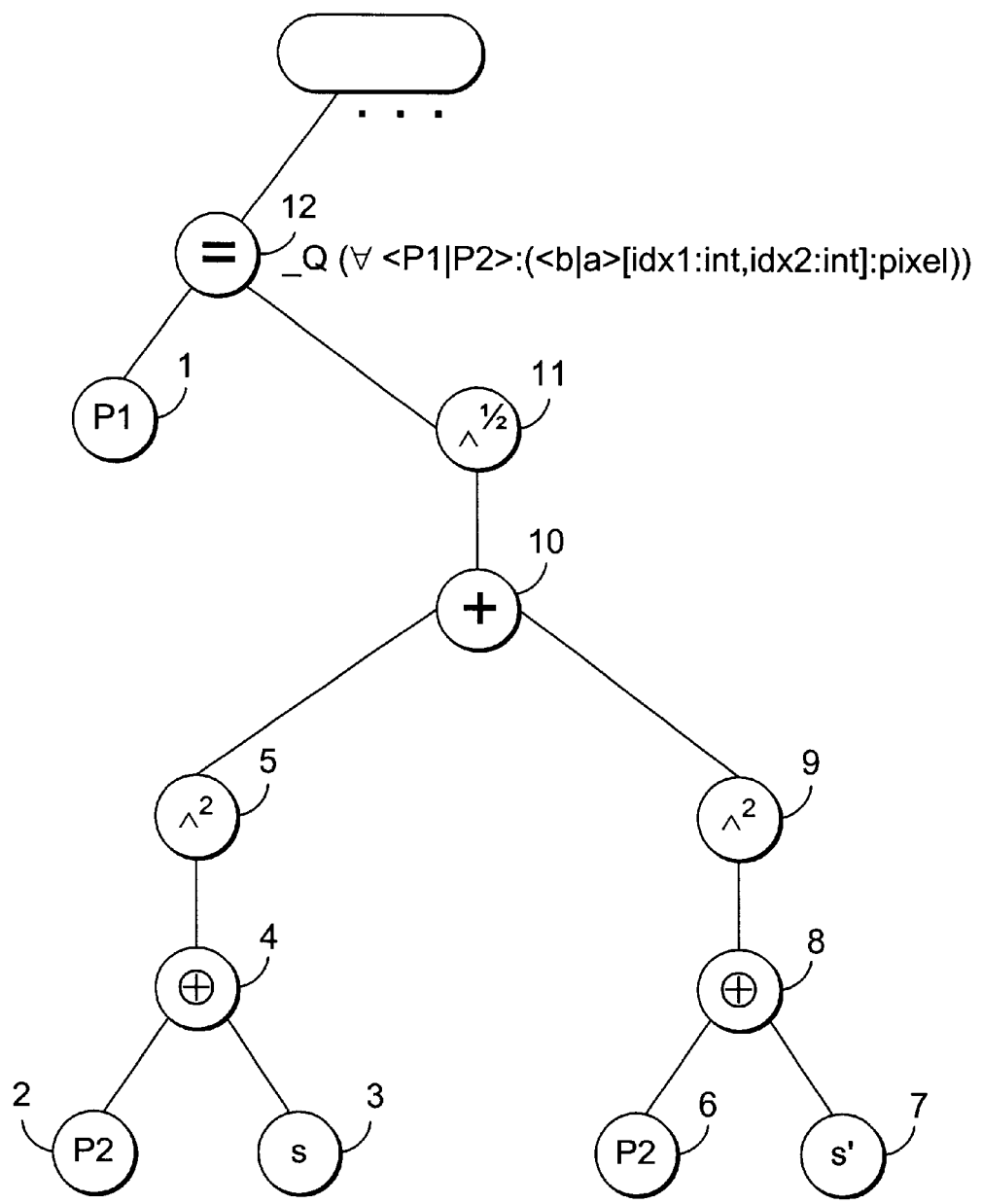

The transform also changes the reference in node 406 to point to iteration operand p2, rather than iteration operand p3. The AO system then processes node 411 by applying a transform that recognizes that the quantifier tag of node 410 can be migrated to node 411. FIG. 4H illustrates the AST after the AO system has processed node 411. The AO system then processes node 412 by applying a transform that recognizes that the quantifier tags of node 401 and node 411 can be coalesced and migrated. FIG. 4I illustrates the AST after the AO system has processed node 412. The transform coalesced the quantifier tags into the quantifier tag:

_Q($\forall$<p1|p2>:(<b|a>[indx2:int,idx2:int]:pixel))

The transform recognizes that the images a and b are of the same size and thus can be accessed by the same index variables. Therefore, the coalesced quantifier tag indicates that iteration operands p1 and p2 should be applied to image b and a through index variables idx1 and idx2.

Whenever two quantifier tags for a "for" loop can be coalesced and migrated, different iteration operands for accessing the same container can be replaced by a single iteration operand. For example, as shown in FIGS. 4F and 4G, iteration operands p2 and p3 were combined since they both are used to indicate the accessing of image a. FIGS. 5A–5D illustrate another example of combining iteration operands. The portion of the AST of FIG. 5A corresponds to the following high-level statement:

$$c = [(a \oplus s)^2 + (b \oplus s')^2]^{1/2}$$

Figure 5A:
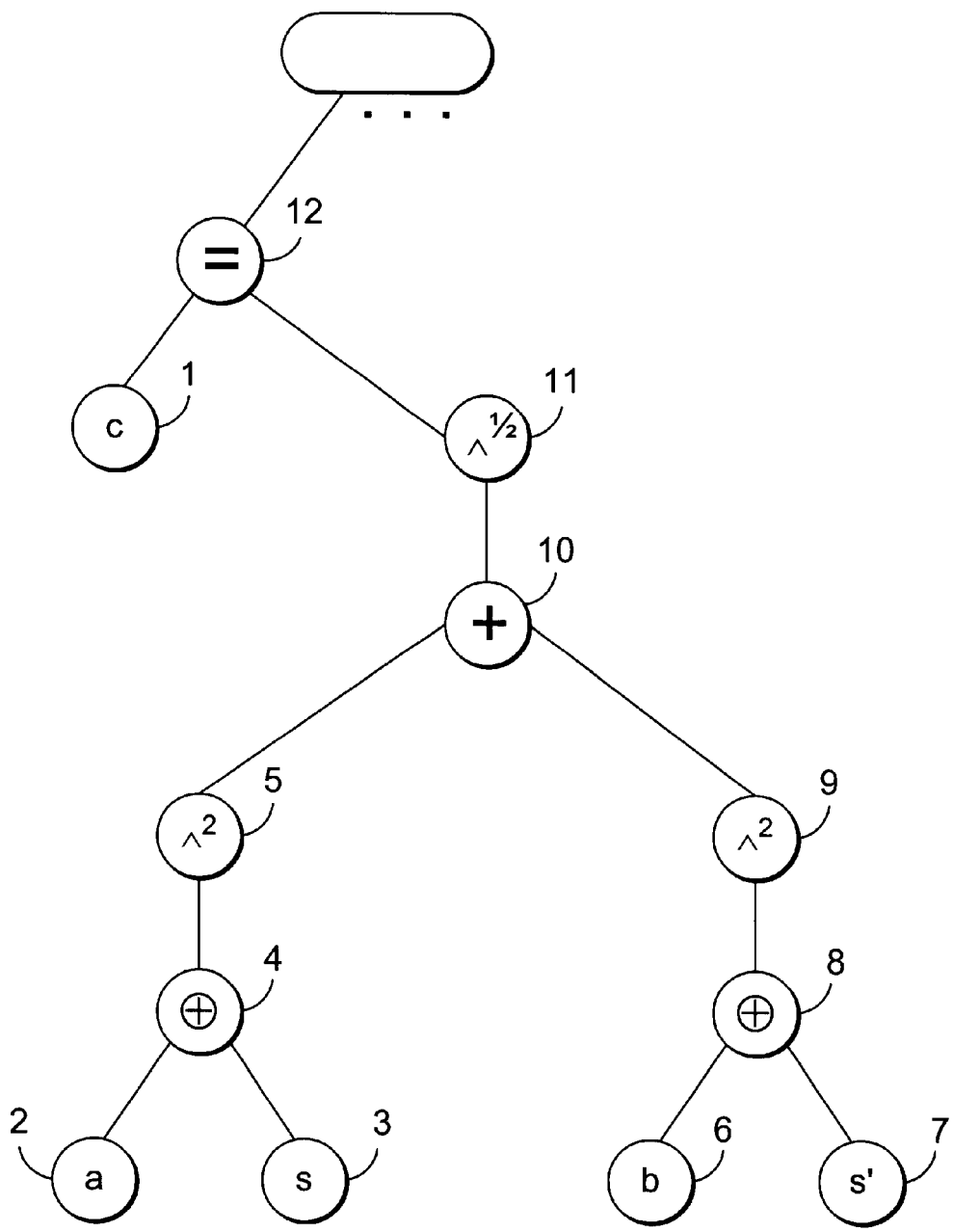
FIGS. 5A–5D illustrate another example of combining iteration operands.
Figure 5B:
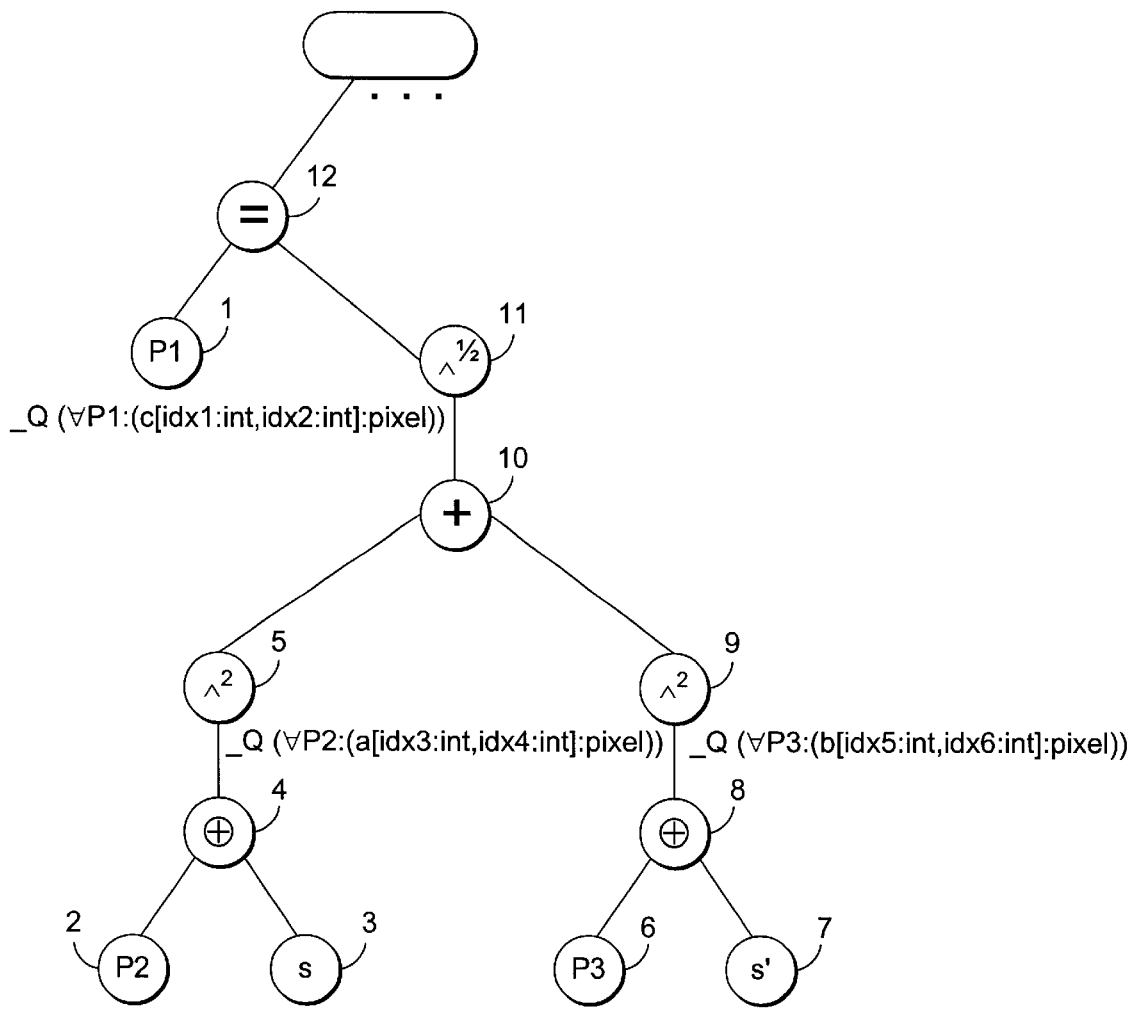
Figure 5C:
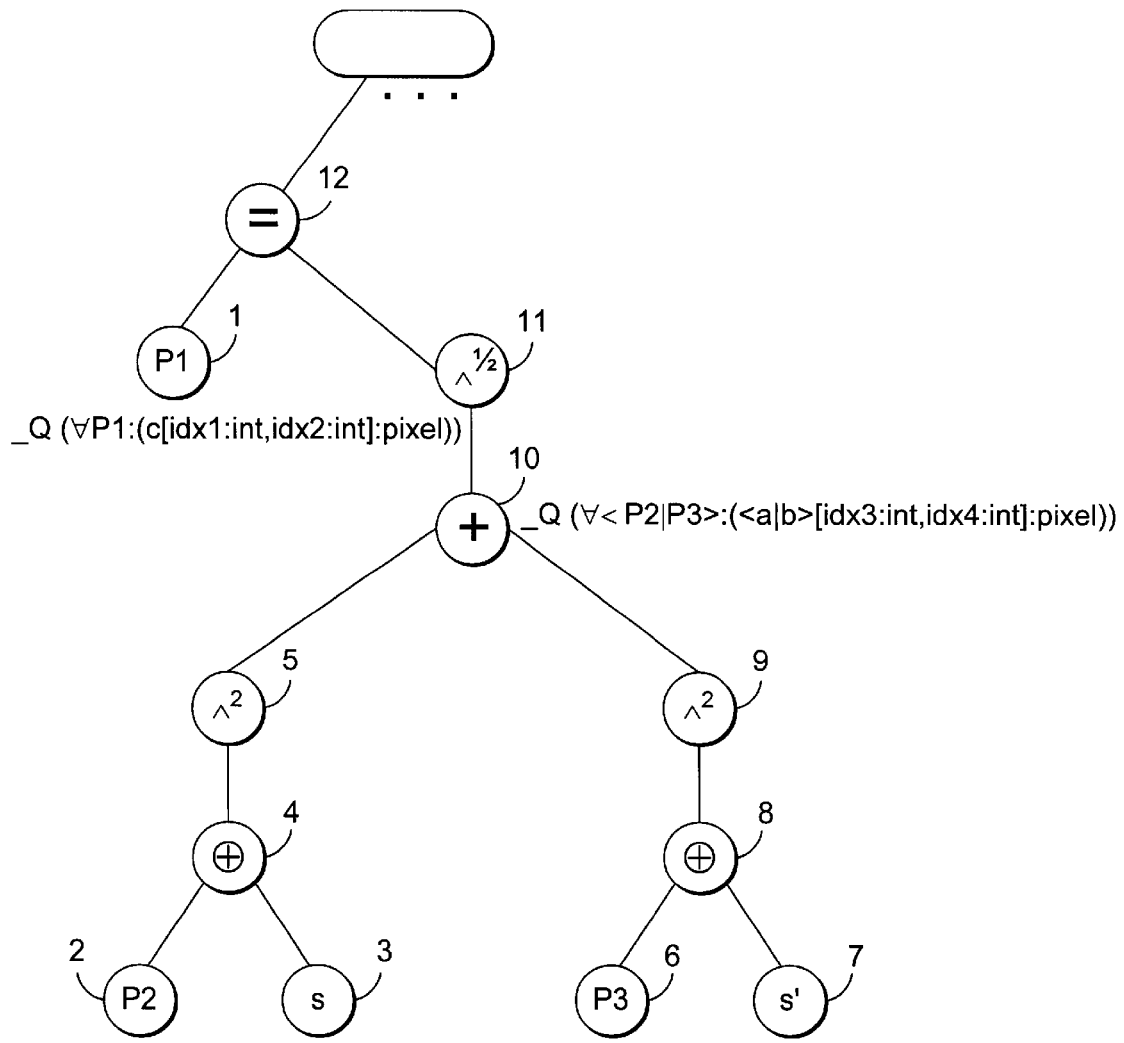
Figure 5D:
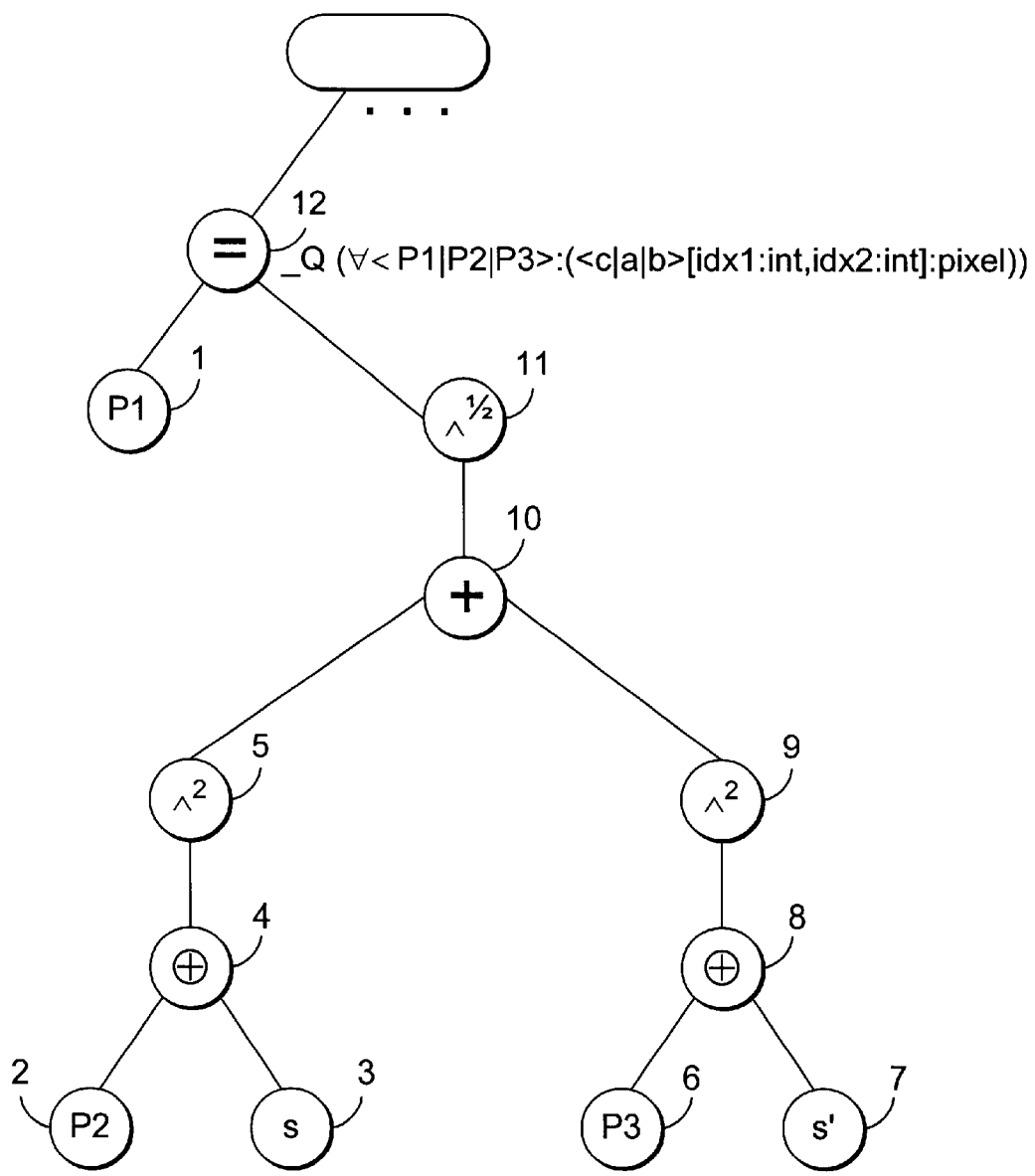

FIG. 5B illustrates the portion of the AST after quantifier tags have been added when nodes 501–509 are processed. The AO system then processes node 510 by applying a transform that recognizes that the quantifier tags of nodes 505 and 509 can be coalesced and migrated. However, since the iteration operands p2 and p3 are applied to different images, that is a and b, the iteration operands cannot be coalesced. However, since the images have the same size, the index variables can be combined. The resulting quantifier tag is:

_Q($\forall$<p2|p3>:(<a|b>[idx3:int,idx4:int]:pixel))

When the AO system processes node 511, it migrates the quantifier tag from node 510 to node 511. The AO system processes node 512 by applying a transform that recognizes that the tags on node 501 and node 511 can be coalesced and migrated. The transform recognizes that a single pair of index variables can be used to access images a, b, and c. Thus, the transform adds to node 512 the following quantifier tag:

_Q(∀<p1|p2|p3>:(<c|a|b>[idx1:int,idx2;int]:pixel))

The AO system applies the transforms by traversing the AST and at each node determining whether each transform can be applied to the node. Each transform includes a test to determine whether it is applicable. If the transform is applicable, the transform performs the transformation and returns an indication that it was applied. Conversely, if a transform is not applicable, the transform makes no modification to the AST and returns an indication that it was not applied. A transform determines whether it is applicable by comparing the contents of the subtree of which the current node is the root node. For example, referring to Figure 5B, when processing node 510, one transform would detect that the operator in node 510 is a "+" operator (i.e., image addition operator) and that a "forall" loop quantifier tag for images of the same size have been added to its two operand nodes 505 and 509. When the transform detects such a pattern, the transform performs the coalescing of the quantifier tags and migrates the quantifier tag to node 510. The transform then returns an indication that it was applied. In one embodiment, the transforms are organized according to the domains to which and phases in which they can be applied. At each phase, the AO system only attempts to apply those transforms that have been designated for that phase.

In many instances, the processing of a transform is the same for many different operators that are in the current node. For example, referring again to FIG. 5B, if node 510 referred to an image subtraction operation ("−") rather than an image addition operator (e.g., "+") operator, then the processing would be the same. Therefore, the transforms can be grouped according to the types of operators referred to as a "group" of operators. The high-level operators that apply to the image data structures can be categorized into the following groups:

1. arithmetic operators;
2. parallel independent data flow operators;
3. reduction operators;
4. convolution operators; and
5. expansion operators.

Within each group, all of the operators have a common data flow and data dependency pattern and thereby, the groupings "encode" that data flow and data dependency pattern information implicitly. This implicit encoding is used by the AO system to avoid the difficult data flow and data dependency analysis step that conventional optimization methods employ.

Figure 6A:
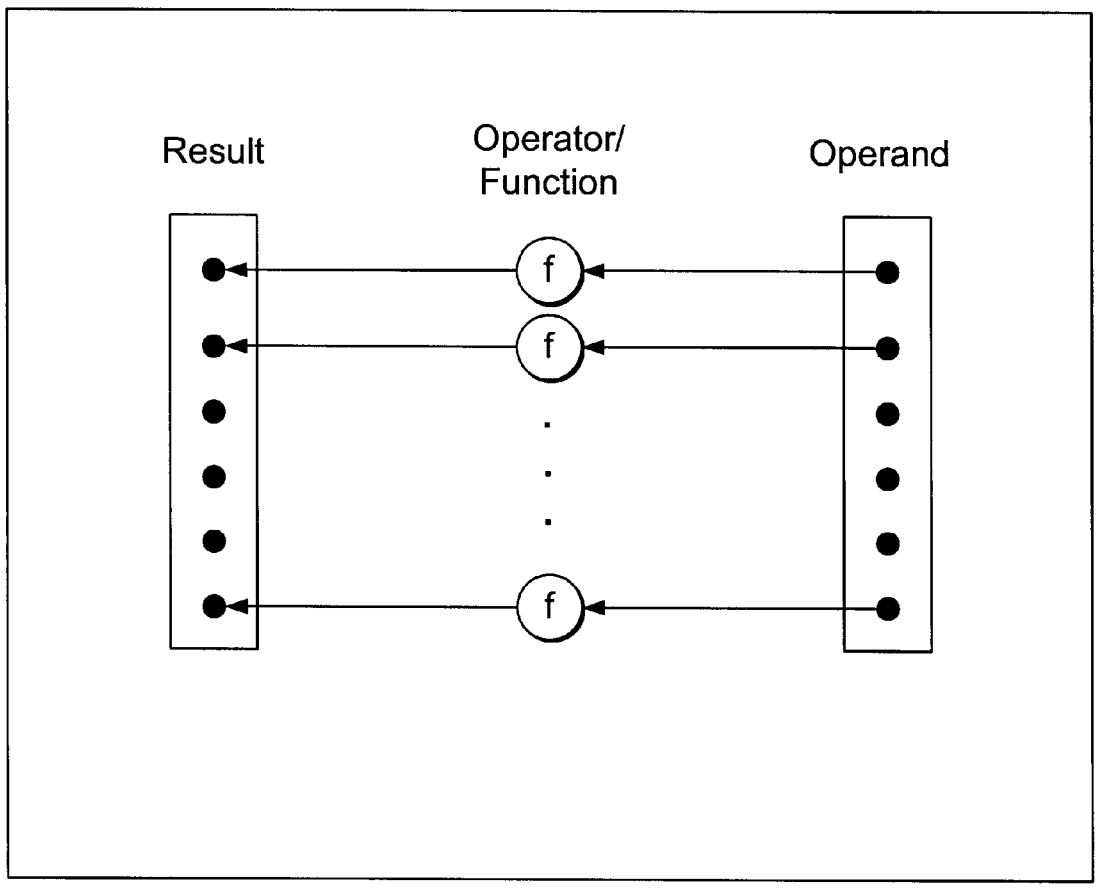
FIGS. 6A–6E illustrates the relationship between the operand, operator, and result for various operator groups.
Figure 6B:
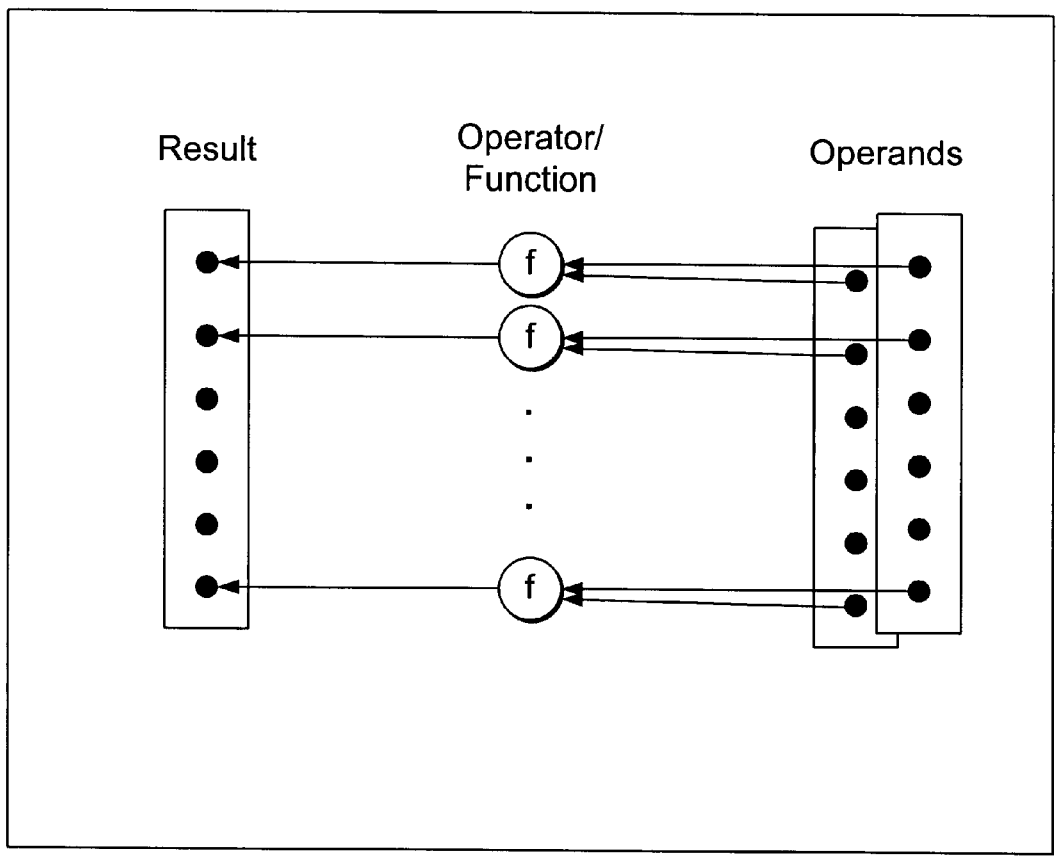

The arithmetic operators have the characteristic that the result for a given element of the image relies only on the value in the corresponding element of the operand. For example, the squaring of an image (e.g., $a^2$), is calculated by squaring each individual element of the image. FIGS. 6A and 6B illustrate the data flow and data dependency relationships between the operator, operands, and results for the unary and binary operator arithmetic groups, respectively. The arithmetic operator group comprises unary arithmetic operators (e.g., square and square root), binary arithmetic operators (e.g., addition of a constant value to each element in the image), the assignment operator, and function operators that input an image and output another image whose values depend only upon the values of the input image and which have no side effects. Iterations for multiple subexpressions within an encompassing expression can be combined when the operators of those subexpressions are arithmetic operators. For example, the high level subexpressions of unary operator f and binary operator g (which are shown in function form) can potentially have their iterations combined for many combinations of those operators such as (but not limited to):

... f (g (ImageA, ImageB)) ...

... h (f (ImageC), g (ImageA, ImageB)) ...

... g(f (ImageA), ImageB) ...

given the additional requirement that the newly introduced binary operator h is a member of the parallel independent data flow operator group.

The parallel independent data flow operators have the characteristic that they are applied to sets of high-level data structures that are structurally isomorphic or that have subparts that are structurally isomorphic. For example, the addition operator that applies to two images with the same dimensions is in this group. The $[i,j]^{th}$ element of the sum of the two images depends only upon the $[i,j]^{th}$ element of each operand image. The computation on each element is independent in the sense that between each step of the iteration the resulting value does not depend on the values generated during another step. FIG. 6B illustrates the relationship between the operands, operator, and result for the parallel independent data flow group. This group includes arithmetic operators (e.g, unary minus) and mathematically pure functions applied to individual replicated structures or applied to parallel replicated structures. Iterations over the operands and results for operators in this group can typically be combined. (A mathematically pure function is a single-valued function—symbolically represented as f(x,y, . . . ) —that depends only on the input values x,y, . . . and no other values. Further, these functions have no side effects, such as the assignment of values to global variables or the execution of input or output operations.)

Figure 6C:
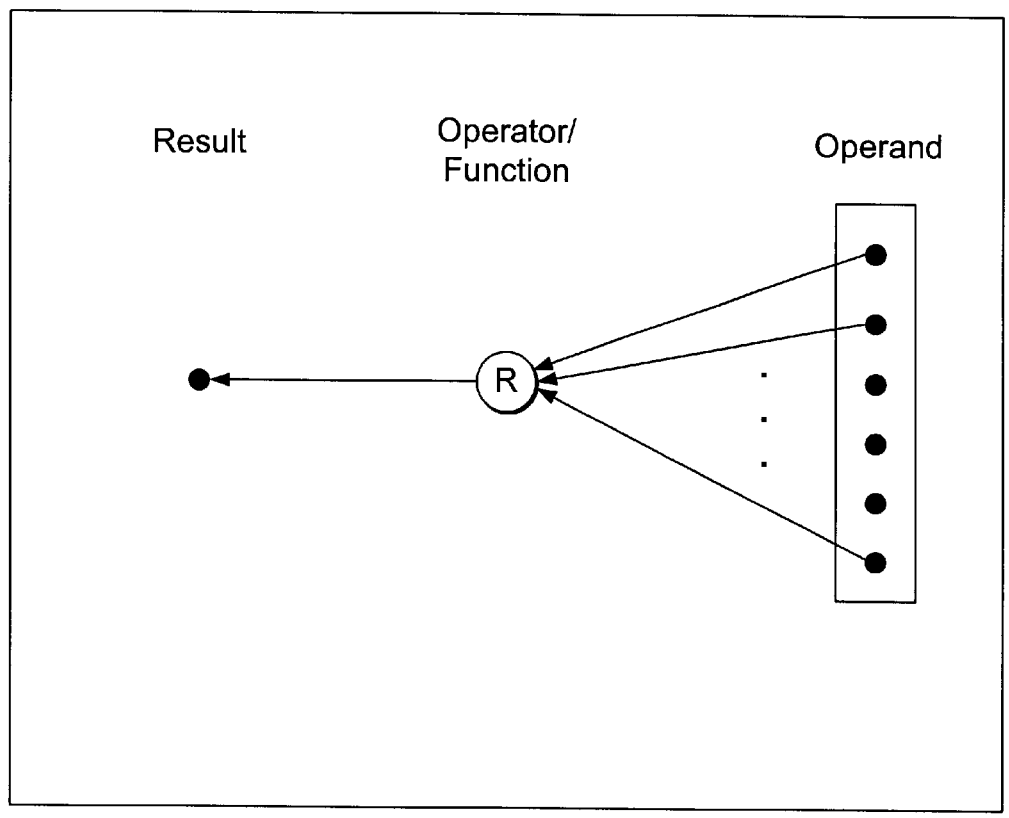

The reduction operators are operators that map a high-level data structure or a portion of a high-level structure into a single value. Because of the dependency, all the values of the operand need to be established prior to calculating the result. FIG. 6C illustrates the operand, operator, and result of reduction group. This group includes operators that search a composite data structure for a certain value (e.g., minimum value) and that compute a single value for a composite data structure (e.g., the average of all the values). Certain iterations cannot be combined when reduction operators are used. For example, in the following expression A+min(B)

the iteration to find the minimum value of matrix B cannot be combined with the iteration to add that minimum value to each element of matrix A.

Figure 6D:
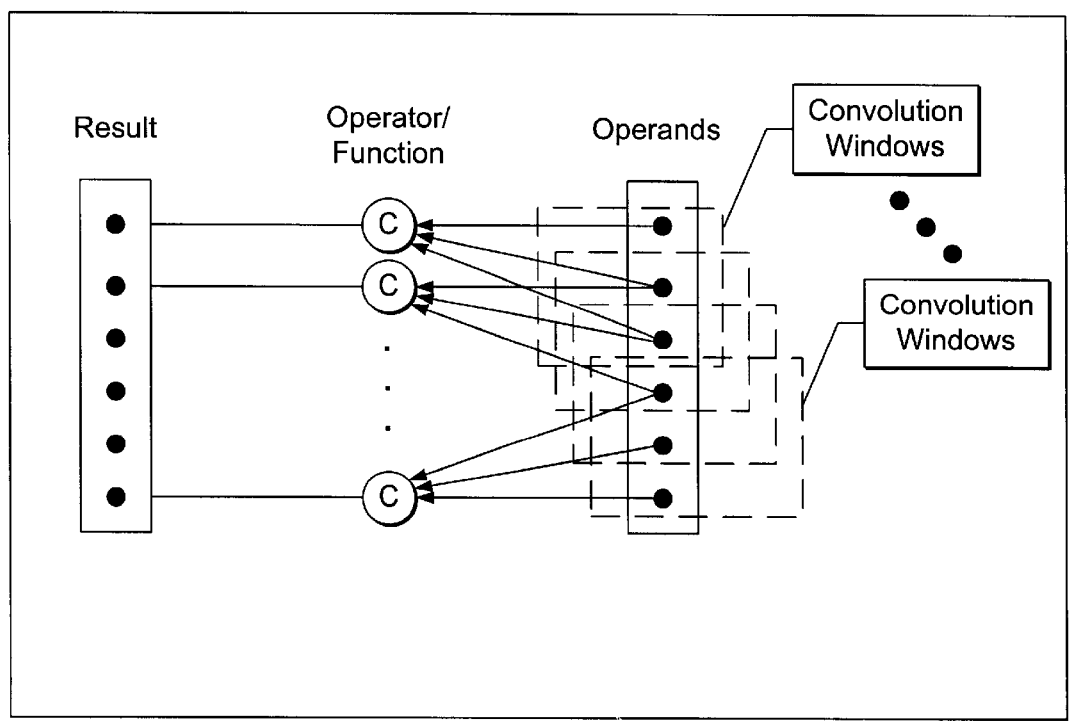

The convolution operators are combinations of reduction operators nested within parallel data flow operators. The convolution operators reduce a portion of the high-level data structure into a single value in the resulting data structure. The convolution operators are typically implemented with nested loops: the outer loop iterates over each element of the operand high-level data structure and the inner loop iterates over a convolution window. FIG. 6D illustrates the operands and convolution windows, operator, and result for the convolution group. When convolution operators are used, all the values of an operand matrix may need to be determined before the convolution operator is applied. This requirement limits the combining of iterations when convolution operators are being used. For example, in the expression $$((A \oplus s) \oplus t)$$

the $(A \oplus s)$ convolution must be completed and stored in some temporary image such as T21 before the $(T21 \oplus t)$ convolution can be begun. Therefore, the iterations over these two convolutions may not be combined.

The expansion operators are the inverse of reduction operators.

Figure 6E:
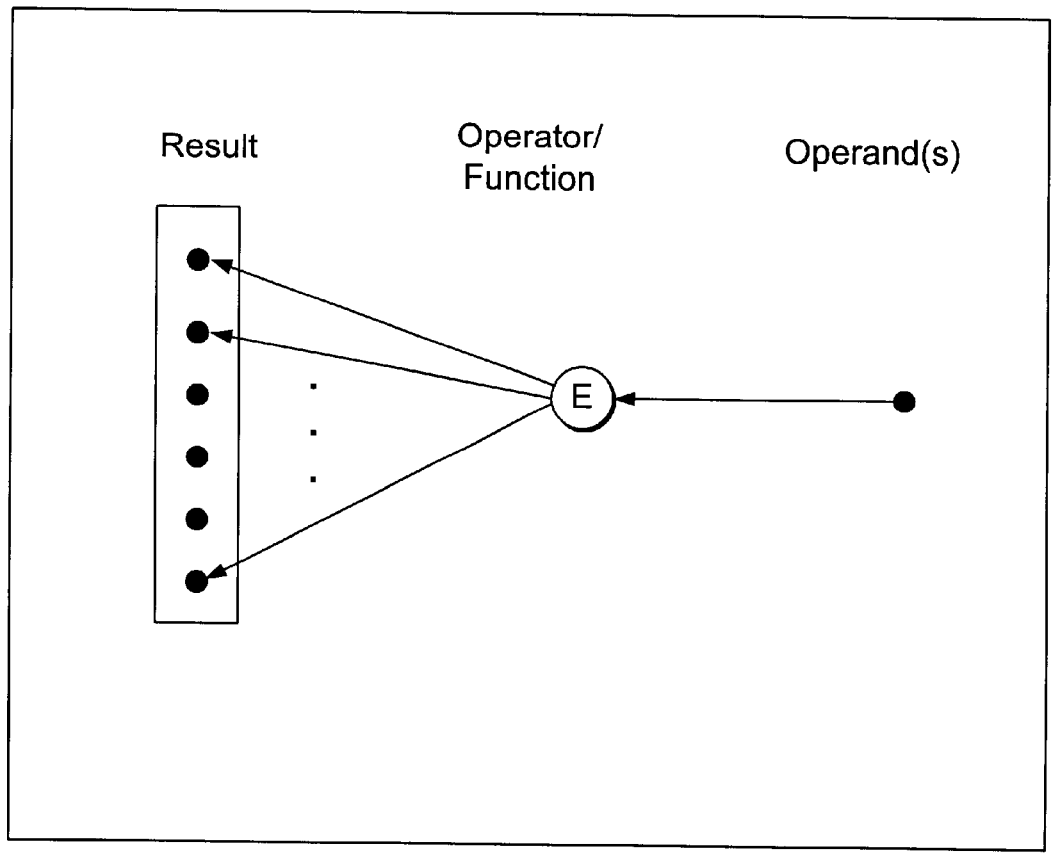

The expansion operators take a single value and generate multiple values to fill a high-level data structure. The complete set of operands upon which the result depends need to be computed before the result is known. If the input operands of the expansion operator are atomic values (i.e., integers), the iterations may be combinable. If the input operands are expressions, the semantics of those expressions determine the combinability of the iteration. FIG. 6E illustrates the operand, operator, and result for the expansion group. The group includes operators that fill an array with a constant value or an array with values that vary based on the index of the array.

Figure 7:
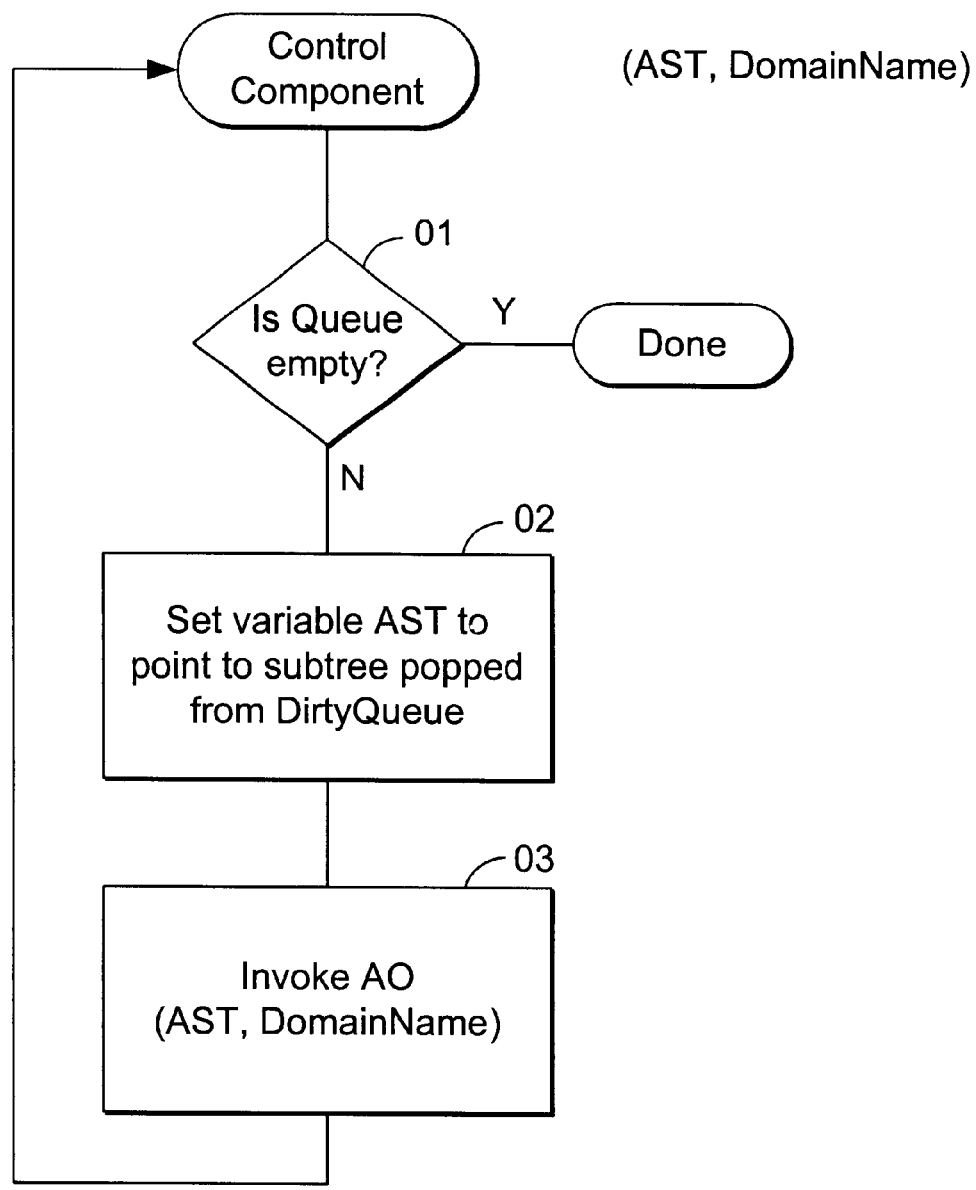
FIG. 7 is a flow diagram of the control component.

The AO system includes a control component that controls the traversing of an AST and applying of the various transforms to the AST. When the control component is invoked, it is passed the root node of the AST to be processed and the name of a domain associated with the AST. The control component stores a reference to a root node in a to-be-processed queue and loops popping the top of the queue and invoking an AO routine that controls the traversing and invoking of the routines that implement the phase components. A transform may replace a subtree with another subtree that, for example, may use lower-level computational constructs. The transform may place the root node of the new subtree on the queue. In this way, the AO system applies further transforms to the nodes of the subtree. FIG. 7 is a flow diagram of the control component. The control component initially stores a reference to the root node of the AST in the queue. In step 701, if the queue is empty, then the control component is done, else the control component continues at step 702. In step 702, the control component selects a subtree headed by the node popped from the queue. In step 703, the control component invokes the anticipatory optimization ("AO") routine passing the selected subtree and the domain name. The control component then loops to step 701 to determine whether the queue is empty.

Figure 8:
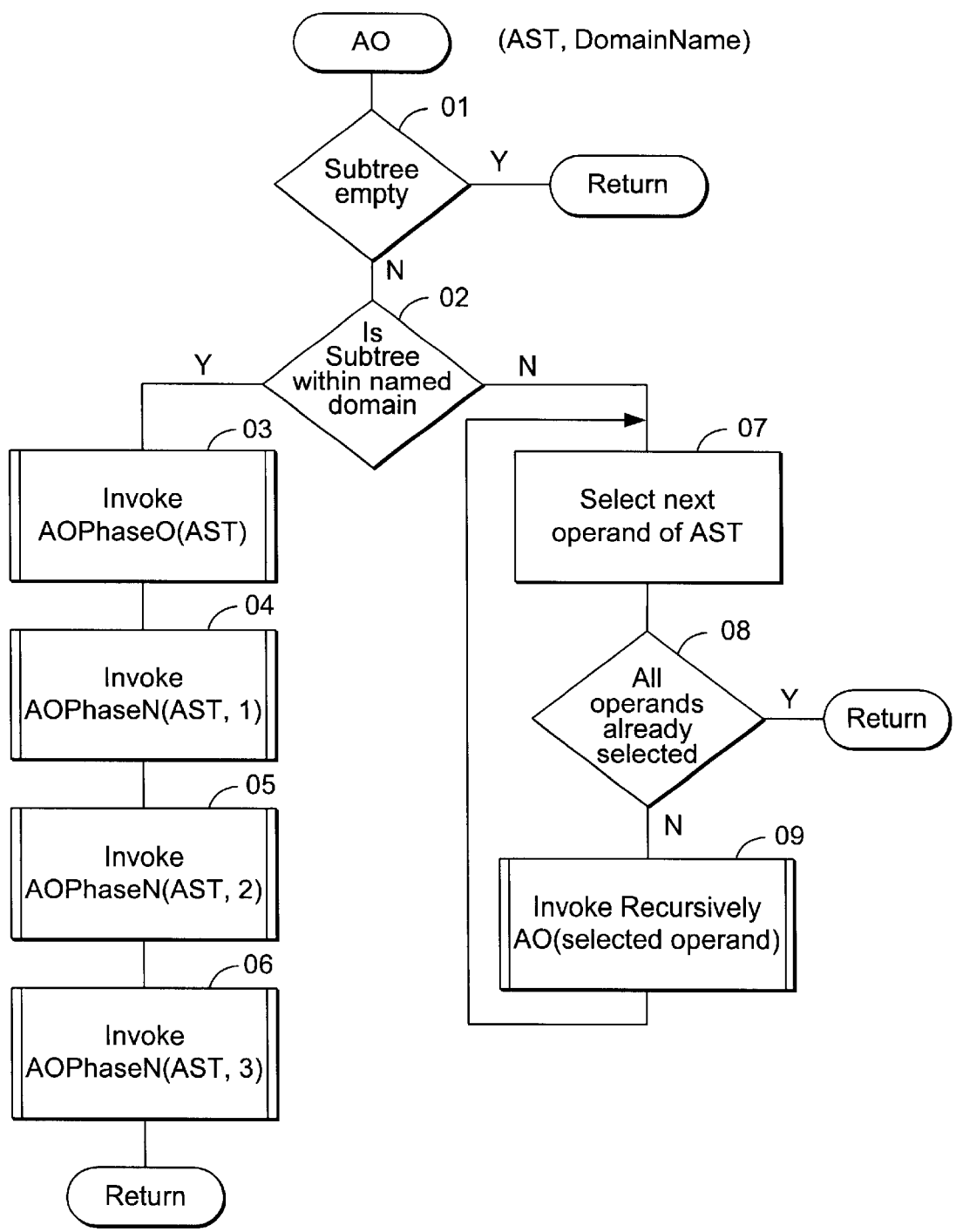
FIG. 8 is a flow diagram of the AO routine.

FIG. 8 is a flow diagram of the AO routine. The AO routine is passed a pointer to the subtree to be processed and a domain name. The routine examines the definition of the operator at the top of the AST to see if it is in the named domain or within a domain that inherits from the named domain. For example, if the operator in the AST is the convolution operator, then the definition of convolution operator, which is located at some remote point in the AST, is tagged with the domain "Image." If the domain condition is fulfilled, the routine performs the anticipatory optimization on the subtree by successively invoking routines to effect the processing for phases 0–3. Otherwise, the routine recursively invokes the AO routine for each operand of the root node of the subtree. In step 801, if the subtree is empty, then the routine returns, else the routine continues at step 802. In step 802, if the subtree is within the named domain, then the routine continues at step 803, else the routine continues at step 807. In steps 803–806, the routine invokes the subroutines to process each of the phases of the AO system and then returns. Since the processing for phases 1, 2, and 3 are the same, except for selecting to apply only transforms appropriate to the phase, the processing of these phases is implemented in a single subroutine ("AOPhaseN") with the current phase being passed as a parameter. In steps 807–809, the routine selects each of the operands of the subtree and recursively invokes the AO routine passing the node of the selected operand. In step 807, the routine selects the next operand of the subtree. In step 808, if all the operands have already been selected, then the routine returns. In step 809, the routine recursively invokes the AO routine passing the selected operand and the domain name. The routine then loops to step 807 to select the next operand of the subtree.

Figure 9:
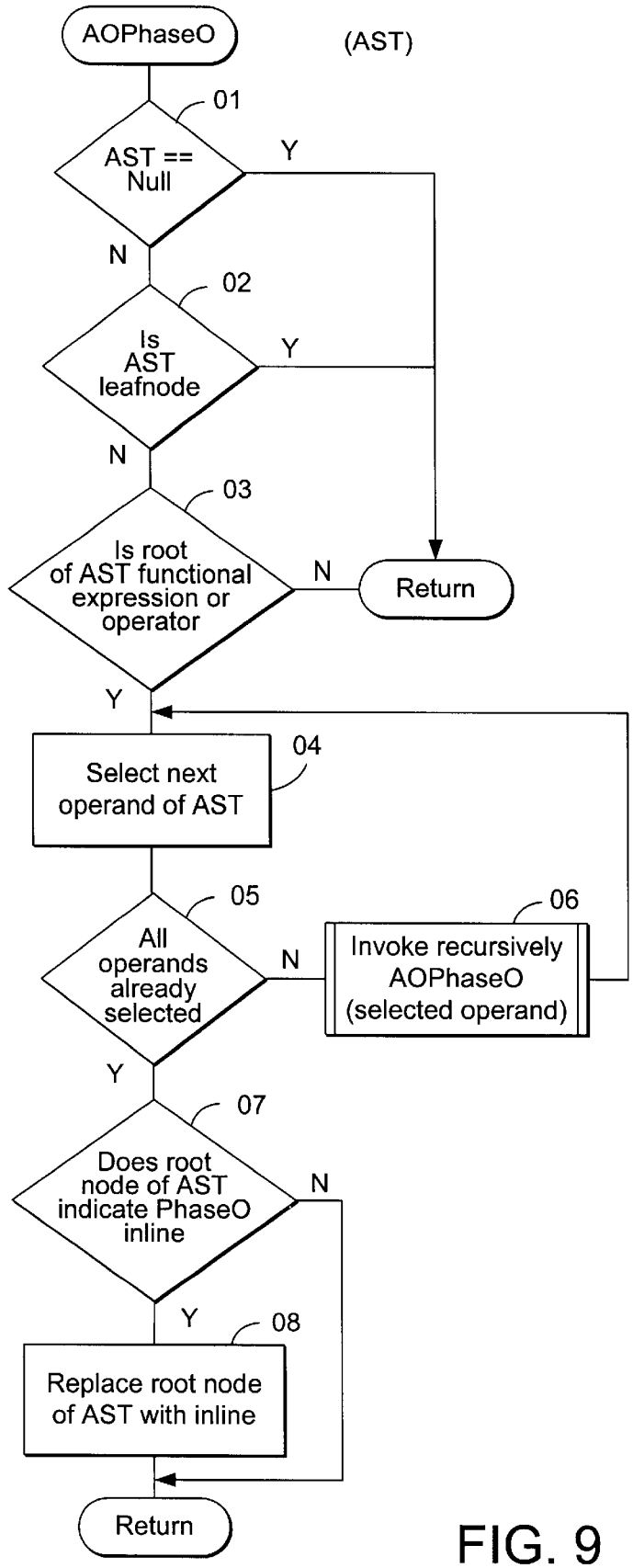
FIG. 9 is a flow diagram of the routine for processing phase 0 of the AO system.

FIG. 9 is a flow diagram of the routine for processing phase 0 of the AO system. This routine traverses the passed subtree in a depth-first, left-to-right manner by recursively invoking this routine for each operand. If the operator of the root node of the subtree has an optimization tag in its definition that indicates it should be moved inline, then the routine replaces the root node with the inline version of the operator. In step 901, if the subtree is empty, then the routine returns, else the routine continues at step 902. In step 902, if the subtree is a leaf node, then the routine returns, else the routine continues at step 903. In step 903, if the root of the subtree is a node with a functional expression or an operator, then the routine continues at step 904, else the routine returns. In steps 904–906, the routine loops recursively invoking the AOPhase0 routine for each of the operands of the root node of the subtree. In step 904, the routine selects the next operand of the root node of the subtree. In step 905, if all the operands have already been selected, then the routine continues at step 907, else the routine continues at step 906. In step 906, the routine recursively invokes the AOPhase0 routine passing the selected operand as the root of the subtree and loops to step 904. In step 907, if the definition of the operator in the root node of the subtree indicates that it can be placed inline, then the routine continues at step 908, else the routine returns. In step 908, the routine replaces the root node of the subtree with the corresponding inline subtree and returns. Alternatively, this subroutine could be implemented in the same manner as the subroutine for processing the other phases and a transform can be implemented to effect the placing of functions inline.

Figure 10:
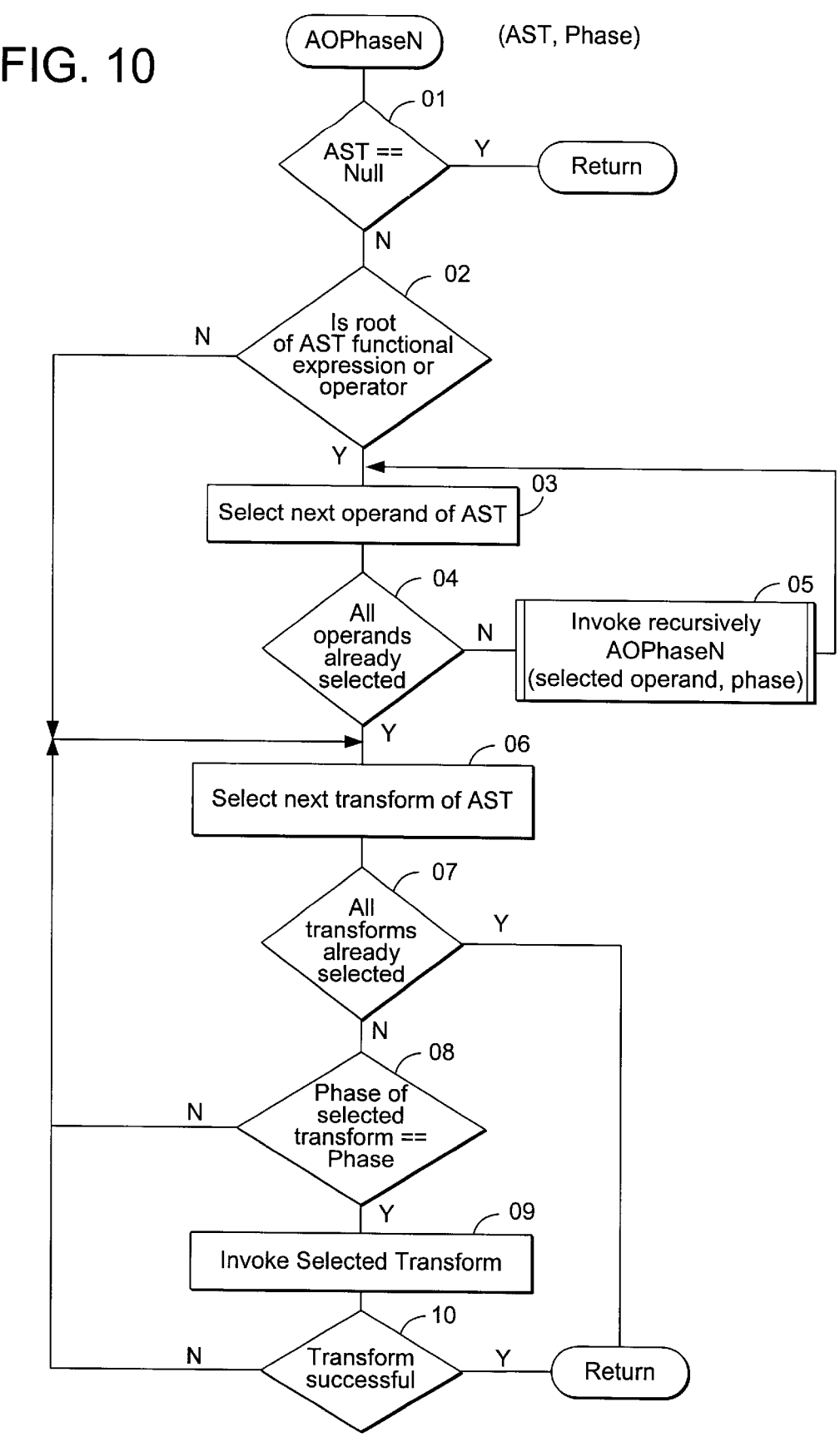
FIG. 10 is a flow diagram illustrating a routine for processing of phases 1–3 of the AO system.

FIG. 10 is a flow diagram illustrating a routine for processing of phases 1–3 of the AO system. This routine is passed an AST subtree and an indication of the current phase. The routine performs a depth-first, left-to-right traversal of the subtree by recursively invoking the routine. When a node is visited, the routine invokes each transform for that phase. When the first transform indicates that it was successfully applied, the routine then returns. A transform may add the root node of a subtree to the queue for further processing by the AO system. In step 1001, if the subtree is empty, then the routine returns, else the routine continues at step 1002. In step 1002, if the root node of the subtree is a functional expression or an operator, then the routine continues at step 1003, else the routine continues at step 1006. In steps 1003–1005, the routine loops selecting the operands of the root node of the subtree and recursively invoking the AOPhaseN routine for the current phase. In step 1003, the routine selects the next operand of the subtree. In step 1004, if all the operands have already been selected, then the routine continues at step 1006, else the routine continues at step 1005. In step 1005, the routine recursively invokes the AOPhaseN routine for the current phase and loops to step

1003 to select the next operand. In steps 1006–1010, the routine loops attempting to apply each transform until one applies. In step 1006, the routine selects the next transform that might be applicable to the root node of the subtree. In step 1007, if all the transforms have already been selected, then the routine returns. In step 1008, if the phase of the selected transform matches the current phase, then the routine continues at step 1009, else the routine loops to step 1006 to select the next transform. In step 1009, the routine invokes the transform. In step 1010, if the transform is successful (i.e., applied), then the routine returns, else the routine loops to step 1006 to select the next transform.

In the following, various transforms are described relating to the domain of image processing. These transforms operate on operators and operands that are in the domain of image processing. The type of high-level computational constructs for this domain include a pixel, an image, a template, and a number, which is inherited from the C programming language domain. Data of type pixel represents the gray scale intensity of one pixel of an image. Data of type image is defined to be an m by n matrix of pixels. A template datatype translates into a complex C domain data structure consisting of three components:

1. A matrix w containing numbers representing weights w[l,m] to be applied by the convolution operator,
2. A similarly structured matrix XY that for each w[l,m] defines an [x,y] coordinate pair value XY[l,m]=[f(i), g(j)] identifying the pixel in the input image a to which the weight w[l,m] is to be applied, where the values f(i) and g(j) are computed from the coordinates of the currently selected pixel a[i,j] and the offsets implied by the coordinates l and m within w, and p1 3. A procedure that at run-time calculates the coordinate pair values of XY for each pixel positioning [i,j] in a and the values of w, if they are not constant (e.g., they could be a function of the [i,j] position in a).

In other words, a template performs two separate functions: 1) it supplies data values or weights that participate in the computation of the output pixel corresponding to the current input pixel and 2) it supplies a coordinate mapping from the [xy] position of the current input pixel upon which the w matrix is centered into a set of coordinate pairs of the pixels in the neighborhood of the current pixel that will participate in the computation of the output pixel corresponding to the current input pixel. The coordinate mapping and the computation of the w values may involve arbitrarily complex logic. For example, when centering w on a border pixel in a, this logic determines whether or not to include the elements of w that fall outside of the image a and if they are to be included, exactly how will they participate in the computation (e.g., will they all be zero or some other value?).

For example in the case of the backward convolution operator, the output pixel (b[i,j]) corresponding to the input pixel a[i,j], is computed by the following formula:

$$b[i, j] = \sum_{l,m} (a[x \text{ coordinate of } XY[l, m], y \text{ coordinate of } XY[l, m]] * w[l, m])$$

Data of type number is a group of types that includes integers and reals. The type number is introduced to represent types of operands that can be treated as a group. Table 1 provides a definition of these types. The definition of these types includes a list of those transforms that can be applied to these types. In the case where the mapping of a high-level type to a lower-level type is straightforward with little or no variation, the complexity of defining a separate transform or transforms for each data type is omitted and a shorthand that expresses the simple transform inline as the value (i.e., the right hand side of the→operator) of the definition is used. This is just a notational convenience and simplification. Underneath, there is still an AO system generated transform that is triggered to do the translation from high-level to low-level constructs. For example, the following declaration of a variable as type pixel:

pixel var1;

would map to the following low-level declaration:

int var1;

This mapping is provided by the following definition in Table 1:

Define Type Pixel $Name→{int $Name}

The text to the right of the assignment operator indicates the low-level mapping. The symbol prefixed with the "$" indicates substitution of the corresponding symbol from the high-level declaration. For example, the symbol "var" is substituted for the symbol "$Name." The types are defined hierarchically and transforms can be defined for each level in the hierarchy. For example, the highest level type is composite, which includes pixel, image, template, and number as subtypes.

TABLE 1

```
Define Types
{
    Define Type Composite    _Transform(CompositeLeaf)
                             _Transform(ReduceLeafAbstractions)
                             _Transform(ReduceAbstractDeclarations)
                             _Domain(Image)
    {
    Define Type Pixel $Name ⇒ {int $Name};
    Define Type Image $Name [$Dim1, $Dim2] ⇒ {Pixel $Name [$Dim1, $Dim2]};
    Define Type Template $WeightType $Name ( ) [$Dim1, $Dim2] {$CodeBody }⇒
        {
        // Define table to communicate with convolution function
        #{ $TableName = concat($Name,"Table");} //Side effect: create name
        TableElement ( $WeightType) $TableName [$Dim1, $Dim2];
        #{ $ProcName = concat($Name,"Proc");} //Side effect: create name
        // Define user written template code procedure
        void $ProcName ( ) { $CodeBody}
```

TABLE 1-continued

```
            // Register the table with the convolution operator code
            // Giving pointer to it, its dimensions, and routine that fills it with data
            RegisterConvolutionTable(&($TableName), $Dim1, $Dim2,
                                    ((* $ProcName) ()));
         }
      Define Type TableElement ($WType) ⇒   // Simple parameterized type
         {struct
            {
               int XIndex; // X index in target image in terms of current pixel
               int YIndex; // Y index in target image in terms of current pixel
               $WType weight; // Convolution weight multiplier for
                                        // target image pixel [XIndex, YIndex]
            }};
      Define Type Number; __Domain(C)
         {
            Define Type int;
            Define Type real;
            . . .
         }
   }
   . . .
}
```

Table 2 contains the definitions of the operator group. The operators are organized hierarchically and transforms can be defined for each level. The definitions of the operators define the AST pattern of the operators and their operands as well as the return type of the operator. For example, the definition Define Operator Group ArithOp $Op(pixel, pixel):pixel when ($Op∈{*,/,+,−. . . })

where ArithOp is the name of the operator group, "(pixel, pixel)" indicates the pattern of the operand types in the AST (i.e., the operators of this group operate on two operands of type pixel); ":pixel" indicates the return type of the operation; and the "when ( . . . )" clause is a shorthand that indicates an additional condition for ArithOps that are covered by this definition. In this case, the "when" clause requires that the specific ArithOp operator, which will be bound to the transformation-time pattern variable $Op, be a member of the enumerated operator set {*,/,+, −, . . . }. This shorthand saves the transformation programmer from having to write a separate definition expression for each specific operator. A "when" clause can express arbitrary conditions. Operationally, the patterns plus the "when" conditions provide the case logic for identifying the specific class of operators in a specific situation and thereby determine where on the inheritance hierarchy to start the search for applicable transformations. This group is within the higher-level operator group ArithOps, which has transforms "ArithOpsOnComposites" and "GenerateCodeForFunctions" defined as indicated by the following:

| | |
|---|---|
| Define OperatorGroup | __Transform(ArithOpsOnComposites) |
| ArithOps | __Transform(GenerateCodeForFunctions) |

The transforms for the types of Table 1 and the operator groups of Table 2 are described in the following.

TABLE 2

```
Define OperatorGroups __Transform(GenerateLoopStructure) __Domain(Image)
{
      Define OperatorGroup ArithOps     __Transform(ArithOpsOnComposites)
                                        __Transform (GenerateCodeForFunctions)
         {
            Define Operator Group ArithOp $Op(pixel,pixel):pixel when ($Op∈{*,/,+,−,=, . . . });
            Define Operator Group ArithOp $Op(pixel):pixel when ($Op∈{+,−,power,sqrt, . . . });
            . . .
            Define Operator power( [pixel | number] , number) : [pixel | number] ;
            __Transform(GenerateCodeForPower)
         }
      Define OperatorGroup ParallelOps __Transform(ParallelOpsCompositeOperands)
         {
            Define Operator Group ParallelOp $Op(pixel,pixel):pixel when ($Op∈{*,/,+,−,=, . . . });
            Define Operator Group ParallelOp $Op(pixel):pixel when ($Op∈{+,−, . . . });
            Define Operator Group ParallelOp $Op(image,image):image when ($Op∈{*,/,+,−,=, . . . });
            Define Operator Group ParallelOp $Op(image) : image when ($Op∈{ +, −, . . . });
         }
      Define OperatorGroup ConvolutionOps     __Transform(BreakNestedConvolutions)
                                              __Transform(ReduceConvolutionOperator)
         {
            Define Operator Group BackwardConvolutionOp(image, Template):image
               when ($Op∈ {⊕, ☑, ⊗, . . . }); __Transform(BackwardConvolutionOnLeaves)
            Define Operator Group ForwardConvolutionOp(Template, image) : image
```

TABLE 2-continued when ($Op∈ {⊕, ⊠, ⊗, ... }); _Transform(ForwardConvolutionOnLeaves)
}
}

Figure 11A:
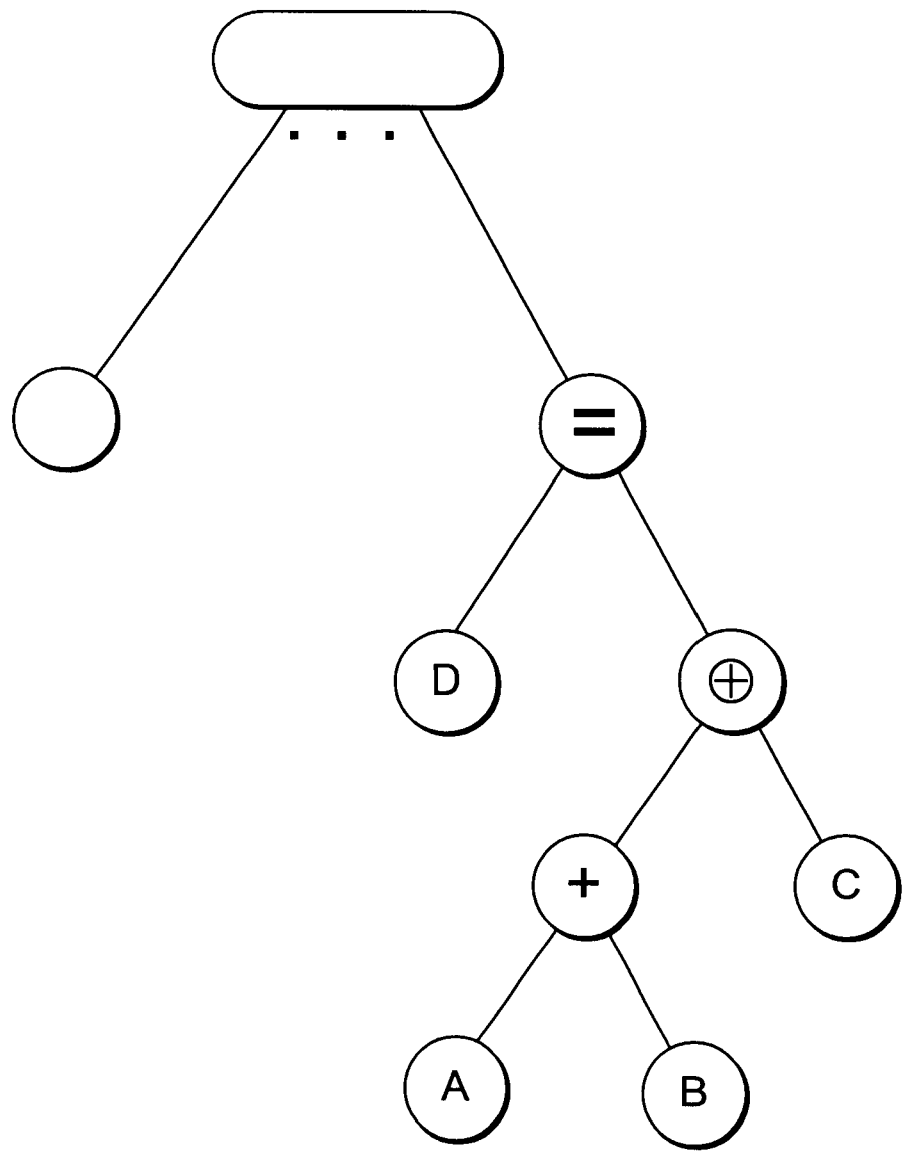
FIGS. 11A–11C illustrate the transforming of nested convolutions during phase 1.
Figure 11B:
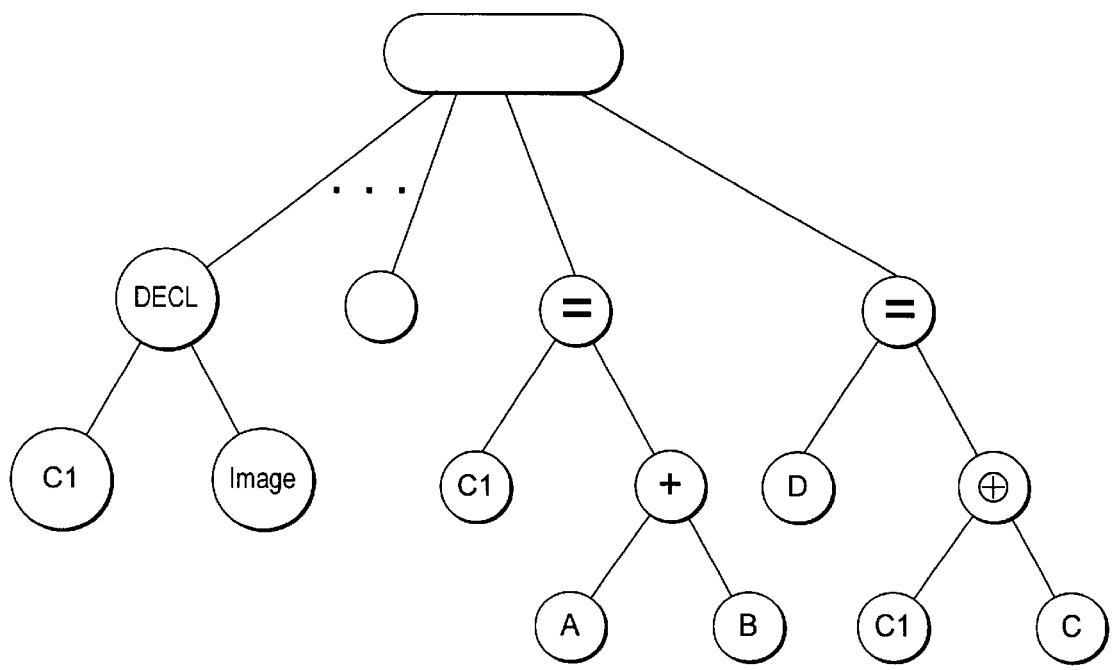
Figure 11C:
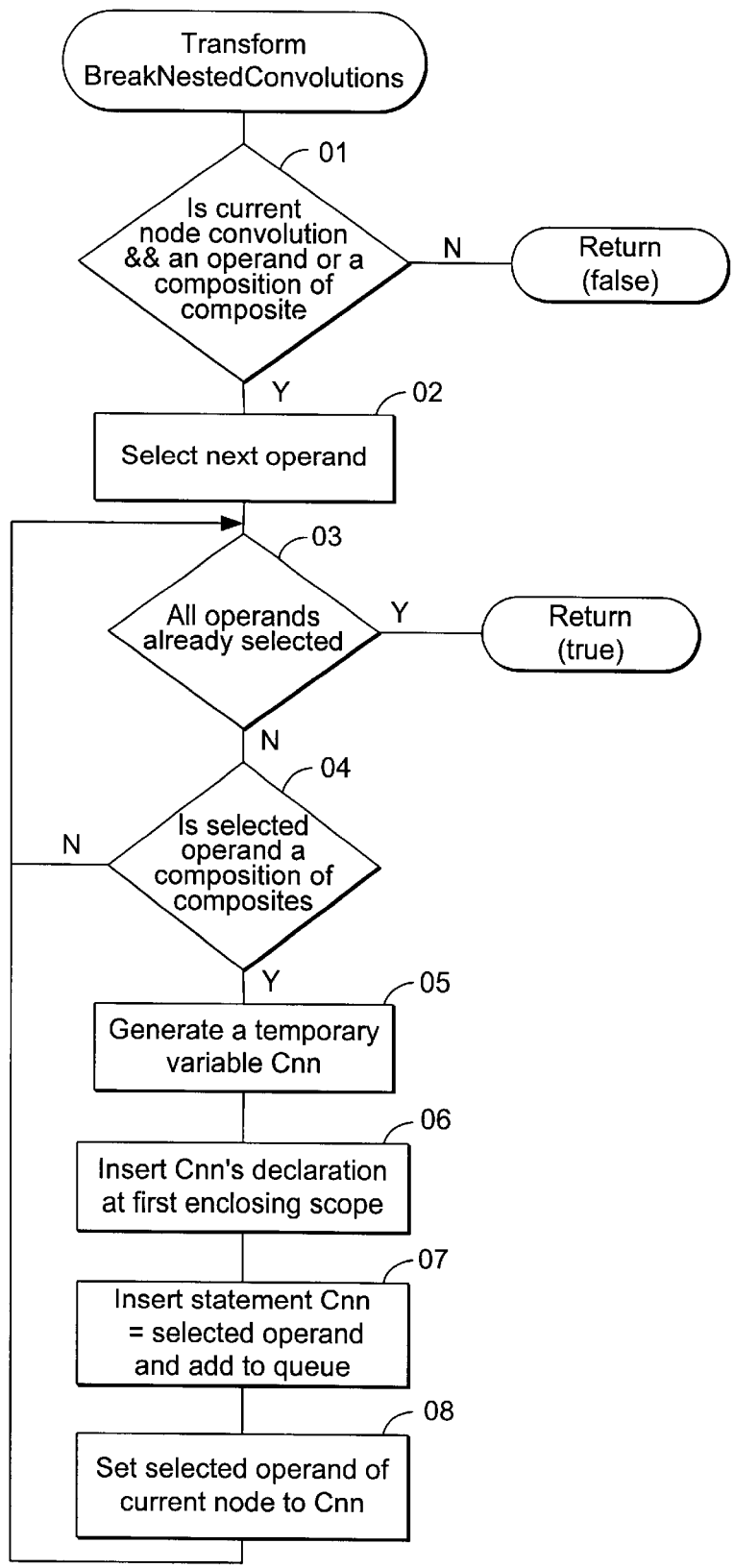

FIG. 11A–11C illustrate the transforming of nested convolutions during phase 1. The transform BreakNestedConvolutions is defined for the operators within the group ConvolutionOps. The transform determines whether the root node refers to a convolution operator and whether at least one of the operands is a composition of a composite data structure (e.g., A+B, where A and B are images). If so, then the transform generates a temporary composite data structure, adds a statement to the AST to assign the result of the composition to the temporary structure, and replaces the expression of the composition in the current subtree with a reference to the temporary structure. FIGS. 11A and 11B illustrate a subtree before and after the transform is applied. The subtree represents the statement D=(A+B)⊕C. The transform adds a new portion to the AST representing the statement C1=A+B and revises the current subtree to D=C1⊕C. The variable C1 represents the temporary composite data structure. FIG. 1C is a flow diagram of the transform BreakNestedConvolutions. In step 1101, if the root node indicates a convolution operator and one of the operands is a composition of composites, then the transform continues at step 1102, else the transform returns an indication of false. In steps 1102–1108, the transform loops selecting and processing each operand. In step 1102, the transform selects the next operand. In step 1104, if both operands have already been selected, then the transform returns an indication of true, else the transform continues at step 1104. In step 1104, if the selected operand is a composition of composites, then the transform continues at step 1105, else the transform loops to step 1102. In step 1105, the transform defines a temporary variable of the form Cnn of the composite type, where nn represents a number generated by the AO system so that the variable name is unique. In step 1106, the transform inserts the declaration for the variable Cnn at the first enclosing scope of the current subtree. In step 1106, the transform inserts a statement assigning the value of the selected composition to the variable before the statement containing the current subtree and adds the statement to the to-be-processed queue so that anticipatory optimizations can be applied to the statement. In step 1108, the transform sets the selected operand at the current node to the variable Cnn and loops to step 1102.

Figure 12A:
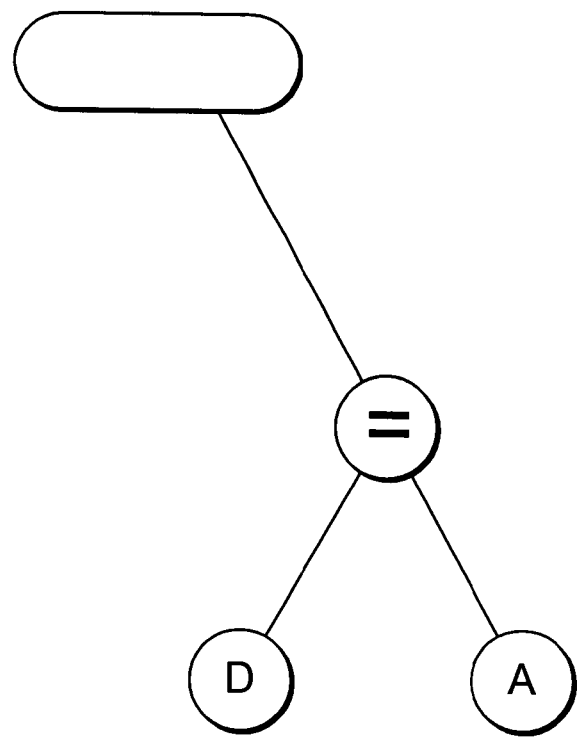
FIGS. 12A–12C illustrate the transforming of composite leaf nodes during phase 2.
Figure 12B:
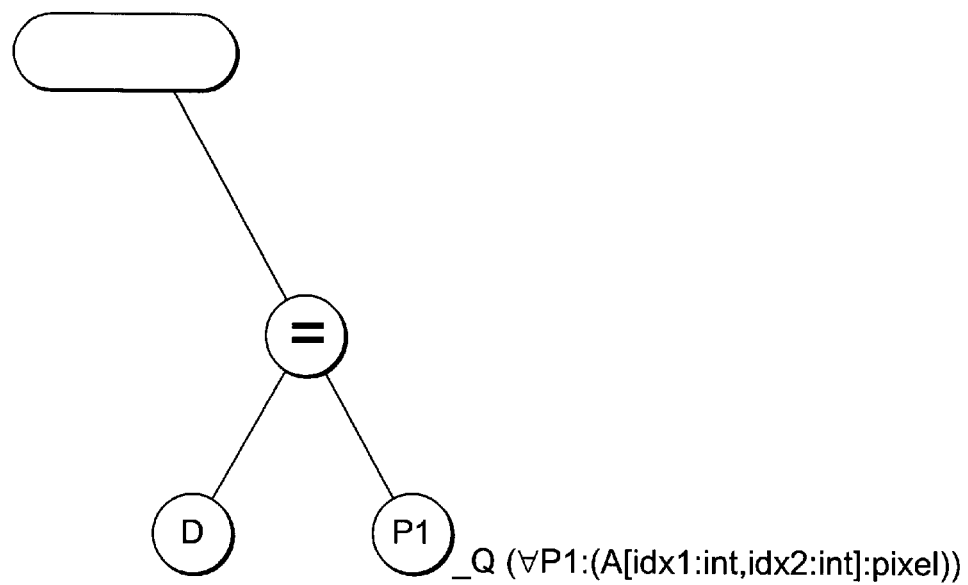
Figure 12C:
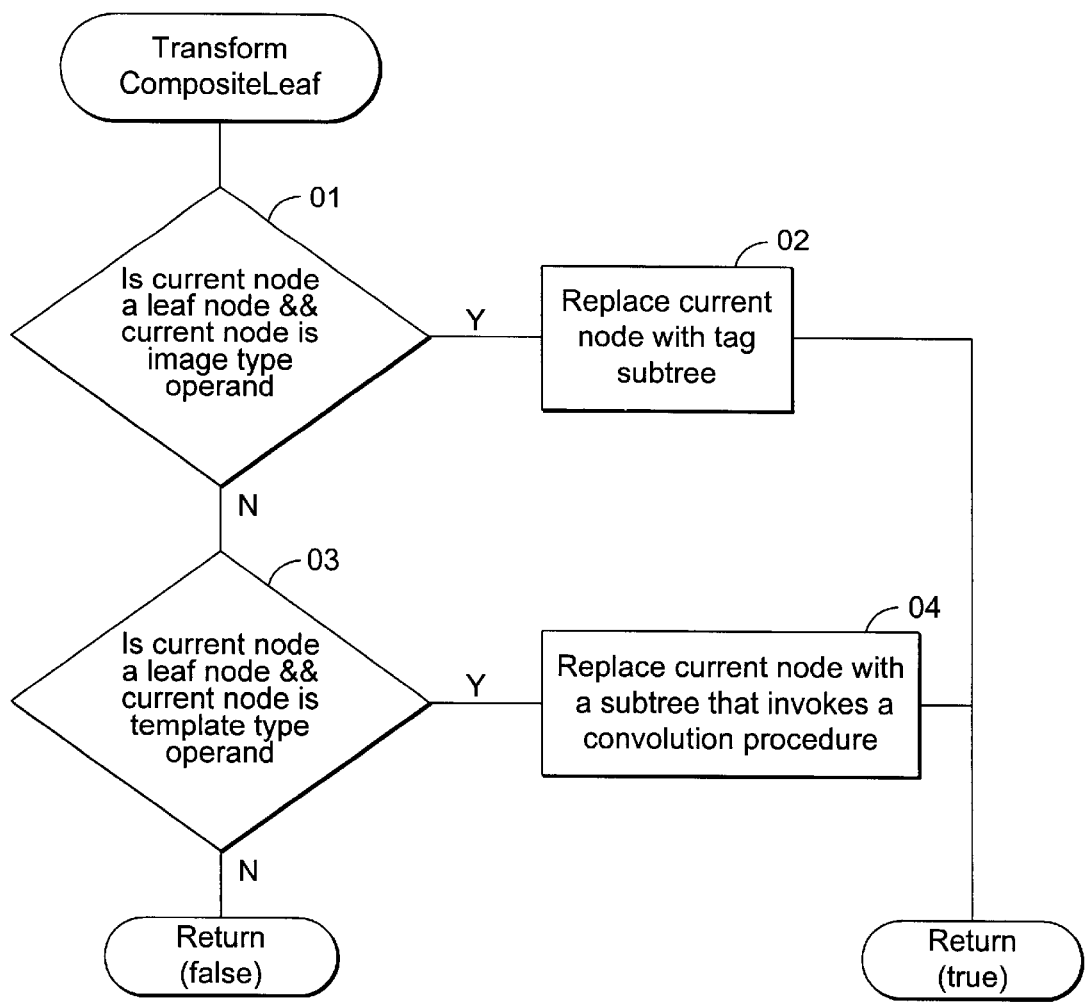

FIGS. 12A–12C illustrate the transforming of composite leaf nodes during phase 2. The transform CompositeLeaf is defined for the operands that are a subtype of the type composite. If a leaf node refers to an operand that is a composite (e.g., an image), then the transform adds the appropriate optimization tag. FIGS. 12A–12B illustrate a subtree before and after the transform is applied. The subtree represents the statement D=A, where D and A are images. The transform replaces the leaf node with a node that refers to iteration operand p1 and adds the following tag:

_Q(∀p1:(A[idx1:int,idx2:int]:pixel))

FIG. 12C is a flow diagram of the transform CompositeLeaf. In step 1201, if the root node of the subtree is leaf node and the operand type is an image, then the transform continues at step 1202, else the transform continues at step 1203. In step 1202, the transform replaces the subtree with a node with the iteration operand and a quantifier tag and returns true. In step 1203, if the root node of the subtree is a leaf node and the operand type is a template, then the transform continues at step 1204, else the transform returns false. In step 1204, the transform returns true with no change to the node so that the processing moves on to the parent node, which is a general convolution operator (i.e., ⊕). A later transform in a later phase (i.e., ReduceConvolutionOperator) uses this unaltered leaf as an argument in the call to the general convolution function to be generated from its processing of the general convolution operator one level above this leaf in the AST. Indeed, there is the opportunity for ReduceConvolutionOperator transform to generate highly optimized code for the general convolution operator by inlining much of the template code.

Figure 13A:
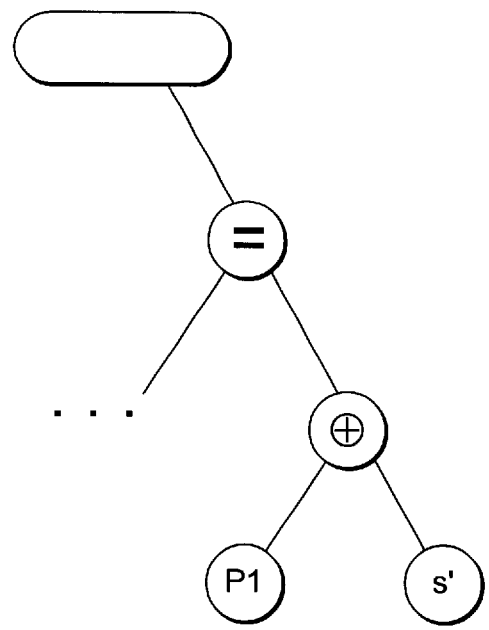
FIGS. 13A–13C illustrate the transforming that migrates a quantifier tag to a node that references the convolution operator during phase 2.
Figure 13B:
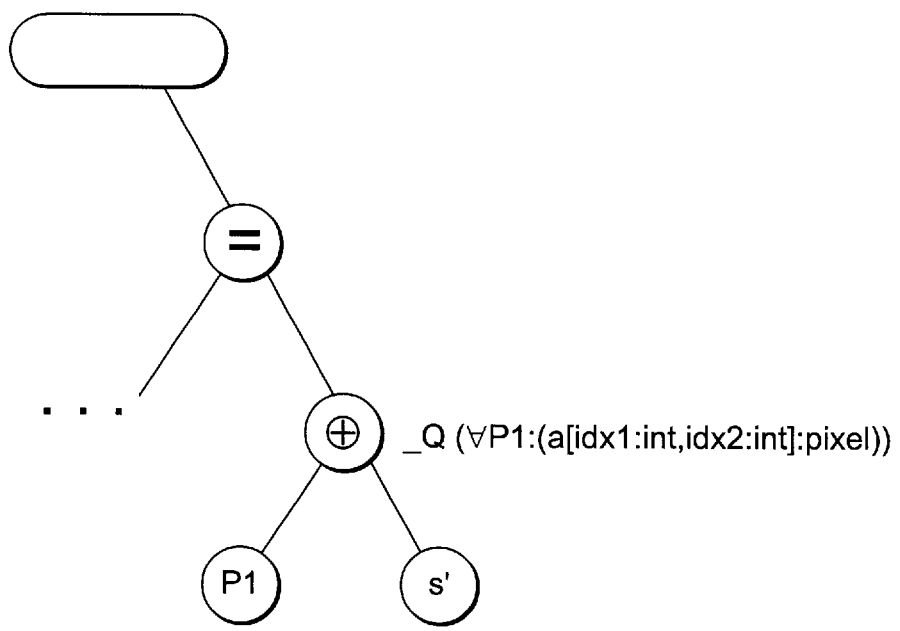
Figure 13C:
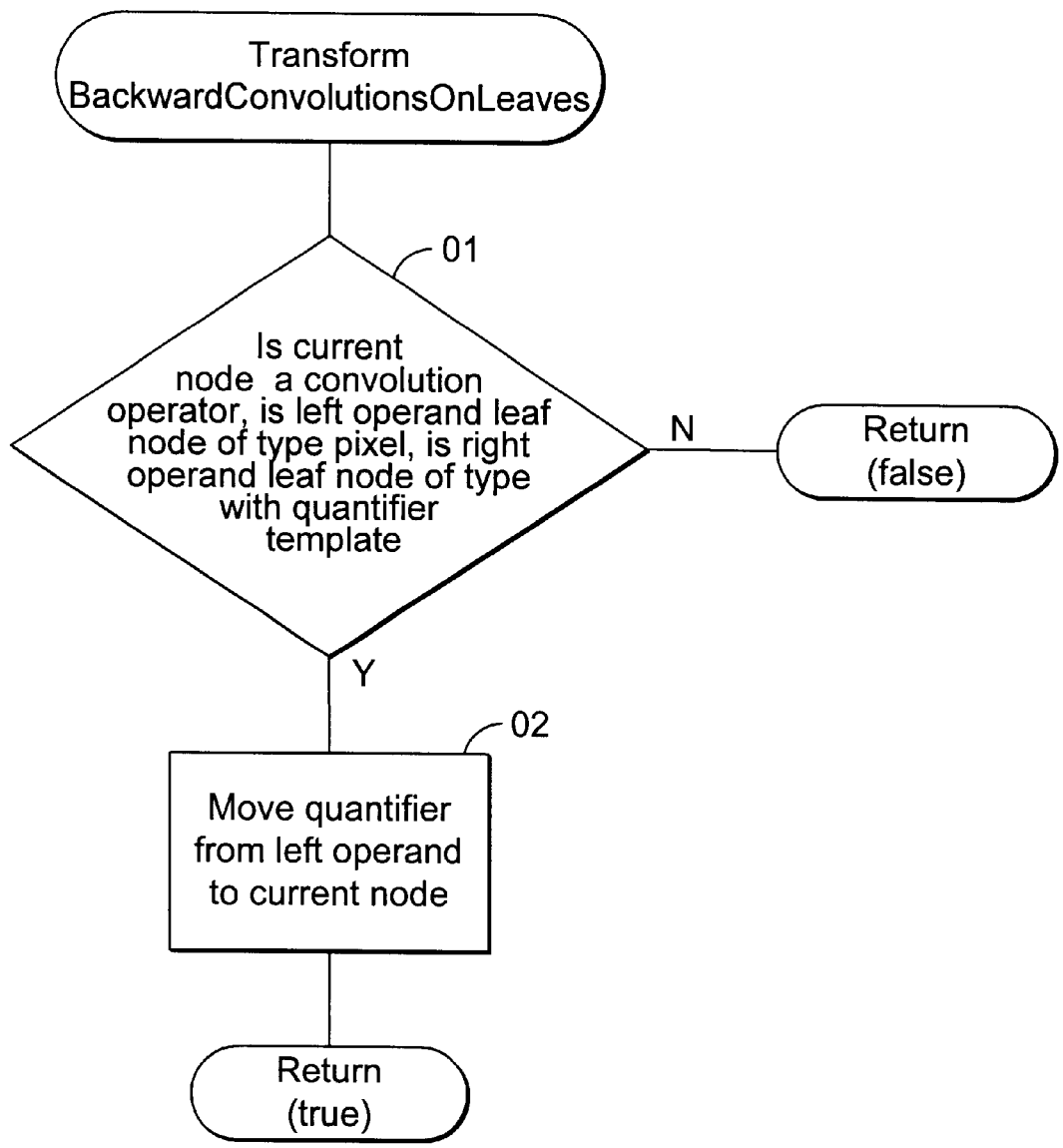

FIGS. 13A–13C illustrate the transforming that migrates a quantifier tag to a node that references the convolution operator during phase 2. The transform BackwardConvolutionOnLeaves is defined for the operators in the group BackwardConvolution. If the left operand is a pixel (e.g., iteration operand) and the right operand is a template, then a quantifier tag of the left operand is moved to the node of the convolution operator. FIGS. 13A–13B illustrate a subtree before and after the transform is applied. FIG. 13C is a flow diagram of a transform BackwardConvolutionOnLeaves. In step 1301, if the root node of the subtree is a convolution operator, if the left operand is a leaf node of type pixel with a quantifier and if the right operand is a leaf node of type template, then the transform continues at step 1302, else the transform returns false. In step 1302, the transform moves a quantifier tag from the left operand to the current node and returns a true.

Figure 14:
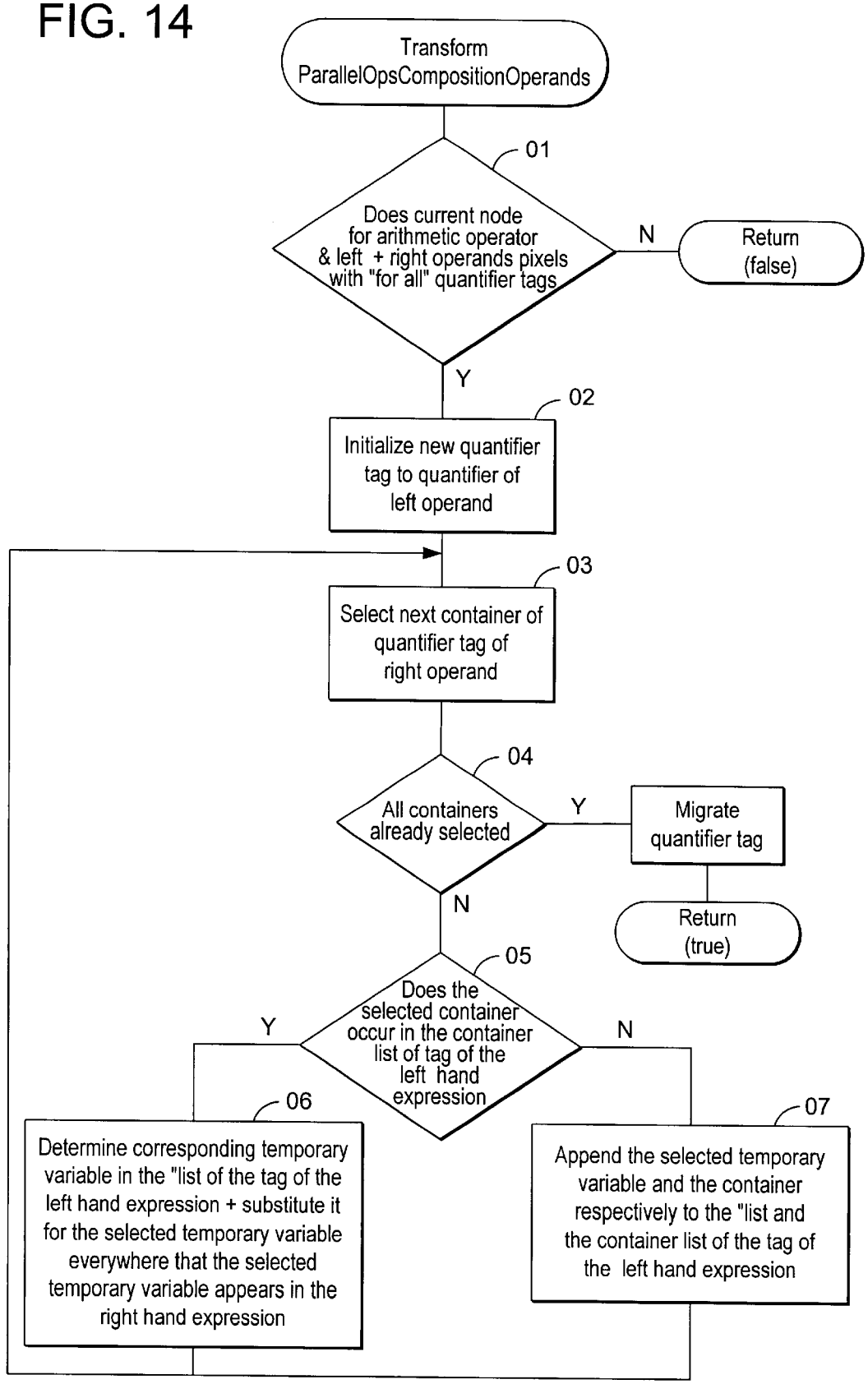
FIG. 14 is a flow diagram that illustrates the transforming of parallel operators of composite operands during phase 2.

FIG. 14 is a flow diagram that illustrates the transforming of parallel operators of composite operands during phase 2. The transform ParallelOpsCompositeOperands is defined for the operators in the ParallelOps group. This transform is applied when the operator is an arithmetic operator and the left and right operands are composite operands with the "forall" quantifier tags. The transform coalesces and migrates the quantifier tag to the operator node. If both the left and right quantifier tags refer to the same container (i.e., composite data structure), then the iteration operand for accessing the composite data structures can be shared. The index variables can also be shared. The transform initializes the new quantifier tag to contain the iteration operands, the containers, and the index variables of the quantifier tag of the left operand. The transform then adds those iteration operands and containers of the quantifier tag of the right operand for each container that is not already in the new quantifier tag. When a container is already in the new quantifier tag, the transform replaces each reference to the iteration operand for that container in the right operand to refer to the iteration operand for that container that is in the new quantifier tag. The transforms may also handle containers of different sizes. For example, in the expression (A+B)+A A and B are images that may be of the same dimensions or different dimensions. If they have different dimensions, then a code generation transforms in a later transformation phase generates appropriate case logic within the common enclosing loop to process the overlapping regions differently from the non-overlapping regions. Thus, a programmer can use A and B without reference to whether or not they have the same dimensions. The transform may replace expression (A+B) by an expression of temporary variables, p27 and p28, of the form (p27+p28) of type pixel and annotate the new expression with a quantifier tag of the form:

_Q(∀<p27|p28>:(<A|B>[idx1:int, idx2:int]:pixel)).

The transform may replace the last instance of A in the expression with a temporary variable, p29, of type pixel, p29, and annotate the new expression with is a quantifier tag of the form:

_Q(∀p29:(A[idx3:int, idx4:int]: pixel)).

In a shared loop, p27 and p29 reference the same data structure and this equivalence can be identified because of the equivalence of the instance of A in <A|B> of the first quantifier tag and A itself in the second quantifier tag. Therefore, the transform will replace p29 by p27 transforming the expression from ((p27+p28)+p29)

to (p27+p28)+p27)

which will be annotated with the combined quantifier tag of the form:

_Q(∀<p27|p28>:(<A|B>[idx1:int, idx2:int]:pixel)).

In step 1401, if the root node of the subtree is an arithmetic operator and the left and right operands are pixels (i.e., iteration operands) with the "forall" quantifier tags, then the transform continues at step 1402, else the transform returns false. In step 1402, the transform initializes the new quantifier tag to the quantifier tag of the left operand. In steps 1403–1407, the routine loops checking for duplicates in the quantifier tag of the right operand. The transform checks for duplicates in the user-defined container names (e.g., the container image A) not the temporary variables because the temporary variables all have unique names. Once a duplicate like A is found, the corresponding temporary variable (e.g., p29) can be found because it is at the same position as A within the list immediately following the ∀ in the right quantifier tag (i.e., the list of temporary variables generated by the various transforms). The same logic is used to find the temporary variable corresponding to A in the left quantifier tag. Thus, p27 and p29 are identified as equivalent data items. Using this correspondence, the transform then substitutes p27 for p29 everywhere it occurs in the right expression, which produces the expression ((p27+p28)+p27) shown above. Any remaining temporary variables and containers in the right quantifier tag (i.e., ones that were not duplicates) are appended to the temporary variables and containers of the left quantifier tag, which will become the new quantifier tag attached at the operator level. In the example, there are no remaining temporary variables and containers in the right quantifier tag, so the left quantifier tag becomes the quantifier tag for the overall expression. In step 1403, the transform selects the next container of the quantifier tag of the right operand. In step 1404, if all the containers of the quantifier tag of the right operand have already been selected, then the transform continues at step 1408, else the transform continues at step 1405. In step 1405, if the selected container has already been placed in the new quantifier tag, then the transform continues at step 1406, else the transform continues at step 1407. In step 1407, the transform updates the nodes of the right operand which had referenced iteration operands for the duplicate container to contain the iteration operand and associated with that container that is already in the new quantifier tag. In step 1407, the transform adds the iteration operand and container to the new quantifier tag and loops to step 1403 to select the next container. In step 1408, the transform migrates the quantifier tag to the current node by adding the new quantifier tag to the current node and removing the quantifier tags for the left and right operands.

Figure 15:
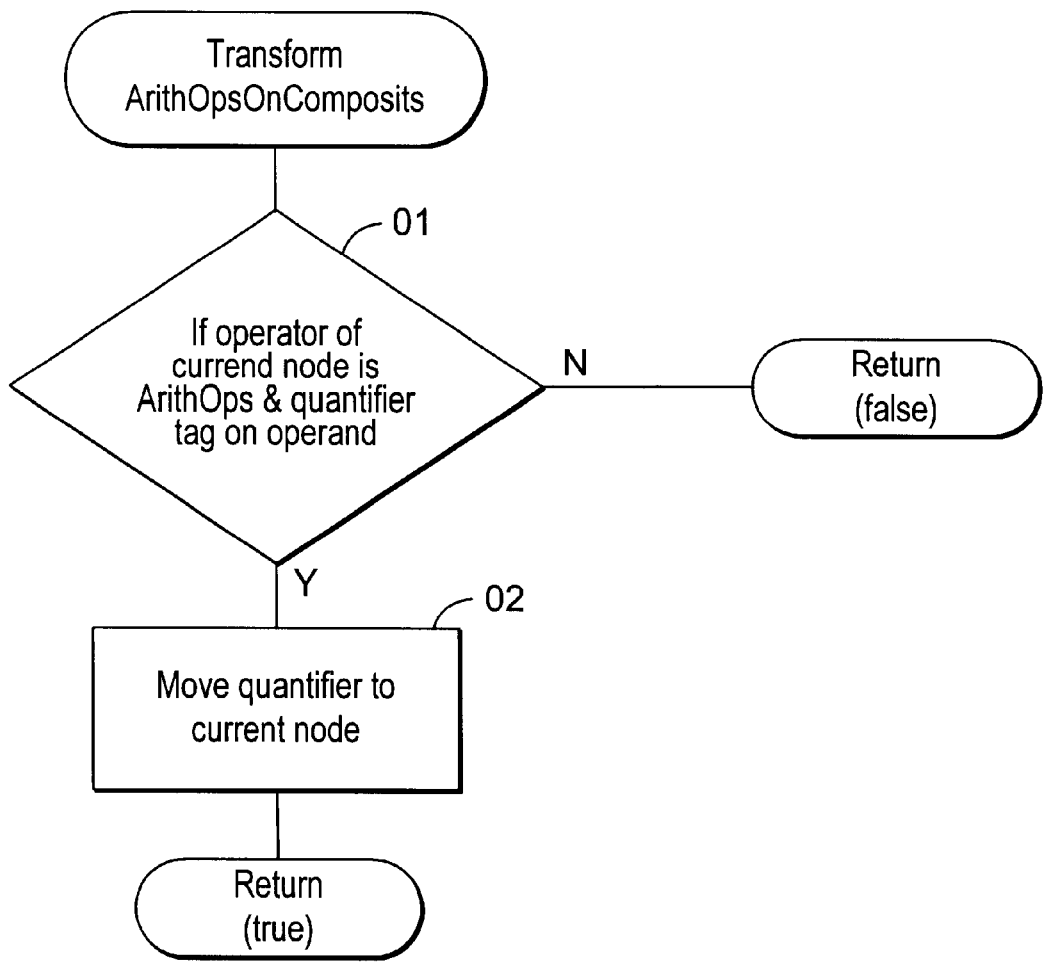
FIG. 15 is a flow diagram that illustrates a transforming arithmetic operators on composite data structures.

FIG. 15 is a flow diagram that illustrates a transforming arithmetic operators on composite data structures. The transform ArithOpsOnComposites is defined for the operators in the ArithOps group. The transform migrates quantifier tag from the node of the operand to the current node. In step 1501, if the operator of the current node is an arithmetic operator with one operand and the operand has a quantifier tag, then the transform continues at step 1502, else the transform returns false. In step 1502, the transform moves the quantifier from the operand to the current node and returns true.

The following transforms are code generation transforms that are applied in phase 3. These transforms assume that all optimization tag migrating and coalescing is complete. Therefore, since all the anticipatory optimizations have been noted, these transforms convert the AST to low-level computational constructs.

Figure 16:
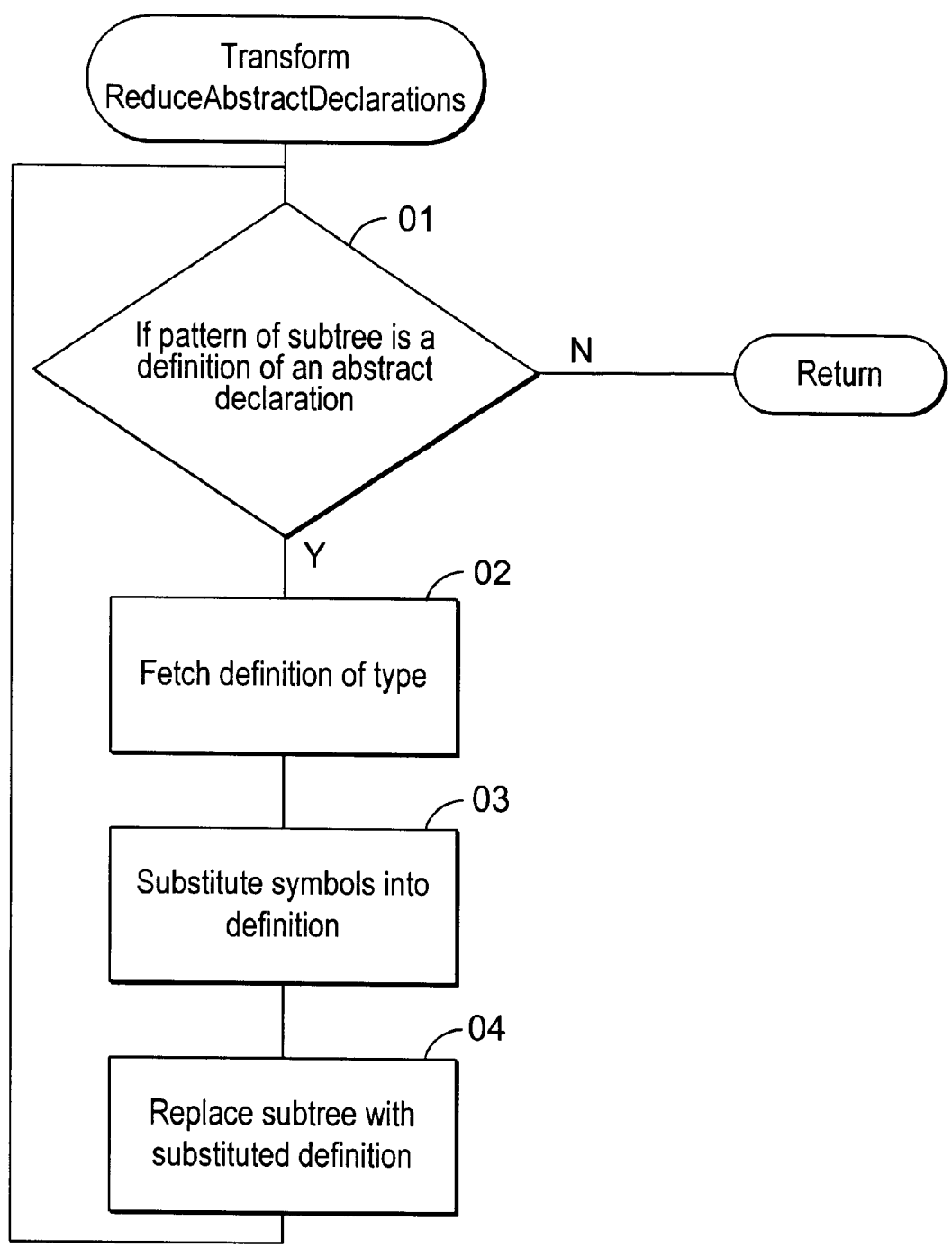
FIG. 16 is a flow diagram that illustrates transforming that reduces high-level declarations.

FIG. 16 is a flow diagram that illustrates transforming that reduces high-level declarations. The transform ReduceAbstractDeclarations is defined for operands that are subtype of the composite type. This transform operates much like a macro substitution by binding the definitions of the types to the symbols of the high-level type declaration. In step 1601, if the subtree refers to a definition of high-level (i.e., abstract) declaration, then the routine continues at step 1602, else the routine returns true. In step 1602, the transform retrieves the definition of the high-level type. In step 1603, the transform substitutes the symbols of the high-level declaration into the defined lower-level declaration. In step 1604, the transform replaces the subtree with the substituted declaration and loops to step 1601 to further reduce the substituted subtree. Once the definition is completely reduced to C, the transformation returns true indicating that it succeeded.

Figure 17A:
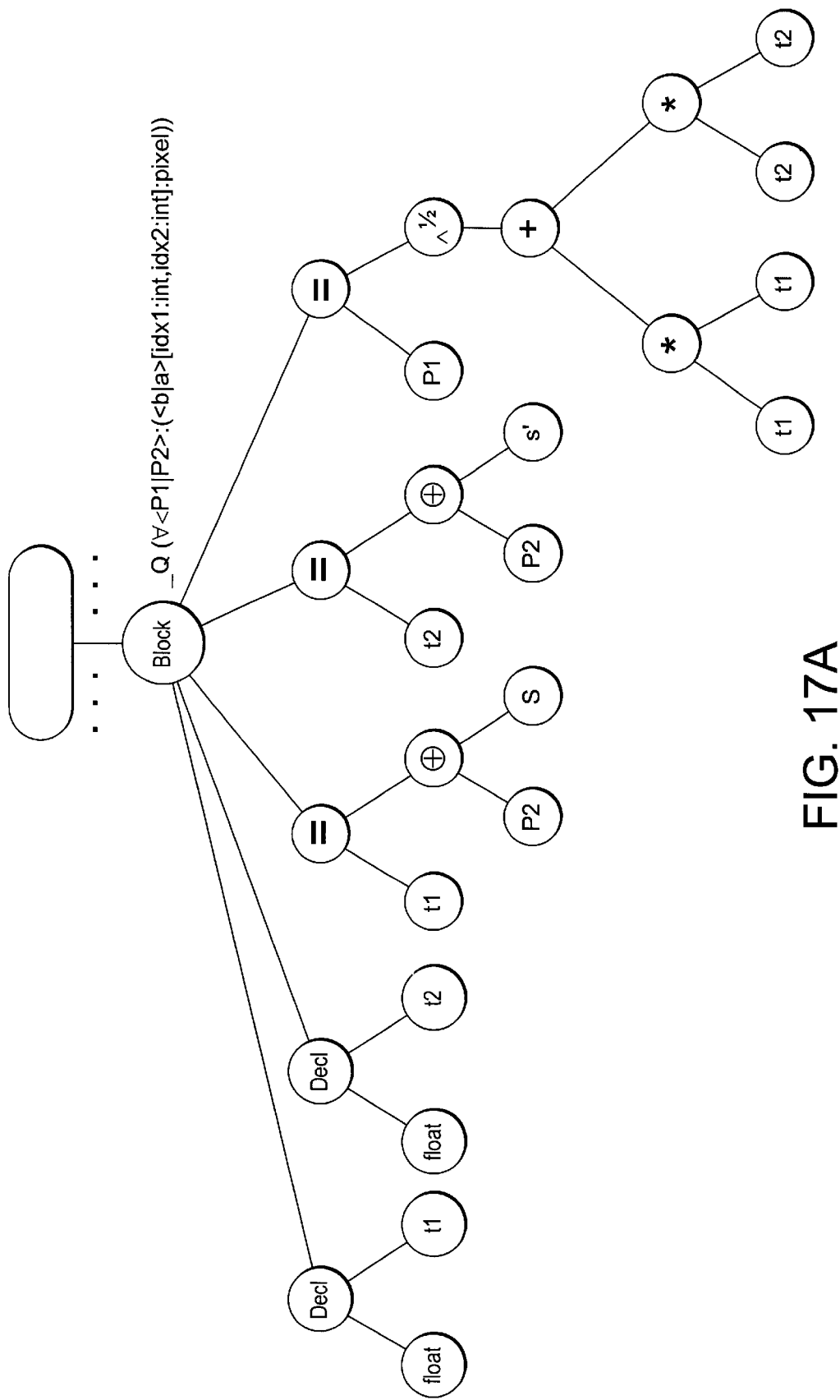
FIGS. 17A–17B illustrate the transforming for a power operator for code generation.
Figure 17B:
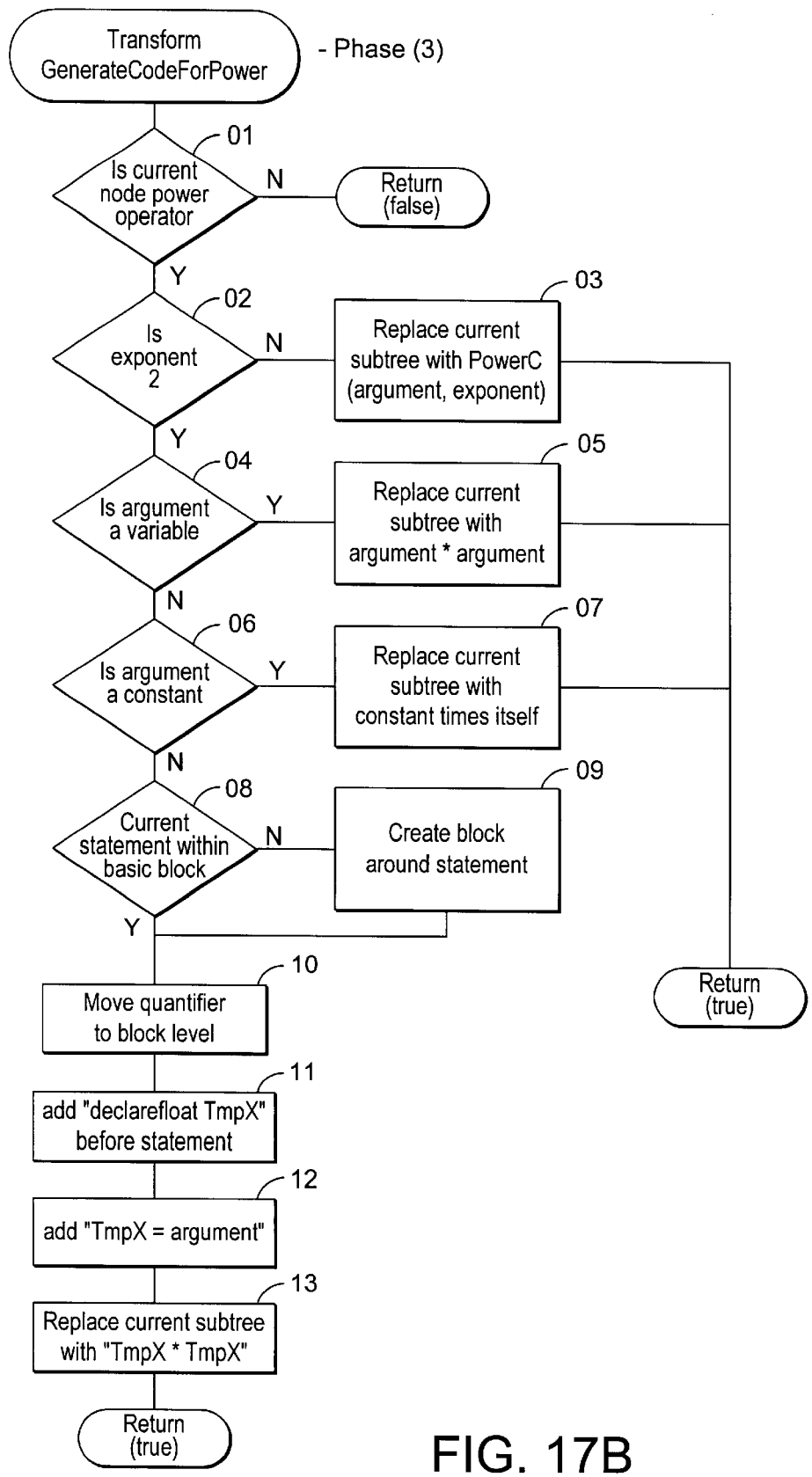

FIGS. 17A–17B illustrate the transforming for a power operator for code generation. FIG. 17A illustrates the transformation of the subtree of FIG. 41 after the power transform has been applied. When the power operator is 2, there are several optimizations that can be made. For example, it may be more computationally efficient to multiply the argument by itself rather than invoking a more general power function. As shown, a block node has been defined and the quantifier tag has been migrated from the assignment node to the block node. In addition, declaration nodes and assignment nodes have been defined. The new temporary variables t1 and t2 are set to the value of the operand that is to be squared. That squaring is performed by the multiplication of variable t1 by itself and by the multiplication of variable t2 by itself. FIG. 17B is a flow diagram of a transform to generate code for the power operator during phase 3. The transform GenerateCodeForPower is defined for the power operator. In step 1701, if the current node refers to a power operator, then the transform continues at step 1702, else the transform returns false. In step 1702, if the exponent is 2, then the transform continues at step 1704, else the transform continues at step 1703. In step 1703, the transform replaces the current subtree with an invocation to a function to raise the argument to the exponent and returns an indication of true. In step 1704, if the argument is a variable, then the routine continues at step 1705, else the routine continues at step 1706. In step 1705, the transform replaces the current subtree with a subtree in which the argument is multiplied by itself and returns true. In step 1706, if the argument is a constant, then the transform continues at step 1707, else the transform continues at step 1708. In step 1707, the transform replaces the current subtree with a reference to a constant value that is equal to the argument squared and returns true. In step 1708, if the current statement is within a basic block, then the transform continues at step 1710, else the transform continues at step 1709. In step 1709, the transform creates a block around the statement. In step 1710, the transform moves the quantifier tag for the current node to the block level. In step 1711, the transform adds a declaration for a temporary variable before the statement. In step 1712, the transform adds a statement to set the temporary value to the argument. In step 1713, the transform replaces the current subtree with a subtree that indicates its temporary variable should be multiplied by itself and returns true.

Figure 18:
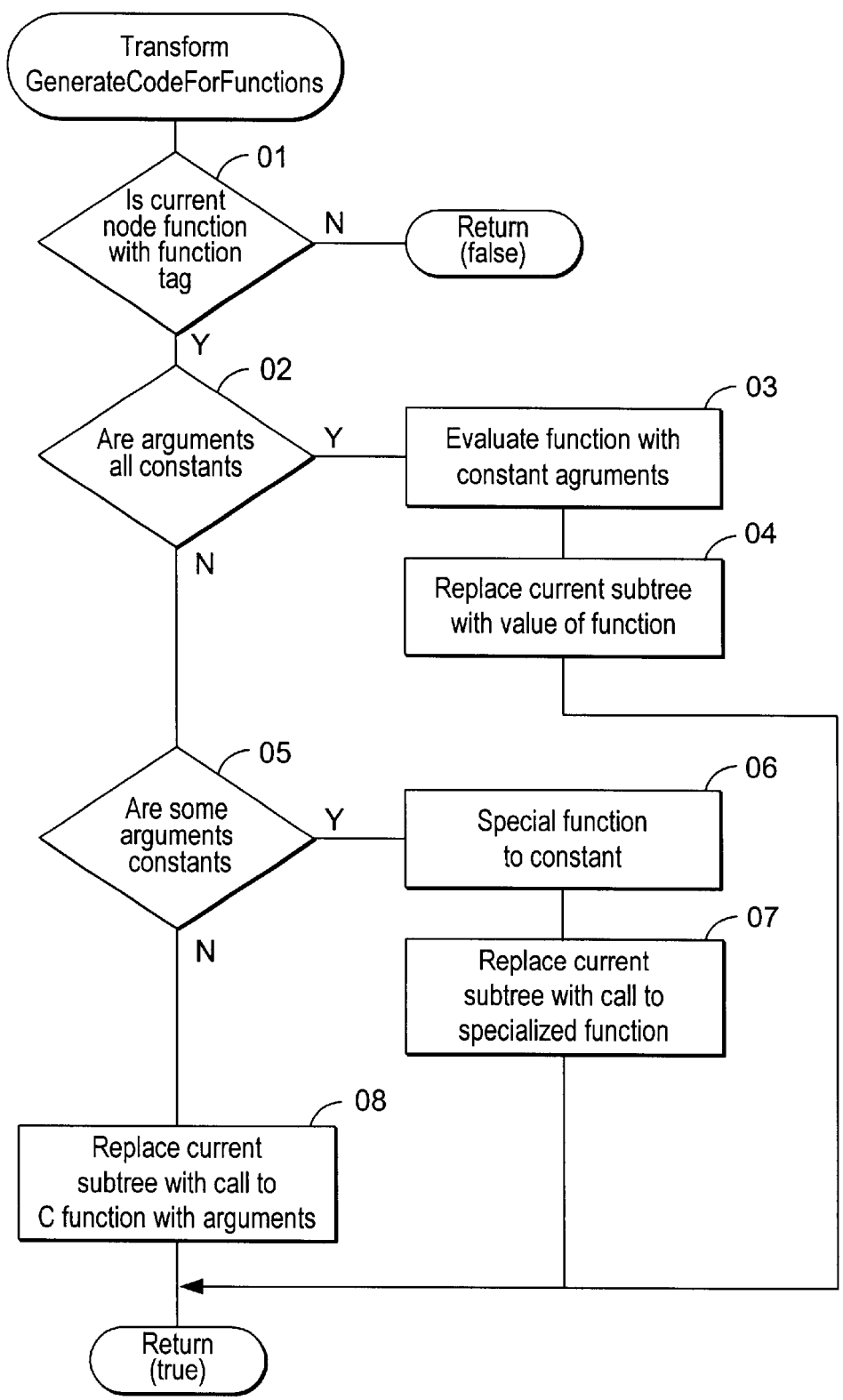
FIG. 18 is a flow diagram of a transform to generate code for a function invocation during phase 3.

FIG. 18 is a flow diagram of a transform to generate code for a function invocation during phase 3. The transform GenerateCodeForFunctions is defined for the user-defined, mathematically pure functions that are within the ArithOps group. Such functions are not directly translatable into single operators that are built into conventional languages. However, since they are mathematically pure functions (i.e., no side effect and no dependencies other than on their parameters), they have properties that are similar to operators (e.g., they can be manipulated and moved like operators) and their definitions are easily manipulated and optimized by automated tools. Specialization (e.g., eliminating the runtime parameter binding for constant parameters and eliminating some programming logic by executing it once at translation time) is a common and useful kind of optimization that is easily done on such functions. The objective of the GenerateCodeForFunctions transform is to exploit any such optimization opportunities that might present themselves in the code. If there are no such opportunities, the transform expresses the functional invocation as a call to the runtime code produced by the definition of the function. If the actual arguments to the function are constant, then the transform will calculate the result of the function and replace the call to the function with a reference to a constant. If some of the actual arguments are constant, then the invocation to the function can be replaced by an invocation to a specialized function that relies on the constant values of the arguments.

Referring to FIG. 18, in step 1801, if the current node refers to a function and it has a function tag then the transform continues at step 1802, else the transform returns false. The function tag indicates that this transform can be applied. In step 1802, if all the actual arguments are constant, then the transform continues at step 1803, else the transform continues at step 1805. In step 1803, the transform evaluates the function with the constant arguments. In step 1804, the transform replaces the current subtree with a node with a reference to the constant value of that function and returns true. In step 1805, if some of the actual arguments are constant, then the transform continues at step 1806, else the transform continues at step 1808. In step 1806, the transform specializes the function to the constant value of the actual arguments. In step 1807, the transform replaces the current subtree with a call to the specialized function and returns true. In step 1808, the transform replaces the current subtree with a call to a corresponding lower-level function and returns.

Figure 19:
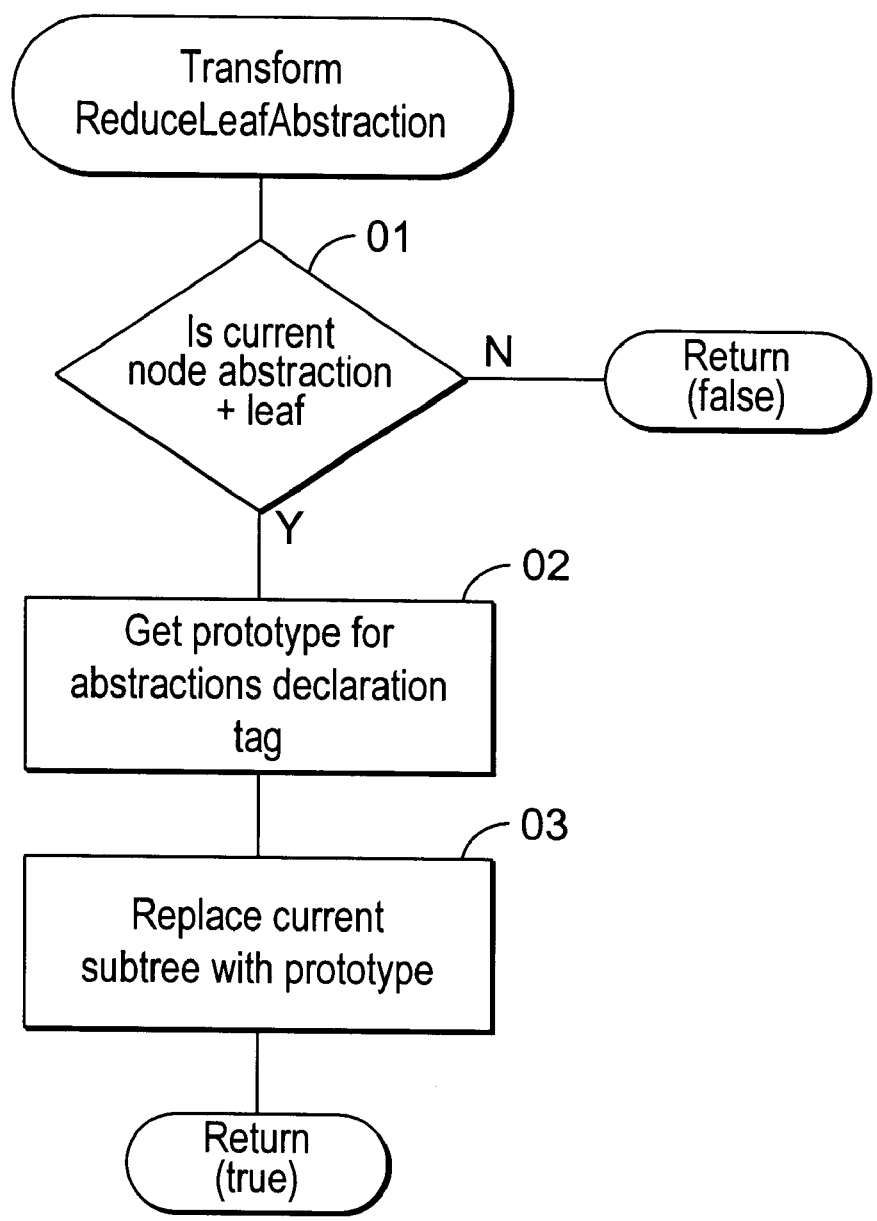
FIG. 19 is a flow diagram of a transform to reduce a leaf abstraction.

FIG. 19 is a flow diagram of a transform to reduce a leaf abstraction. The transform ReduceLeafAbstraction is defined for a subtype of the type Composite. This transform re-expresses high-level constructs such as iteration operands for pixels in terms of low-level programming constructs (e.g., matrix references) so that code can be generated for the operators. The information in the quantifier tag provides information to access the definition of the high-level construct. For example, a leaf (e.g., "p29") that is of type pixel will be implemented using the information from the tag associated with the leaf (e.g., "_Q($\forall$p29:(A[idx1:int, idx2:int]:pixel))"). So the implementation of the leaf for this example, would be "A[idx1, idx2]". In step 1901, if the current node is a leaf node and contains a reference to a data structure that is a subtype of the Composite type, then the transform continues at step 1902, else the transform returns false. In step 1902, the transform retrieves the prototype for the high-level declaration within the quantifier tag. In step 1904, the transform replaces the current subtree with a subtree in accordance with the retrieved prototype and returns true.

Figure 20A:
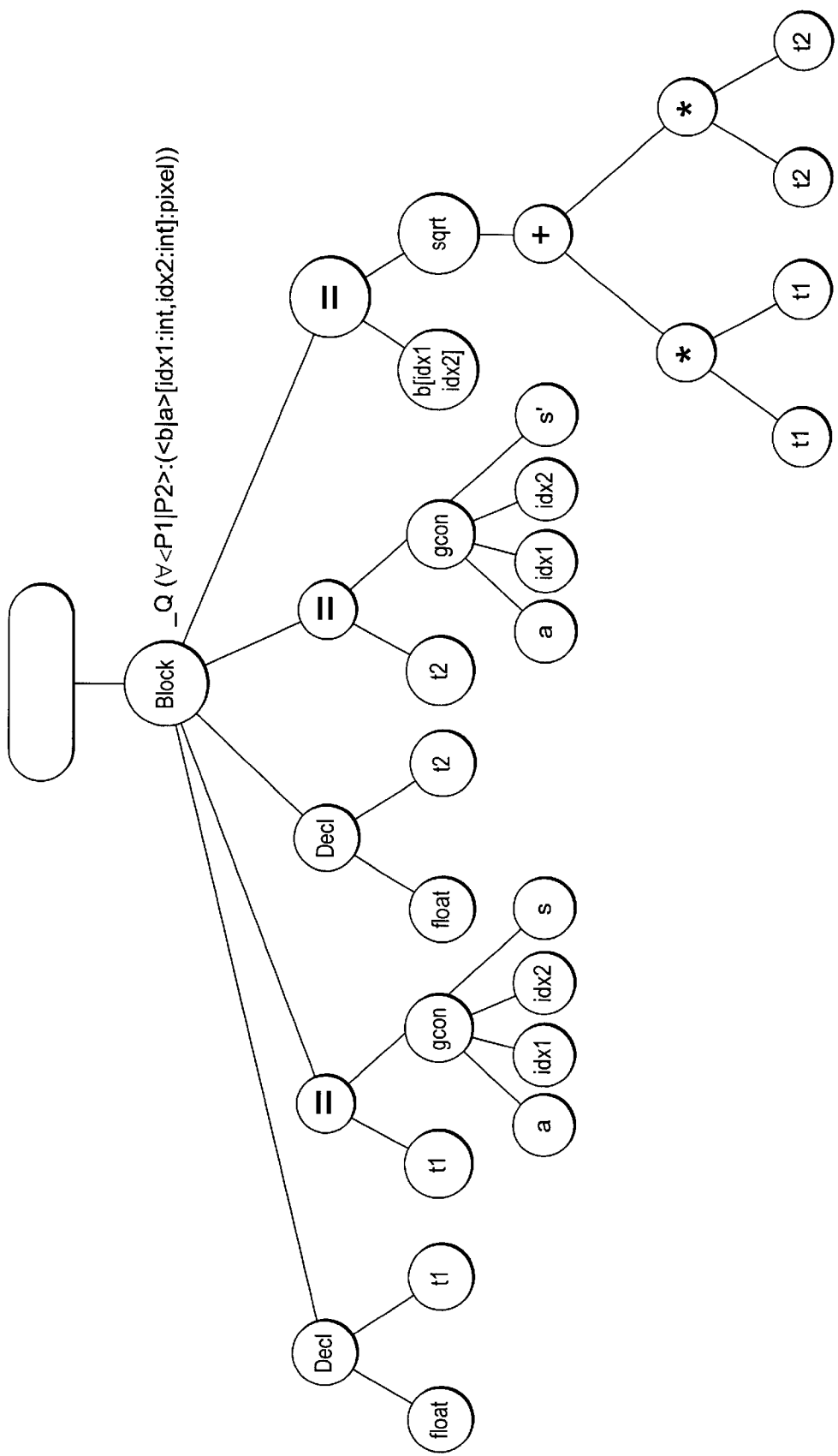
FIGS. 20A and 20B illustrate the transforming of a convolution operator to lower-level computational constructs.
Figure 20B:
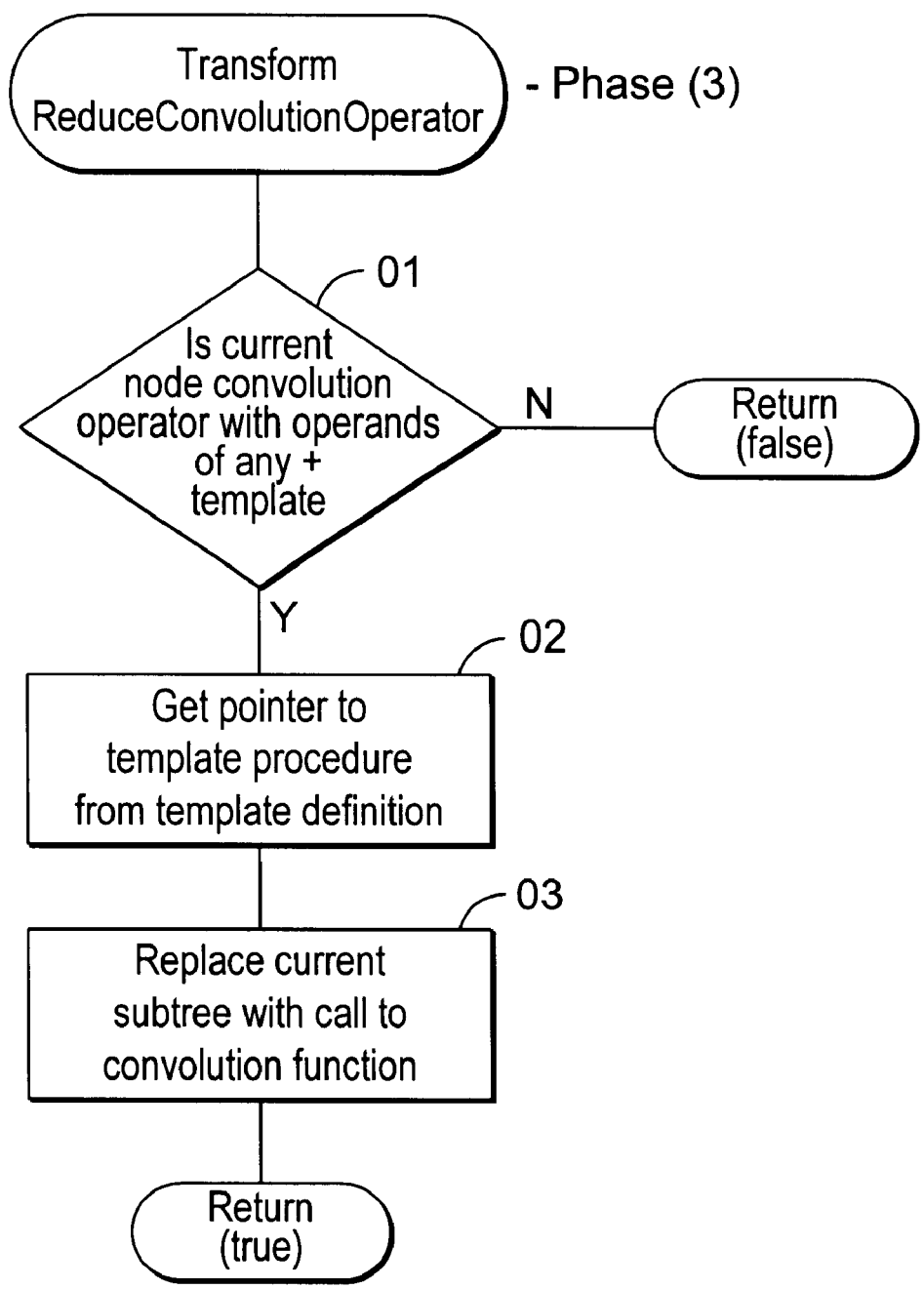

FIGS. 20A and 20B illustrate the transforming of a convolution operator to lower-level computational constructs. FIG. 20A illustrates the transforming of the subtree of FIG. 17A after the transforming of the convolution operator. This transform expresses the convolution operator as a call to a convolution function that performs the convolution. FIG. 20B is a flow diagram of a transform to reduce a convolution operator during phase 3. The transform ReduceConvolutionOperator is defined for the operators in the ConvolutionOps group. In step 2001, if the operator in the current node is a convolution operator with operands indicating to access an element of an image neighborhood defined by the right hand template operand where the neighborhood is centered on a specific image pixel defined by the left hand pixel operand and a template, then the transform continues at step 2002, else the transform returns false. In step 2002, the transform retrieves a reference to a procedure that applies the template to a pixel neighborhood in the image and returns the result. In step 2003, the transform replaces the current subtree with a call to the convolution operator passing the reference to the procedure and returns.

Figure 21A:
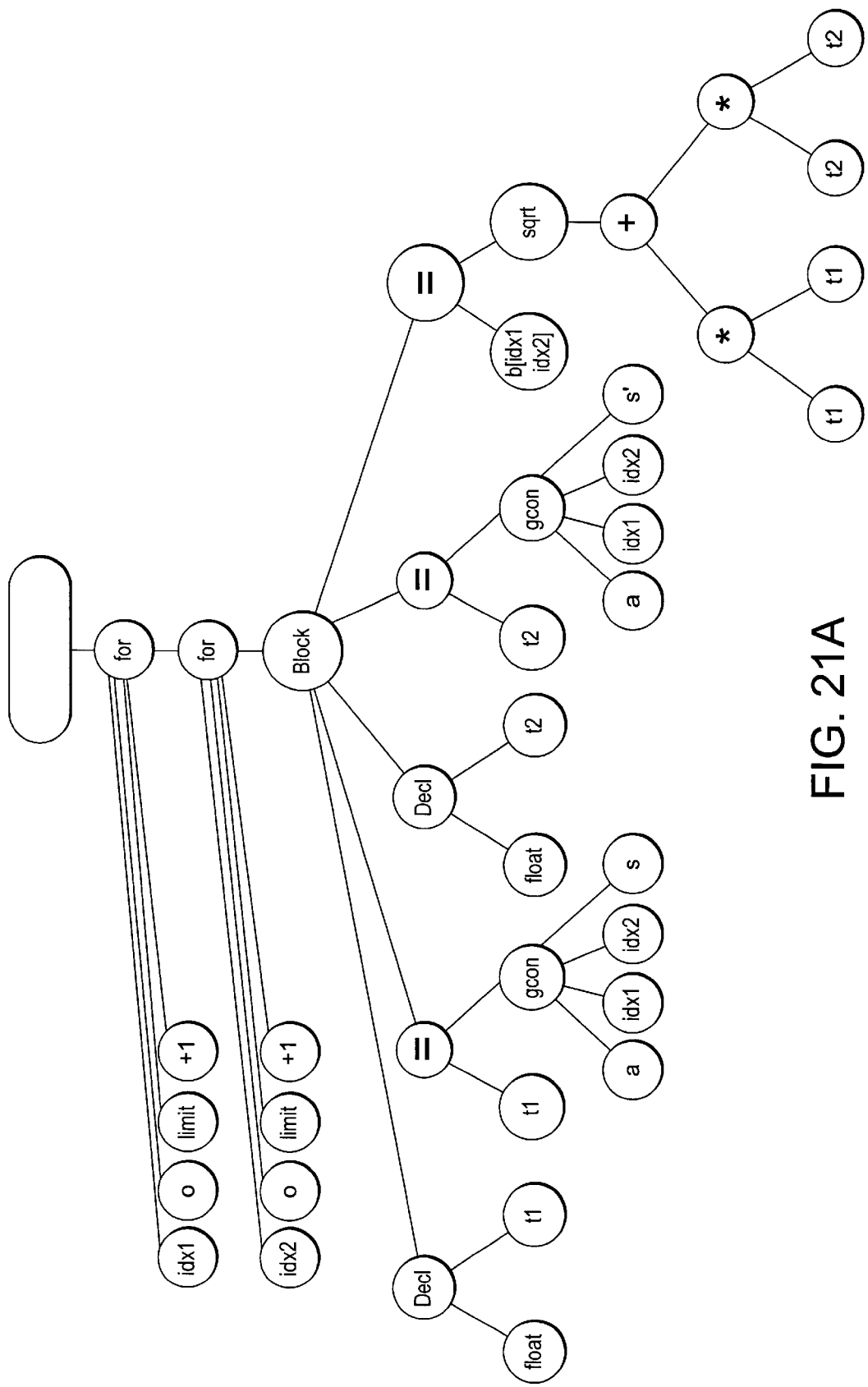
FIGS. 21A–21D illustrate the transforming of a subtree with quantifier tags.
Figure 21B:
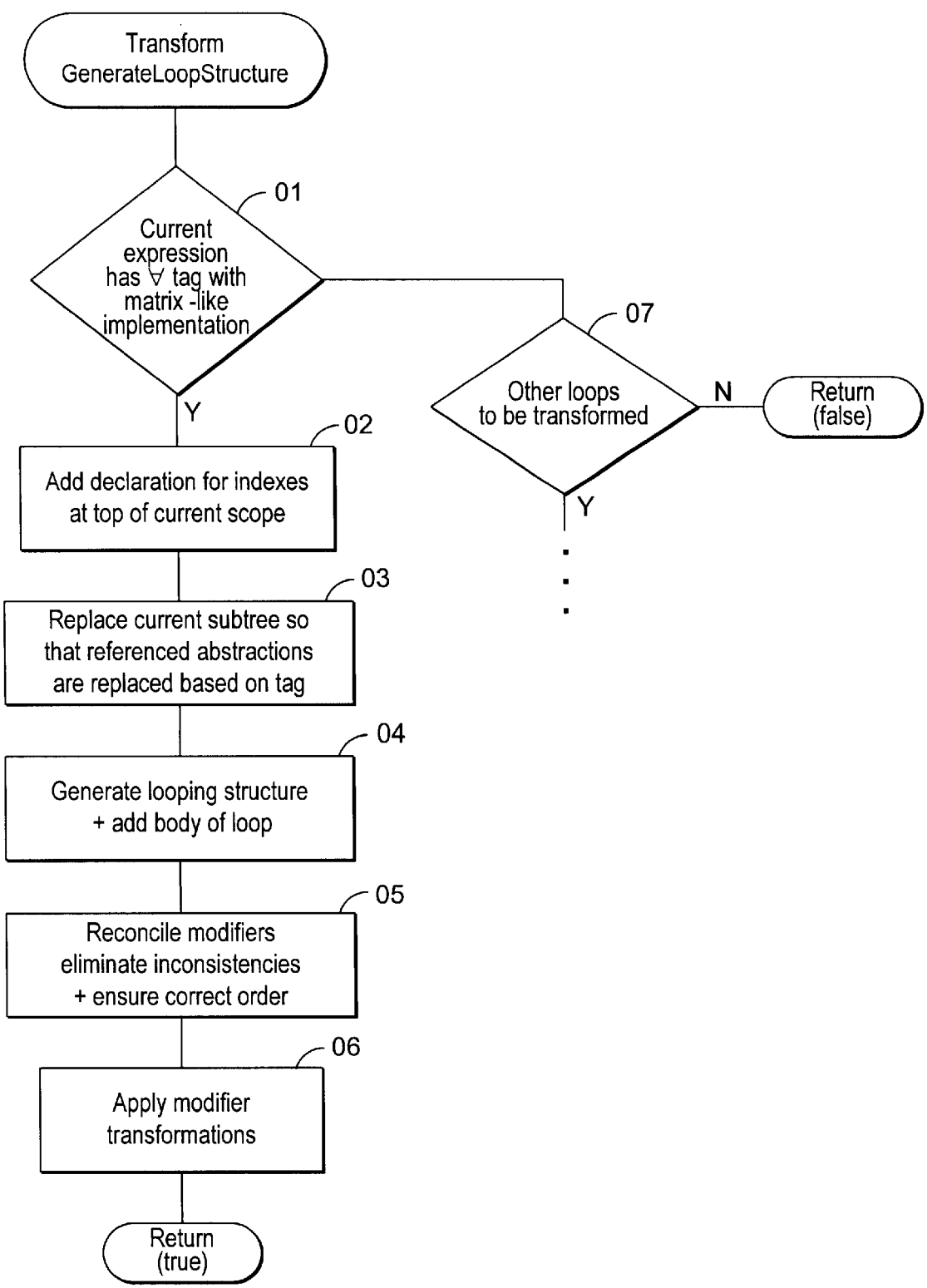

FIGS. 21A and 21B illustrate the transforming of a subtree with quantifier tags. FIG. 21A illustrates a portion of the subtree of FIG. 20A after the transform to add code for the quantifier tags. Two nodes for the "forall" loops have been added. FIG. 21B is a flow diagram of a transform to generate a loop structure for a "forall" quantifier tag. The transform GenerateLoopStructure is defined for all the operators in the image processing domain. In step 2101, if the current expression has a "forall" quantifier with a matrix-like implementation anticipated, then the transform continues at step 2102, else the transform continues at 2107. In step 2102, the transform generates declarations for the indexes of the "forall" and adds the declarations in the AST at the top of the current scope. In step 2103, the transform replaces in the current subtree each referenced abstract operand of the iteration (e.g., p) with an implementation expression (e.g., a[i,j]) for that abstract operand. In step 2104, the transform generates the looping structure (e.g., nested for convolution operations) and sets the body of the loop to the modified tree subtree. In step 2105, the transform begins processing of the modifiers by applying any transformations that identify inconsistent modifiers (e.g., one modifier that suggests unwrapping a loop and a second modifier that will not tolerate unwrapping) and then changing one or more of the inconsistent modifiers to make them consistent. This step will also order the modifiers if they have an ordering dependency. In step 2106, the transformations associated with the modifiers are applied to the subtree. The transform then returns true. In step 2107, the transform determines whether it can handle other loop patterns. If so, the transform continues to process the loop pattern, else the transform returns false.

The transform that changed the "(p1⊕s)" subtree into the "gcon(a,idx1,idx2,s)" subtree also added modifiers to the quantifier tag, which for simplicity were not shown in the previous examples. These are represented as "_PromoteAboveLoop(idx2,ConstantExpressionOf(idx1))" and "_PromoteToTopOfLoop (idx2, ConstantExpressionOf(idx2))."

Figure 21C:
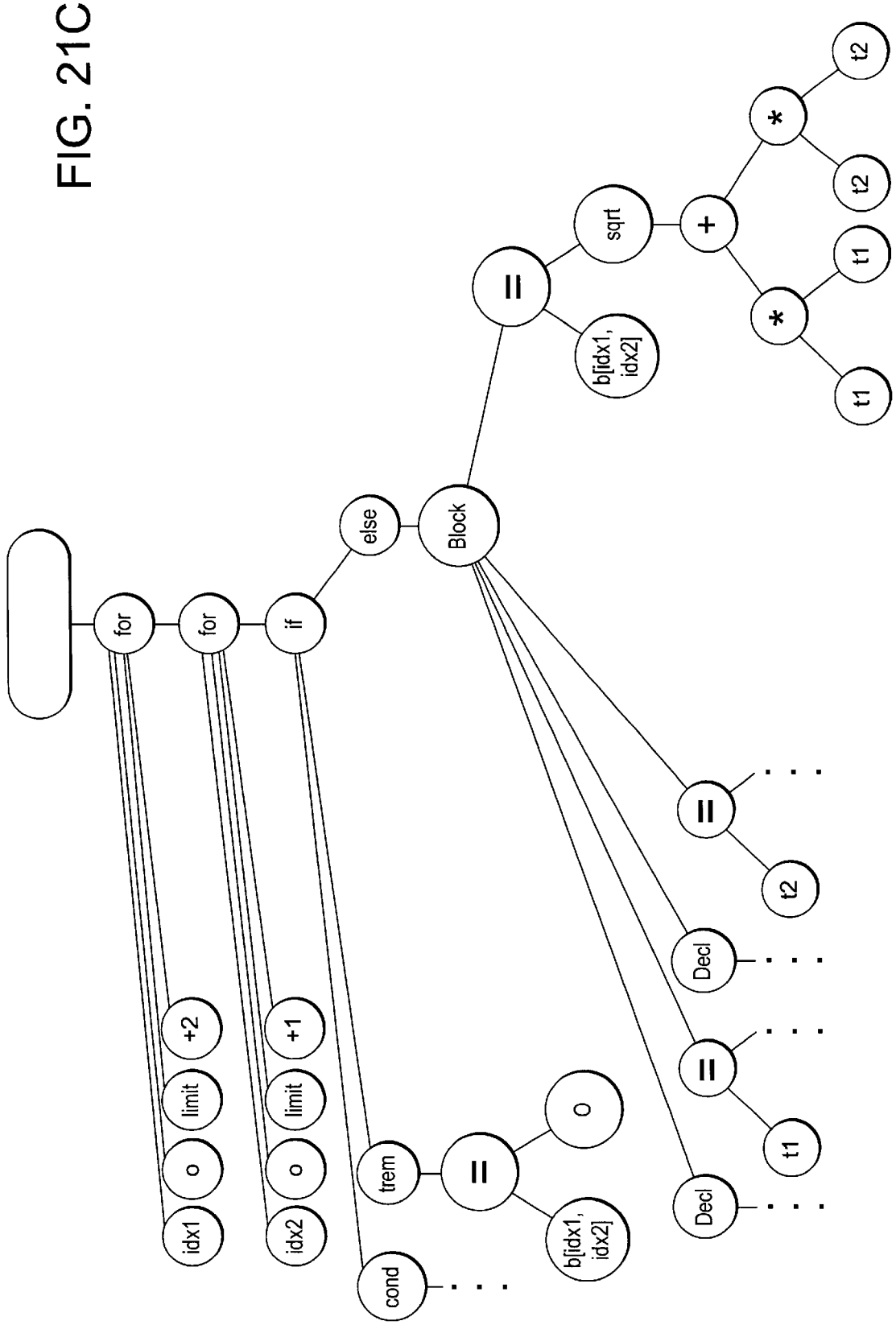

The modifier "_PromoteToTopOfLoop(idx2, ConstantExpressionOf(idx2))" is a variation on the PromoteAboveLoop modifier. It allows constant expressions of "idx2" to be replaced with temporary variables whose definitions are moved up to the top but not above the loop. The PromoteToTopOfLoop modifier prevents expressions like (idx2−1) and (idx2+1) from being computed over and over again within expressions in the loop body. Their values will be computed just once, stored in temporary variables (i.e., idx2ml and idx2p1), and then the temporary variables may be used many times. The temporary variable assignments are placed at the top but inside of the body block of idx2's loop. The transformation of the second convolution expression "(p2⊕s')" that becomes "gcon(a,idx1,idx2,s')" also changes the modifier expression in the quantifier tag to an enhanced form, specifically, "_PromoteAboveLoop(idx2,ConstantExpressionOf(idx1)" and "_PromoteToTopOfLoop(idx2,ConstantExpressionOf (idx2))." FIG. 21C represents a transformation of the AST in which the if-then-else statements in the definition of the gcon operation are folded into one. The ellipsis under the "cond" node represents the following condition (idx1==0||idx2==0||idx1==limit−1||idx2==limit−1).

Figure 21D:
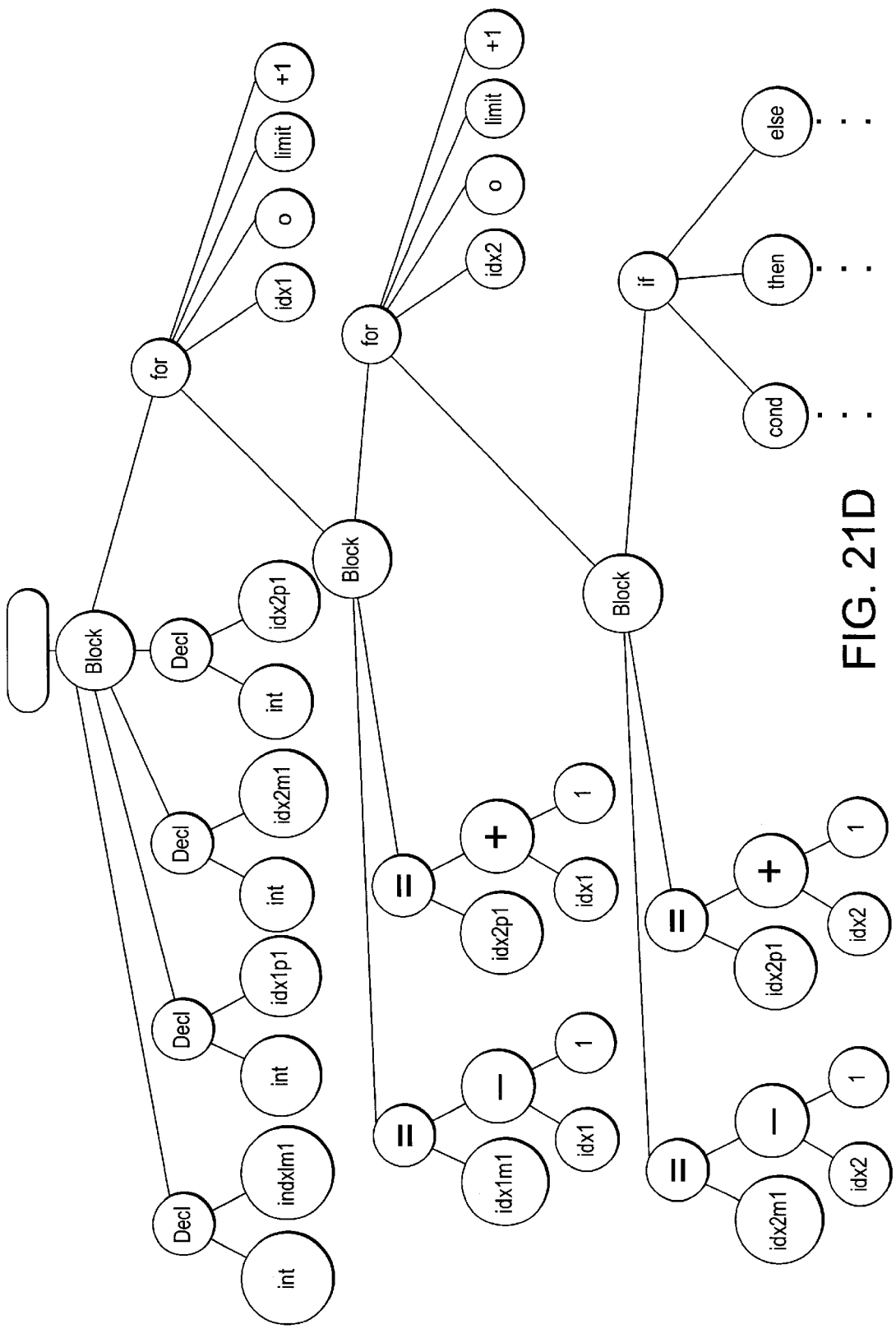

The ellipsis under the "=" nodes represent the following expressions:

$t1 = a[idx1-1, idx2-1]*(-1) + a[idx1-1, idx2]*(-2) +$
$\quad a[idx1-1, idx2+1]*(-1) + a[idx1+1, idx2-1]*1 +$
$\quad a[idx1+1, idx2]*2 + a[idx1+1, idx2+1]*1;$
$t2 = a[idx1-1, idx2-1]*(-1) + a[idx1, idx2-1]*(-2) +$
$\quad a[idx1+1, idx2-1]*(-1) + a[idx1-1, idx2+1]*1 +$
$\quad a[idx1, idx2+1]*2 + a[idx1+1, idx2+1]*1;$ FIG. 21D illustrates the AST after promotion modifiers are applied. The ellipsis under the "cond" node represents the following condition (idx1==0||idx2==0||idx1==limit−1||idx2==limit−1).

The ellipsis under the "then" node represents the statement b[idx1,idx2]=0.

The ellipsis under the "cond" node represents the statements $t1 = a[im1, jm1]*(-1) + a[im1, idx2]*(-2) +$
$\quad a[im1, jp1]*(-1) + a[ip1, jm1]*1 +$
$\quad a[ip1, idx2]*2 + a[ip1, jp1]*1;$
$t2 = a[im1, jm1]*(-1) + a[idx1, jm1]*(-2) +$
$\quad a[ip1, jm1]*(-1) + a[im1, jp1]*1 +$
$\quad a[idx1, jp1]*2 + a[ip1, jp1]*1;$ $b[idx1, idx2] = \text{sqrt}(t1*t1 + t2*t2);\}$ The modifier _PromoteAboveLoop(idx2, ConstanExpressionOf(idx1)) has been described earlier, and it will promote any constant expression of "idx1" outside of the loop controlled by "idx2." The modifier generates statements assigning those expressions to temporary variables that then replace the promoted expression. There is an ordering dependency between the folding shown in FIG. 21C and the two modifiers _PromoteAboveLoop and _PromoteToTopOfLoop. The _PromoteAboveLoop and _PromoteToTopOfLoop modifiers cannot be applied until folding has been completed.

These modifiers are expressed as and manipulated as abstract optimization instructions to the code generator, one level removed from the detail of the code itself. This mechanism allows a single modifier to reference and deal with an infinite variety of specific variations within the detailed target code. Thus, when the code generator calls on transforms that reconcile several such modifiers to check dependencies among them and assure that their actions are properly coordinated, those reconciliation transforms only have to express their dependency checks and manipulations in terms of these abstract expressions of the optimizations. They only have to look at the modifiers operators and their operands to determine if any reconciliation is necessary and how to do it. They do not have to know about the infinitely many detailed forms of the programming code might take. This inference process during reconciliation is analogous to the inference process in the problem domain that allowed the AO process to infer data flow and data dependency properties from the problem domain operators and operands. It is analogous in the sense that the inference performed by the reconciliation transforms is operating only in the domain of abstract optimization operations. The difference is the same as talking about optimizations rather than executing them. Therefore, this is anticipatory optimization of the optimization instructions themselves.

One skilled in the art would appreciate that the transforms illustrated for the image domain implementation are not all the transformations required for a complete implementation of the image domain but are illustrative of transforms needed to create such a complete implementation. Also, the AO system is described in terms of examples for fusing the loop structures of high-level operators applied to composite data structures. When the AO system applies transforms with different sets of user-defined optimization rules, the AO system can achieve the sharing of low-level operations among other kinds of definitions for high-level data structures and operators, including but not limited to high-level operations that are recursively defined, high-level definitions that are enumerated lists of low-level operations, and operations that are expressed as distributed, cooperating pieces of the overall operation definition.

From the foregoing it will be appreciated that, although specific embodiments of the invention have been described herein for purposes of illustration, various modifications may be made without deviating from the spirit and scope of the invention. The anticipatory optimization techniques apply to any domain even though the examples that we have chosen to illustrate it are focused on the graphics imaging domain. Similar optimization problems arise in every domain regardless of its structure and details. For example, other domains to which anticipatory optimization can be applied are networking, business systems, telephony, productivity applications, databases, and so forth. In addition, the optimization tags shown are narrowly focused on the explanatory example but this is not intended to indicate any inherent limitation of the applicability of the technique. The kinds (e.g., quantifier) and form of the optimization tags may be extended in arbitrary ways to extend the applicability of the technique to new domains, new transformations, and new kinds of optimizations. Anticipatory optimization applies to many kinds of optimizations. It applies to any redundant or non-optimal code that might arise from any composition of any abstractions. For example, suppose that two separate abstractions A and B compile into code that contains a redundant step, for example, an initialization or normalization step that is only required to happen once in the overall composition. Anticipatory optimization can handle this case in the following way. A and B are both tagged with an expression identifying code chunks (e.g., the initialization step) that are candidates for pruning if they occur previously in the generated code. Transforms migrate those tags (or alternatively, migrate a temporary form of "migratory tag") up the AST until both reside on the same AST node. At this point, a separate transform adds new tags to A and B that will inform the code generator to coordinate the generation of the code for A and B such that the initialization step will be generated only once and that once will be in the earliest code to be executed. If A will get executed first, then the initialization code will be generated for it but not for B. If B is the first in the execution stream of the generated code, then the initialization step will be generated in B but not in A. If the control structure is such that the execution order of A and B is indeterminate, then either the tag will never migrate up to the same node in the AST (i.e. the indeterminacy of execution order can be determined from the abstractions in the composition) or the code generator cannot perform the optimization and will generate the initialization step in the code for both A and B. Also, when matrices of different sizes are used in an operation, a transform can be applied to indicate how to handle the non-overlapping elements. Arbitrary kinds of abstractions can be handled. For example, even composition of concrete components (e.g., Java or ActiveX components) that might be optimized through compilation could be dealt with by anticipatory optimization. The Appendix contains the article entitled "Anticipatory Optimization in Domain Specific Translation," which further describes aspects of the present invention. Accordingly, the invention is not limited except as by the appended claims.

What is claimed is:

1. A method in a computer system for optimizing a high-level computer program using high-level computational constructs that is to be translated into a low-level computer program using low-level computational constructs, the high-level computational constructs including high-level operands that are composites of low-level computational constructs and including high-level operators for indicating operations on the high-level operands, the method comprising:

selecting a statement of the high-level computer program, the selected statement having a high-level operator and high-level operands, each high-level operand having implementing low-level computational constructs that implement access to the high-level operand;

identifying an optimization of the implementing low-level computational constructs that would result in an optimized translation of the selected statement into the low-level computational constructs;

when an optimization has been identified, indicating that the identified optimization can be applied to the selected statement of the high-level computer program; and when translating the selected statement of the high-level computer program to the low-level computer program, applying the indicated optimization generate combined low-level implementations customized to the high-level operators and operands of the selected statement without first generating the implementations for each operator and operand of the selected statement.

2. The method of claim 1 wherein the identifying of an optimization selects one of a plurality of optimizations that can be applied when translating a high-level computer program into a low-level computer program.

3. The method of claim 2 wherein the additional optimizations can be defined by a developer of the high-level computer program.

4. The method of claim 1 wherein the high-level computer program and the low-level computer program are represented by an abstract syntax tree.

5. The method of claim 1 wherein the identifying and indicating are performed by high-level computational construct transforms.

6. The method of claim 1 including generating code for the low-level computer program.

7. The method of claim 1, wherein the high-level computational constructs are represented by matrices.

8. A method in a computer system for optimizing a high-level computer program using high-level computational constructs that is to be translated into a low-level computer program using low-level computational constructs, the high-level computational constructs including high-level operands that are composites of low-level computational constructs and including high-level operators for indicating operations on the high-level operands, the method comprising:

selecting a statement of the high-level computer program, the selected statement having a high-level operator and high-level operands, the high-level operand having implementing low-level computational constructs that implement the high-level operand;

converting the selected statement into an intermediate-level statement having operator and operands, the intermediate-level statement including an indication of an optimization that is identified from the high-level computational constructs of the selected statement; and translating the intermediate-level statement into a low-level computational constructs, wherein the translation uses the indicated optimization to optimize the low-level computational constructs.

9. The method of claim 8, wherein the high-level computational constructs are represented by matrices.

10. A method in a computer system for identifying optimizations to be used when translating a high-level computer program using high-level computational constructs into a low-level computer program using low-level computational constructs, the method comprising:

providing a plurality of optimization techniques, the optimization techniques indicating the optimizations that may be applicable when translating high-level computational constructs into low-level computational constructs;

analyzing the high-level computational constructs of a representation of the high-level computer program to determine optimization techniques that may be applied to the translation of the high-level computer program;

storing an indication of each determined optimization technique in such a way that does not change the representation of the high-level computer program; and translating the high-level computer program into the low-level computer program using the stored indications of the determined optimization technique to guide the translation.

11. The method of claim 10 wherein the analyzing, storing, and translating are performed by transforms that implement the optimization techniques.

12. The method of claim 11 including defining a new high-level computational construct and providing a transform for that new high-level computational construct.

13. The method of claim 10 including defining a new high-level computational construct and providing a plurality of transforms that define all transformations of the new high-level computational construct.

14. The method of claim 13 wherein the transforms define all optimization behaviors of the new high-level computational construct.

15. The method of claim 13 wherein the transforms define multiple implementations of the new high-level computational construct.

16. The method of claim 13 wherein the transforms define various optimizations to apply to the new high-level computational construct in combination with other high-level computational constructs.

17. The method of claim 13 wherein the transforms define modifications to optimization tags to express interdependencies among the optimization tags.

18. The method of claim 13 wherein modifiers within optimization tags are invoked based on occurrences of named optimization events.

19. The method of claim 10 wherein the high-level computer program is represented in a tree data structure.

20. The method of claim 10, wherein the high-level computational constructs are represented by matrices.

21. The method of claim 20, wherein the high-level computational constructs are represented by matrices.

22. A method in a computer system for identifying optimizations that can be applied when generating a low-level implementation of the computer program from a high-level implementation of a computer program, the method comprising:

providing a plurality of transforms for annotating high-level computational constructs of the high-level implementation of the computer program with optimization tags that indicate optimizations that may be applicable when generating the low-level implementation of the computer program; and for each high-level computational construct of the high-level implementation of the computer program, applying those transforms that are applicable to the high-level computational construct to annotate the high-level computational construct with various optimization tags so that the low-level implementation can be generated in accordance with the optimization tags.

23. The method of claim 22 wherein the optimization tags express an implementation of the optimization in an abstract form.

24. The method of claim 23 whereby the abstract form indicates one of a plurality of low-level implementations of the high-level computational construct.

25. The method of claim 23 whereby further optimizations can be identified from the optimization tags.

26. The method of claim 22 wherein the optimization tags include modifiers that specify variations in the optimizations.

27. The method of claim 26 wherein one modifier takes precedence over a variation specified by another modifier.

28. The method of claim 26 wherein one modifier indicates that an expression should be moved outside a loop.

29. The method of claim 26 wherein one modifier indicates that an expression is a constant.

30. The method of claim 22 wherein modifiers within optimization tags are invoked based on occurrences of named optimization events.

31. The method of claim 22 wherein a transform expresses high-level structure of an implementation of optimizations indicated by the optimization tags.

32. The method of claim 22 wherein a transform expresses low-level structure of optimizations indicated by the optimization tags.

33. The method of claim 22 wherein the transforms are provided so that new transforms can be provided without modification to the applying of the transforms.

34. The method of claim 22 wherein the annotations are stored separately from the high-level implementation of the computer program so that the annotations can be manipulated separately from the computer program.

35. The method of claim 22 including generating a low-level implementation of the computer program in accordance with the indicated optimizations that are expressed at an implementation-independent level.

36. The method of claim 22 wherein a transform indicates that a low-level implementation of a computational construct can be moved outside of an iteration statement.

37. The method of claim 22 wherein a transform indicates that an iteration control statement should be unwrapped.

38. The method of claim 22 wherein an optimization tag indicates an optimization of the low-level implementation and thereby avoiding analysis of a low-level implementation to identify optimizations.

39. A computer system for optimizing a computer program when transforming a high-level representation of the computer program into a low-level representation of the computer program in accordance with an analysis of the high-level representation, comprising:

a inline function component for determining whether any invocations of functions in the high-level representation should be transformed into inline execution of the functions;

an eliminate barriers component for determining whether any computational constructs of the high-level representation can be transformed to permit identifying certain optimizations;

an add optimization tag component for adding optimization tags to the high-level representation that indicate optimization that may be applied when generating the code; and a code generation component for generating a low-level representation that is optimized in accordance with the added optimization tags.

40. The computer system of claim 39 wherein the high-level representation is a tree data structure and each component visits nodes of the tree in one or more depth-first, left-to-right traversals of the tree data structure.

41. The computer system of claim 39 wherein each component invokes transform modules that are defined to be used by that component.

42. The computer system of claim 39 wherein the add optimization tag component identifies optimization tags that have already been added to the high-level representation that can be migrated to a higher level in the representation.

43. The computer system of claim 42 wherein the identified optimization tags are coalesced into a single optimization tag.

44. Computer-readable medium containing instructions for causing a computer system to optimize a high-level computer program using high-level computational constructs that is to be translated into a low-level computer program using low-level computational constructs, the high-level computational constructs including high-level operands that are composites of low-level computational constructs and including high-level operators for indicating operations on the high-level operands, by:

selecting a statement of the high-level computer program, the selected statement having a high-level operator and high-level operands, each high-level operand having implementing low-level computational constructs that implement the behavior of the high-level operand;

identifying an optimization of the implementing low-level computational constructs that would result in an optimized translation of the selected statement into the low-level computational constructs;

when an optimization has been identified, indicating that the identified optimization can be applied to the selected statement of the high-level computer program; and when translating the selected statement of the high-level computer program to the low-level computer program, applying the indicated optimization to the low-level computational constructs implementing the behavior of the selected statement wherein the optimizations are identified from the high-level computer program rather than on the low-level computer program.

45. The computer-readable medium of claim 44 wherein the identifying of an optimization selects one of a plurality of optimizations that can be applied when translating a high-level computer program into a low-level computer program.

46. The computer-readable medium of claim 45 wherein the additional optimizations can be defined by a developer of the high-level computer program.

47. The computer-readable medium of claim 44 wherein the high-level computer program and the low-level computer program are represented by an abstract syntax tree.

48. The computer-readable medium of claim 44 wherein the identifying and indicating are performed by high-level computational construct transforms.

49. The computer-readable medium of claim 44 including generating code from the low-level computer program.

50. The computer-readable medium of claim 44 wherein a modifier of an optimization further indicates a variation in the optimization.

51. The computer-readable medium of claim 44 including mediating various modifiers of an optimization to resolve any inconsistencies among the modifiers.

52. The computer-readable medium of claim 44 including generating the low-level computer program with optimization without analyzing the low-level computational construct.

53. The computer-readable medium of claim 44, wherein the high-level computational constructs are represented by matrices.

* * * * *

UNITED STATES PATENT AND TRADEMARK OFFICE
CERTIFICATE OF CORRECTION

PATENT NO. : 6,314,562 B1
DATED : November 6, 2001
INVENTOR(S) : Biggerstaff

It is certified that error appears in the above-identified patent and that said Letters Patent is hereby corrected as shown below:

Title page,
Item [56], OTHER PUBLICATIONS, in the cited reference by "Reps,Thomas and Teitelbaum,Tim", entitled "The Synthesizer Generator", replace
"198" with -- 1984 --.

Column 7,
Line 32, replace "odes" with -- nodes --.

Column 9,
Line 66, replace "A [i:intj:int]" with -- A[i:int,j:int] --.

Column 10,
Line 27, replace "[i:intj:int]" with -- [i:int,j:int] --.
Line 55, replace "[i:intj:int]" with -- [i:int,j:int] --.

Column 13,
Line 18, replace " "566" " with -- "◊" --.

Column 14,
Line 30, replace "[indx2:int…" with -- [idxl:int… --.

Column 15,
Line 18, replace "SB," with -- 5B, --.

Column 19,
Line 32, delete "p1" between "and" and "3.".
Line 32, begin a new paragraph with "3. A procedure...".

Column 20,
Line 44, replace " "var" " with -- "var1" --.

UNITED STATES PATENT AND TRADEMARK OFFICE
CERTIFICATE OF CORRECTION

PATENT NO. : 6,314,562 B1
DATED : November 6, 2001
INVENTOR(S) : Biggerstaff

It is certified that error appears in the above-identified patent and that said Letters Patent is hereby corrected as shown below:

Column 25,
Line 15, delete "is" between "with" and "a".

Column 26,
Line 52, replace "41" with -- 4I --.

Column 32,
Line 13, insert "to" between "optimization" and "generate".

Signed and Sealed this

Eleventh Day of February, 2003

JAMES E. ROGAN
*Director of the United States Patent and Trademark Office*